United States Patent
Hamamoto et al.

(10) Patent No.: US 7,522,618 B2
(45) Date of Patent: Apr. 21, 2009

(54) COMMUNICATION APPARATUS, COMMUNICATION SYSTEM AND COMMUNICATION METHOD

(75) Inventors: Moe Hamamoto, Osaka (JP); Takeshi Kokado, Kyotanabe (JP)

(73) Assignee: Panasonic Corporation, Osaka (JP)

( * ) Notice: Subject to any disclaimer, the term of this patent is extended or adjusted under 35 U.S.C. 154(b) by 620 days.

(21) Appl. No.: 11/377,523

(22) Filed: Mar. 17, 2006

(65) Prior Publication Data
US 2006/0209822 A1 Sep. 21, 2006

(30) Foreign Application Priority Data
Mar. 18, 2005 (JP) ............................. 2005-078876

(51) Int. Cl.
*H04Q 3/47* (2006.01)
*H04Q 3/76* (2006.01)
*H04Q 5/18* (2006.01)

(52) U.S. Cl. .................. 370/401; 370/245; 370/248; 370/251; 370/252; 370/255; 709/227; 709/245; 709/250

(58) Field of Classification Search .............. 370/241, 370/245, 248, 251, 252, 255, 351, 352, 389, 370/401; 709/227, 245, 250
See application file for complete search history.

(56) References Cited

U.S. PATENT DOCUMENTS 7,359,382 B2 * 4/2008 Liu et al. .................... 370/392

| | | | |
|---|---|---|---|
| 2004/0057385 A1* | 3/2004 | Roshko | 370/252 |
| 2004/0131165 A1* | 7/2004 | Ebisawa et al. | 379/93.07 |
| 2004/0139228 A1* | 7/2004 | Takeda et al. | 709/245 |
| 2004/0139230 A1* | 7/2004 | Kim | 709/245 |
| 2005/0076108 A1* | 4/2005 | Li et al. | 709/223 |
| 2005/0100001 A1* | 5/2005 | Liu | 370/352 |
| 2005/0100047 A1* | 5/2005 | Liu et al. | 370/466 |
| 2005/0125532 A1* | 6/2005 | Kimchi | 709/225 |
| 2006/0053485 A1* | 3/2006 | Li | 726/11 |
| 2006/0182100 A1* | 8/2006 | Li et al. | 370/389 |
| 2006/0209822 A1* | 9/2006 | Hamamoto et al. | 370/389 |

FOREIGN PATENT DOCUMENTS

| | | |
|---|---|---|
| JP | 2004-180003 | 6/2004 |
| JP | 2004-304317 | 10/2004 |
| JP | 2004-304318 | 10/2004 |

* cited by examiner

*Primary Examiner*—Hassan Kizou
*Assistant Examiner*—Lonnie Sweet
(74) *Attorney, Agent, or Firm*—Wenderoth, Lind & Ponack, L.L.P.

(57) ABSTRACT

The NAT type of a router can be examined by communicating with one server having one IP address, and a P2P communication path is established efficiently using the NAT type obtained by the examination. A terminal 100 transmits a plurality of port number examination request packets having a plurality of port numbers of a server 001 set as the destination port. The terminal 100 refers to a port number examination response packet received from the server 001 to acquire a plurality of port numbers obtained by address translation by a router 101 for the port number examination request packets respectively. The terminal 100 determines the NAT type of the router 101 based on the acquired translated port numbers. The terminals 100 and 200 establish a P2P communication path efficiently using the determined NAT type.

20 Claims, 34 Drawing Sheets

F I G. 2B
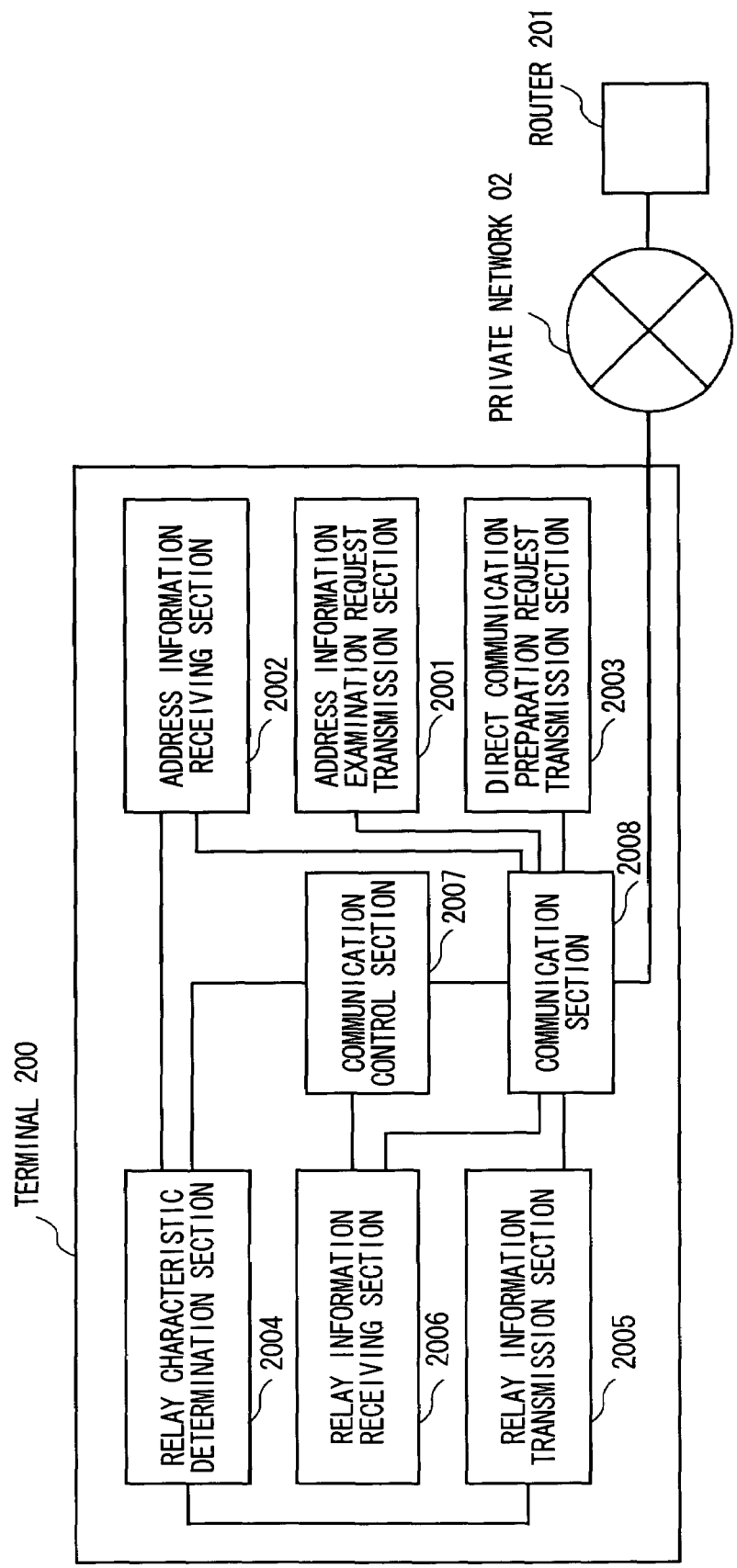

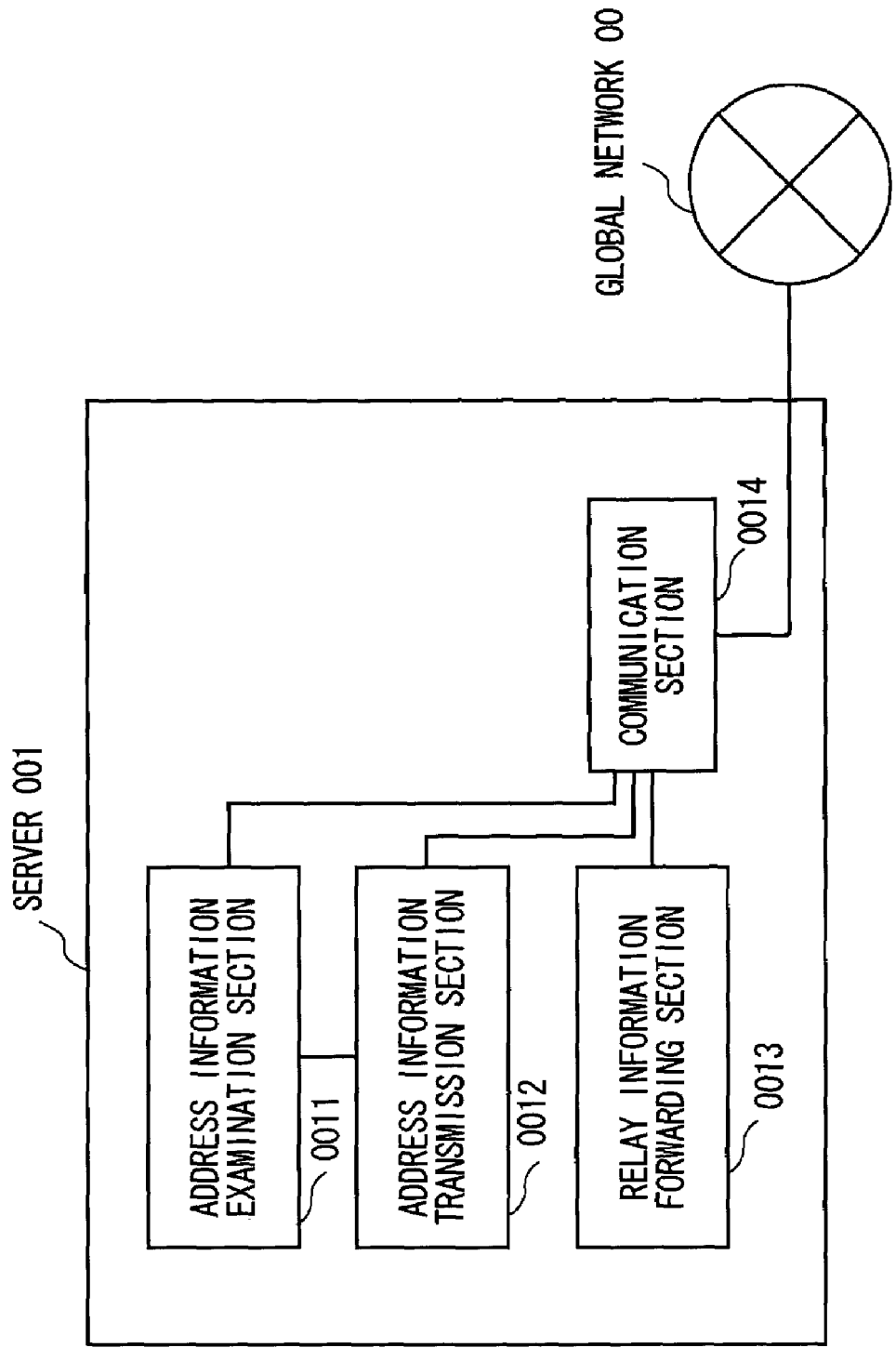

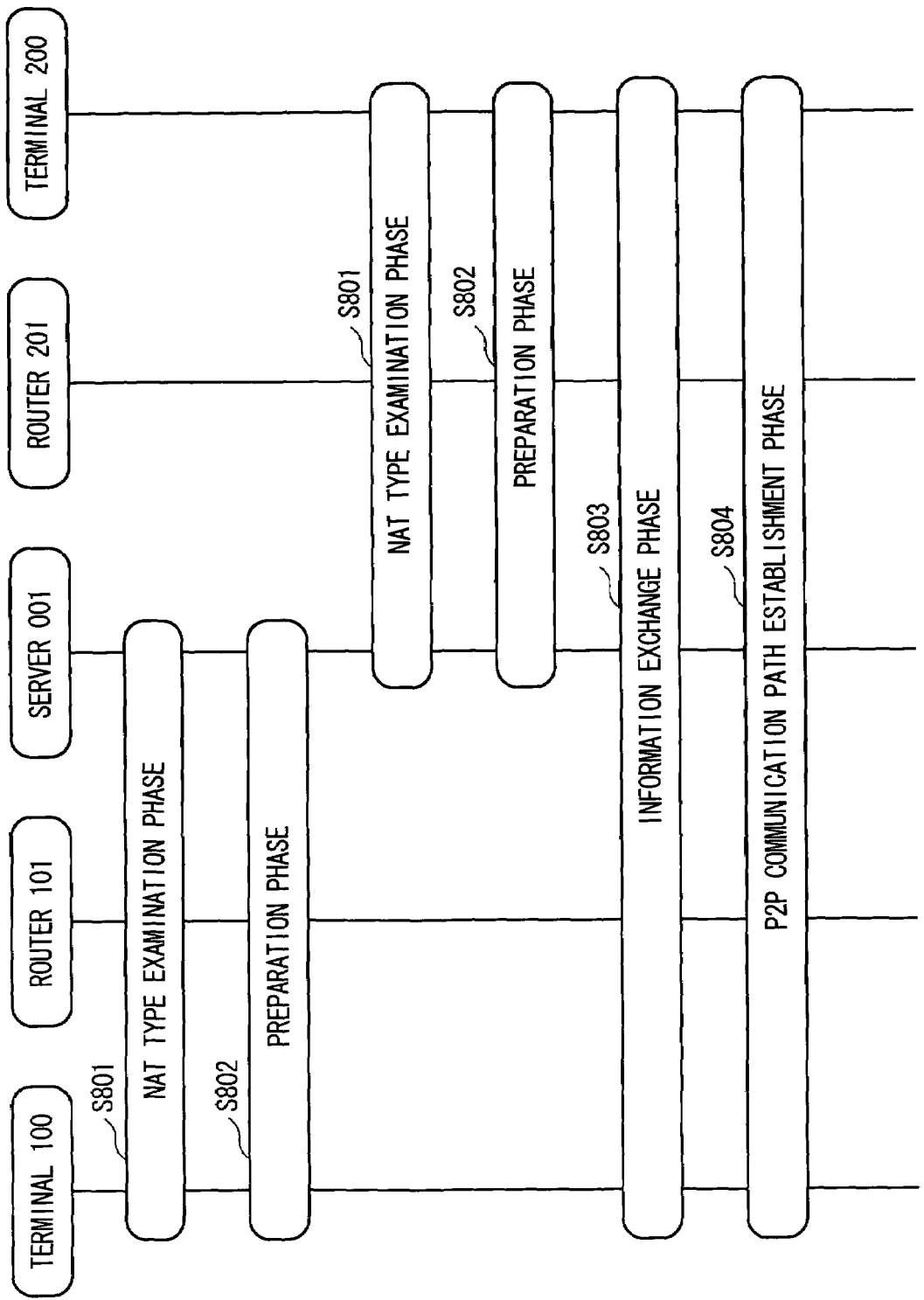

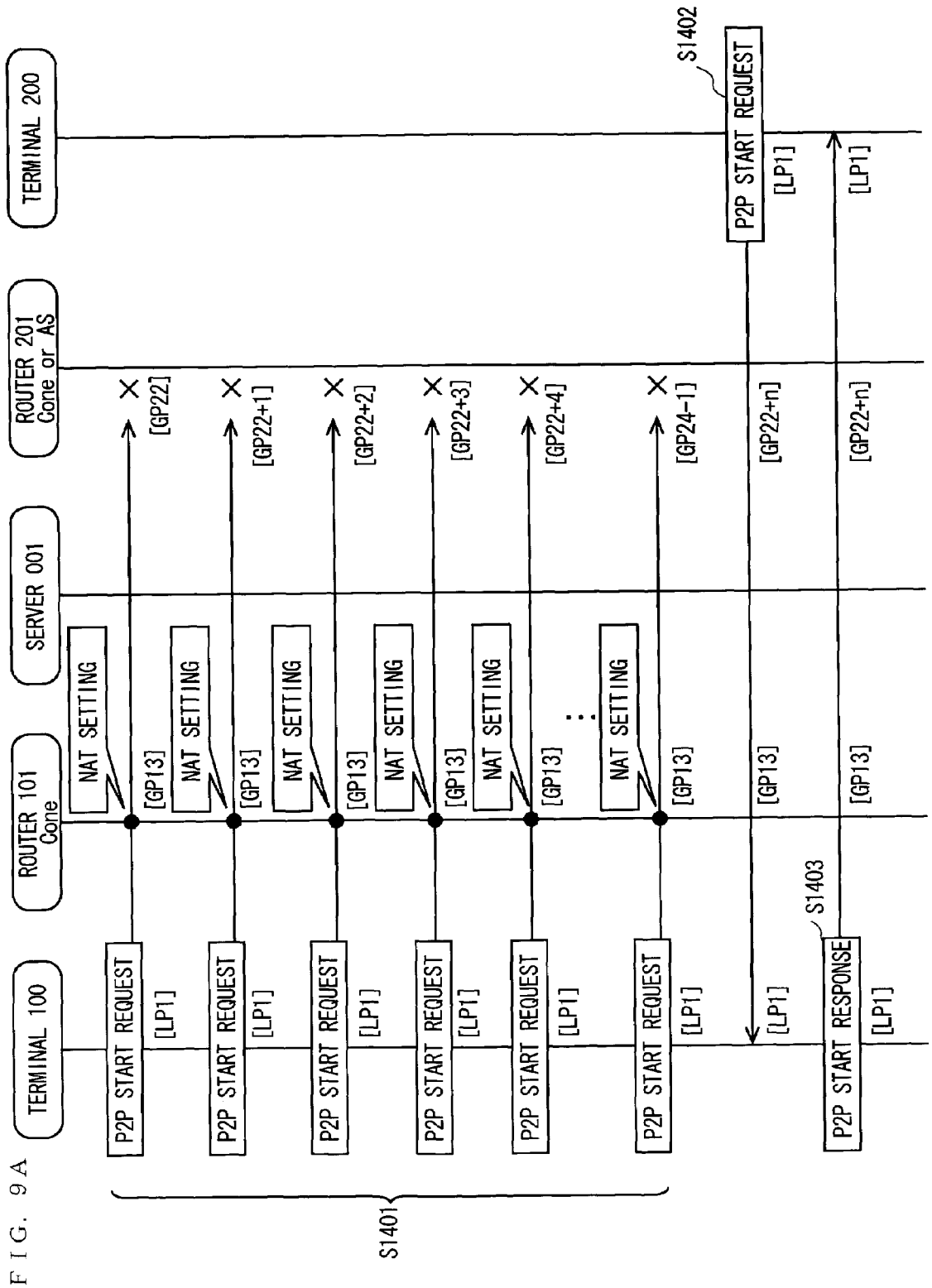

Full Cone NAT

Restricted Cone NAT (R NAT)

Port Restricted Cone NAT (PR NAT)

Address Sensitive Symmetric NAT (AS NAT)

Port Sensitive Symmetric NAT (PS NAT)

Port Reuse

Port Reuse - Full Cone NAT

STUN-Test I

STUN-Test II

STUN-Test III

COMMUNICATION APPARATUS, COMMUNICATION SYSTEM AND COMMUNICATION METHOD

BACKGROUND OF THE INVENTION

1. Field of the Invention

The present invention relates to a communication apparatus, a communication system and a communication method, and more specifically to a communication apparatus, a communication system and a communication method capable of establishing a P2P communication path between two different private networks.

2. Description of the Background Art

In general, communication terminals connected to a network are each assigned an IP address to be identifiable. An IP address which is uniquely determined in the entirety of all the connectable networks and enables pier-to-pier communication (hereinafter, referred to as "P2P communication") is referred to as a "global IP address". An IP address uniquely determined in a specific network and cannot be directly used for P2P communication with a different network is referred to as a "local IP address". A network in which communication terminals are mutually identified by local IP addresses is referred to as a "private network".

In order to enable a communication terminal connected to a private network (a communication terminal having a local IP address) to communicate with a communication terminal connected to a global network (a communication terminal having a global network), a communication apparatus (router) having a network address translation (hereinafter, referred to as "NAT") function or a network address port translation (hereinafter, referred to as "NAPT") function is generally connected between the private network and the global network. Hereinafter, "NAT" and "NAPT" will collectively be referred to as "NAT" for the simplicity of description.

However, due to the NAT functions of the routers, two communication terminals connected to different private networks cannot exchange packets for P2P communication by merely relaying the private networks and the global network using a communication apparatus such as a router or the like.

As a technique for allowing two communication terminals connected to different private networks via a router to establish a P2P communication path despite the different NAT types of the routers, a method using STUN (Simple Traversal UDP through NAT: RFC3489) is known. Hereinafter, the term "packet" refers to a "UDP packet".

Before describing a P2P communication path establishment technique using STUN, different types of NAT will be described with reference to FIG. 18A through FIG. 18E. A private network is not limited to being constructed as a home, i.e., an in-house network, and may be constructed as an in-company network. In the following description, a private network is assumed to be an in-house network for the simplicity of description, but the following description is applicable to a large scale network constructed for a company. Where the description is made from the viewpoint of a certain in-house network, a network which is different from that in-house network will be referred to as an "out-of-house network" or an "external network". For the simplicity of description, a combination of an IP address "IP" and a port number "P" will be represented as (IP, P).

FIG. 18A illustrates a NAT referred to as a "Full Cone NAT".

A Full Cone NAT router always assigns an identical port number to a packet which is transmitted from a specific port number of a certain in-house terminal having a private address to a certain out-of-house terminal. For example, the router always assigns a port number [Pb] to a packet transmitted from an in-house terminal A (IPa, Pa), and forwards the packet to an out-of-house terminal C connected to an external network. The Full Cone NAT router forwards all the packets, transmitted from an out-of-house terminal connected to an external network toward (IPb, Pb), to the in-house terminal A (IPa, Pa). Accordingly, the router forwards a packet, transmitted from an out-of-house terminal D (IPd, Pd) toward (IPb, Pb), to the in-house terminal A (IPa, Pa).

FIG. 18B illustrates a NAT referred to as a "Restricted Cone NAT (hereinafter, referred to as an "R NAT").

An R NAT router always assigns an identical port number [Pb] to a packet which is transmitted from a certain in-house terminal A (IPa, Pa) having a private address to a certain out-of-house terminal. Unlike the Full Cone NAT router, the R NAT router forwards only a packet transmitted toward (IPb, Pb) from the out-of-house terminal C (having an IP address IPc), which is a destination of the packet transmitted from the in-house terminal A, to the in-house terminal A (IPa, Pa). Accordingly, the router does not forward a packet transmitted toward (IPb, Pb) from the out-of-house terminal D, which is not a destination of the packet transmitted from the in-house terminal A, to the in-house terminal A. The R NAT router forwards a received packet having any source port number to the in-house terminal A, as long as the packet has the source IP address of [IPc]. Accordingly, the router forwards a packet transmitted, from a port [Pc2] of the out-of-house terminal C toward (IPb, Pb), to the in-house terminal A.

FIG. 18C illustrates a NAT referred to as a "Port Restricted Cone NAT (hereinafter, referred to as a "PR NAT").

A PR NAT router always assigns an identical port number [Pb] to a packet transmitted from a certain in-house terminal A (IPa, Pa) to an out-of-house network. Unlike the R NAT router, the PR NAT router forwards only a packet, transmitted toward (IPb, Pb) from (IPc1, Pc1), which is the destination of the packet transmitted from the in-house terminal A, to the in-house terminal A (IPa, Pa). Accordingly, the router discards a packet transmitted from a source (IPd, Pd) of the out-of-house terminal D and also a packet transmitted from a source (IPc2, Pc2) of the out-of-house terminal C.

Hereinafter, the Full Cone NAT, the R Cone NAT and the PR Cone NAT will collectively be referred to as a "Cone NAT".

FIG. 18D illustrates a NAT referred to as an "Address Sensitive Symmetric NAT" (hereinafter, referred to as an "AS NAT").

A router having an AS NAT assigns a different port number to each destination IP address of a packet transmitted from the in-house terminal A. For example, a packet transmitted from the in-house terminal A (IPa, Pa) to the out-of-house terminal C (IPc, Pc) is assigned a port number [Pb1]. A packet transmitted from the in-house terminal A (IPa, Pa) to the out-of-house terminal D (IPd, Pd), having a different IP address from that of the out-of-house terminal C, is assigned a port number [Pb2]. The AS NAT router forwards only a packet transmitted from an out-of-house terminal assigned a certain port number to the in-house terminal A (IPa, Pa), and discards all the packets transmitted from an out-of-house terminal which is not assigned that certain port number. For example, the router forwards a packet, transmitted from the out-of-house terminal C having an IP address [IPc] toward (IPb, Pb), to the in-house terminal A (IPa, Pa), but discards a packet transmitted from the out-of-house terminal D having an IP address [IPd] toward (IPb, Pb). The AS NAT router forwards a packet which is transmitted toward (IPb, Pb) and has any source port number to the in-house terminal A to the in-house terminal A, as long as the packet has the source IP address of [IPc].

FIG. 18E illustrates a NAT referred to as a "Port Sensitive Symmetric NAT" (hereinafter, referred to as a "PS NAT").

A PS NAT router assigns a different port number to a packet which is transmitted from the in-house terminal A and has a different combination of destination IP address and destination port number, and transmits the packet to the external network. For example, the router assigns a port number [Pb0] to a destination (IPc, Pc0) of a packet transmitted from the in-house terminal A (IPa, Pa), a port number [Pb1] to a destination (IPc, Pc1) of a packet transmitted from the in-house terminal A (IPa, Pa), and a port number [Pb2] to a destination (IPc, Pc2) of a packet transmitted from the in-house terminal A (IPa, Pa). The router forwards a packet transmitted from an out-of-house terminal assigned a certain port number to the in-house terminal A, but discards all the packets transmitted from an out-of-house terminal which is not assigned that certain port number. For example, the router forwards a packet, transmitted from the source (IPc, Pc) toward the port number [Pb1], to the in-house terminal A, but discards all the packets transmitted from the sources (IPc, Pc) and (IPd, Pd1) toward the port number [Pb1].

Hereinafter, the AS NAT and the PS NAT will collectively be referred to as a "Symmetric NAT".

Aside from the Cone NAT and the Symmetric NAT described above, a router having a characteristic of setting a NAT using a port number which is the same as the source port number of an in-house terminal is known.

FIG. 19A illustrates an overview of a Port Reuse characteristic.

As shown in FIG. 19A, a router assigns a port number [Pa] to a packet having a port number [Pa] of the in-house terminal A as the source, a port number [Pb] to a packet having a port number [Pb] of the in-house terminal A as the source, and a port number [Pc] to a packet having a port number [Pc] of the in-house terminal A as the source. The characteristic of a communication apparatus of providing a packet having a certain source port number with a port number which is the same as that certain source port number is referred to as "Port Reuse".

Port Reuse is different from the NAT types. Accordingly, a Port Reuse NAT communication apparatus necessarily have one of the above-described NAT types.

FIG. 19B illustrates a function of a Port Reuse NAT router.

In the case where the router shown in FIG. 19B is the Port Reuse-Full Cone NAT router, the router always assigns a port number [Pa] to a packet having (IPa, Pa) set as the source IP address and the source port number, and transmits the packet to an external network. The router forwards all the packets, transmitted from an out-of-house terminal connected to the external network toward (IPb, Pb), to the in-house terminal A.

Next, a method using STUN for establishing a P2P communication path despite the different NAT types of the routers will be described.

In order to establish a P2P communication path between two communication terminals connected to different private networks via a router, each of the terminals needs to set a destination IP address and a destination port number to the packet. However, since the address translation method is different in accordance with the NAT type of the router as described above, the communication terminal needs to set the destination of the packet in consideration of the NAT type of the router.

In order to establish a P2P communication path, first, the NAT type of the router to which each communication terminal is connected is examined in accordance with the method defined by STUN. In more detail, with STUN, the communication terminal transmits a test packet to each of two servers having different IP addresses. By determining whether or not the port numbers assigned to the test packets by the router match each other, it is determined whether the router is a Cone NAT router or a Symmetric NAT router.

Hereinafter, with reference to FIG. 20A through FIG. 20C and FIG. 21, a method for examining the NAT type by STUN will be described.

FIG. 20A shows an overview of STUN-Test I.

In Test I, the in-house terminal A transmits a packet having (IPa, Pa) as the source to a server 1 (IPc, Pc1). The server 1 refers to the packet transmitted from the in-house terminal A to transmit a packet having [Pc1] set as the source port number and [Pb] assigned by the router as the destination port number.

FIG. 20B shows an overview of STUN-Test II.

In Test II, the in-house terminal A transmits a packet having (IPa, Pa) as the source and (IPc, Pc1) of the server 1 as the destination. By contrast, a sever 2 transmits a packet having (IPd, Pd) set as the source and [Pb] assigned by the router as the destination port number.

FIG. 20C shows an overview of STUN-Test III.

In Test III, the in-house terminal A transmits a packet having (IPa, Pa) set as the source and (IPc, Pc1) of the server 1 set as the destination. The server 1 transmits a packet having [Pc2], which is different from [Pc1], as the source port number and [Pb] assigned by the router as the destination port number.

FIG. 21 is a flowchart illustrating a method for examining the NAT type of the router by STUN.

First, the in-house terminal A performs Test I (step S2501) to determine whether or not a response from the server 1 has been received (step S2502). When a response from the server 1 has been received, the in-house terminal A advances to step S2504, and otherwise determines that the UDP communication with the server 1 is impossible (step S2503).

When the in-house terminal A has received a response from the server 1 (Yes in step S2502), the in-house terminal A determines whether or not the translated IP address [IPb] included in the received response packet matches the IP address [IPa] of the in-house terminal A (step S2504). When the IP address [IPb] included in the response packet matches the IP address [IPa] of the in-house terminal A, the in-house terminal A advances to step S2505, and otherwise advances to step S2509. When the IP addresses [IPb] and [IPa] match each other, this means that the in-house terminal A is connected to an external network without using a router and NAT is not performed between the in-house terminal A and the server 1.

When the determination result in step S2504 is Yes, the in-house terminal A performs Test II (step S2505) to determines whether or not a response from the server 2 has been received (step S2506). When the in-house terminal A has received a response from the server 2 (Yes in step S2506), the in-house terminal A determines that it is possible to receive a packet also from a communication terminal other than the terminal to which the in-house terminal A transmits packets (server 1), i.e., that the in-house terminal A is open to the network (step S2508). When the in-house terminal A has not received a response from the server 2 (No in step S2506), the in-house terminal A determines that transmission/receiving of packets is restricted by a UDP firewall (step S2507).

When the IP addresses [IPb] and [IPa] do not match each other as a result of Test I (No in step S2504), the in-house terminal A performs Test II (step S2509) to determine whether or not a response from the server 2, which is different from the destination of the packet, has been received (step S2510) When the in-house terminal A has received a response from the server 2 (Yes in step S2510), the in-house terminal A determines that the router connected thereto is the Full Cone NAT router (step S2511). When the in-house terminal A has not received a response from the server 2 (No in step S2510), the in-house terminal A performs Test I on the server 2 (step S2512). Here, the port number assigned by the router to the packet transmitted from the in-house terminal A is [Pb']. The in-house terminal A determines whether or not an IP address/port number combination (IPb, Pb') included in the response packet received from the server 2 in step S2512 and set by the NAT match an IP address/port number combination (IPb, Pb) included in the response packet received from the server 1 in step S2501 and set by the NAT (step S2513). When it is determined that (IPb, Pb') matches (IPb, Pb) (Yes in step S2513), the in-house terminal A advances to step S2515. When it is determined that (IPb, Pb') does not match (IPb, Pb) (No in step S2513), the in-house terminal A determines that the router connected thereto is a Symmetric NAT router (step S2514).

When the determination result in step S2513 is Yes, the in-house terminal A performs Test III (in step S2515) to determine whether or not a response from the server 1 has been received (step S2516). When the in-house terminal A has received a response from the server 1 (Yes in step S2516), the in-house terminal A determines that the router connected thereto is the R NAT router (step S2517), and otherwise determines that the router connected thereto is the PR NAT router (step S2518).

As described above, with the method defined by STUN, the type of NAT is examined by performing three types of tests shown in FIG. 20A through FIG. 20C in accordance with the processing flow shown in FIG. 21.

Also known is a technique for establishing a P2P communication path between the two communication terminals using STUN in the case where the two communication terminals are both connected to a Cone NAT router as a result of the examination of the NAT type described above. Hereinafter, with reference to FIG. 22, the P2P communication path establishment technique using STUN will be described.

FIG. 22 is a sequence diagram illustrating a P2P communication path establishment method using STUN.

First, a terminal 1 transmits an IP/port registration request packet for requesting the registration of an IP address and a port number to a server via a router 1 (step S201). The router 1 performs address translation of a source of the packet received from the terminal 1 from (IPL1, LP1) to (IPG1, GP1), and transmits the translated packet to the server. The server registers the source IP address IPG1 and the source port number GP1 included in the packet received from the router 1 (step S202).

Similarly, a terminal 2 transmits an IP/port registration request packet to the server via a router 2 (step S203). The router 2 performs address translation of a source of the packet received from the terminal 2 from (IPL2, LP2) to (IPG2, GP2), and transmits the translated packet to the server. The server registers the source IP address IPG2 and the source port number GP2 included in the packet received from the router 2 (step S204).

Next, the terminal 2 transmits an IP/port acquisition request to the server for accessing the terminal 1 in order to perform P2P communication with the terminal 1 (step S205). In response to the IP/port acquisition request from the terminal 2, the server returns an IP/port acquisition response packet, including an IP address/port number combination (IPG1, PG1) assigned by the router 1 to the source (IPL1, LP1) of the terminal 1, to the terminal 2 (step S206).

The terminal 2 refers to the packet received from the server to acquire the IP address and the port number (IPG1, PG1) for accessing the terminal 1. The terminal 2 then transmits a P2P start request packet having (IPG1, PG1) as the destination (step S207).

The response of the router 1 to the P2P start request packet transmitted from the terminal 2 varies in accordance with the NAT type of the router 1.

In the case where the router 1 is the Full Cone NAT router (FIG. 18A), the router 1 forwards the P2P start request packet transmitted from the terminal 2 to the terminal 1, and thus a P2P communication path is established between the terminal 1 and the terminal 2.

In the case where the router 1 is the R NAT router (FIG. 18B) or the PR NAT router (FIG. 18C), the router 1 discards the P2P start request packet transmitted from the terminal 2. Therefore, the P2P start request packet is not forwarded to the terminal 1 (IPL1, LP1).

Attention should be paid to that the router 2, which is a Cone NAT router, sets the NAT so as to be able to receive a response packet from the router 1 by forwarding a packet having (IPL1, LP2) set as the source and (IPG1, GP1) set as the destination to the router 1. Namely, in the case where the router 2 is the Full Cone NAT router, the router 2 sets the NAT so as to forward a packet, transmitted from any out-of-house terminal to the router 2 (IPG2, GP2), to the router 2 (IPL2, LP2). In the case where the router 2 is the R NAT router, the router 2 sets the NAT so as to forward a packet having [IPG1] as the source IP address to the terminal 2 (IPL2, LP2). In the case where the router 2 is the PR NAT router, the router 2 sets the NAT so as to forward a packet having (IPG1, GP1) as the source IP address and a source port number to the terminal 2 (IPL2, LP2). As a result, the next time that the router 2 receives a packet having (IPG1, GP1) as the source IP address and the source port number, the router 2 can forward the received packet to the terminal 2, and thus a P2P communication path is established between the terminal 1 and the terminal 2.

Thus, the terminal 1 transmits a packet for accessing the terminal 2 to the server as an IP/port acquisition request (step S208). In response to the IP/port acquisition request from the terminal 1, the server returns a packet, having an IP address and a port number (IPG2, GP2) assigned by the router 2 to the source (IPL1, LP1) of the terminal 1, to the terminal 2 as an IP/port acquisition response (step S209).

The terminal 1 refers to the IP/port acquisition response received from the server to acquire the IP address and the port number (IPG2, GP2) of the router 2 assigned to the IP address and the port number (IPL2, LP2) of the terminal 2.

Next, the terminal 1 transmits a P2P start request packet having (IPL1, LP1) set as the source to the terminal 2 (step S210). As described above, at this stage, the router 2 forwards the packet having (IPL1, LP1) as the source IP address and the source port number to the terminal 2 without discarding the same. The router 1 can set the NAT so as to be able to receive a response packet from the router 2 by forwarding a packet having (IPL1, LP1) as the source to the router 2. Namely, in the case where the router 1 is the R NAT router, the router 1 sets the NAT so as to forward a packet having [ IPG2] as the source IP address to the terminal 1 (IPL1, LP1). In the case where the router 1 is the PR NAT router, the router 1 sets the NAT so as to forward a packet having (IPG2, GP2) as the source IP address and the source port number to the terminal 2 (IPL2, LP2).

Accordingly, when the terminal 2 transmits a P2P start response packet to the terminal 1 in response to the P2P start request packet from the terminal 1 (step S211), a P2P communication path is established between the terminal 1 and the terminal 2.

According to the above-described technique using STUN, in the case where two communication terminals connected to different private networks are each connected to a Cone NAT router, a P2P communication path can be established between the two communication terminals.

However, in the case where the two communication terminals are connected via a Symmetric NAT router, a P2P communication path cannot be established by the technique using STUN. The reasons will be described.

FIG. 23 is a sequence diagram illustrating a processing procedure in the case where the P2P communication path establishment method using STUN is applied to two communication terminals connected via a Symmetric NAT router. More specifically, in the example shown in FIG. 23, the terminal 1 connected to a certain private network is connected to an external network via a Symmetric NAT router.

First, in steps S301 through S304, like in steps S201 through S204 shown in FIG. 22, the terminal 1 and the terminal 2 each transmit an IP/port registration request packet to the server, and thus register the IP address and the port number in the server.

Next, the terminal 2 transmits an IP/port acquisition request packet to the server in order to acquire an IP address and a port number to be used for performing P2P communication with the terminal 1 (step S305). In response to the IP/port acquisition request from the terminal 2, the server returns an IP/port acquisition response packet, including an IP address and a port number (IPG1, GP1) assigned by the router 1 to the source IP address and the source port number (IPL1, LP1), to the terminal 2 (step S306).

The terminal 2 refers to the packet received from the server to acquire the IP address and the port number (IPG1, GP1) for accessing the terminal 1. Then, the terminal 2 transmits a packet having (IPG1, PG1) as the destination, as a P2P start request (step S307).

In the case where the router 1 is a Symmetric NAT router, the router 1 discards the P2P start request without forwarding the same to the terminal 1 (IPL1, LP1). As described above, the router 2, which is a Cone NAT router, sets the NAT so as to be able to receive a response packet from the router 1 by forwarding the packet having (IPL2, LP2) set as the source and (IPG1, GP1) set as the destination to the router 1.

Next, the terminal 1 transmits a packet for accessing the terminal 2 to the server as an IP/port acquisition request (step S308). In response to the IP/port acquisition request from the terminal 1, the server returns a packet, including an IP address and a port (IPG2, GP2) assigned by the router 2 to the source IP address and the source port number (IPL2, LP2) of the router 2, to the terminal 2 as an IP/port acquisition response (step S309).

The terminal 1 refers to the IP/port acquisition request received from the server to acquire the IP address and the port number [IPG2, GP2] of the router 2 assigned to the IP address and the port number (IPL2, LP2) of the terminal 2.

Next, the terminal 1 transmits a packet having (IPL1, LP1) as the source to the terminal 2 as a P2P start request (step S310). However, the router 1 is a Symmetric NAT router and therefore assigns a different port number to a different destination of the packet. Accordingly, the router 1 assigns a port number [PG3], which is different from [PG1], to the P2P start request packet received from the terminal 1 and forwards the packet to the router 2.

In the case where the router 2 is the Full Cone NAT router or the R NAT router, the router 2 forwards the received P2P start request packet to the terminal (IPL2, LP2). Therefore, a P2P communication path is established between the terminal 1 and the terminal 2.

However, in the case where the router 2 is the PR NAT router or a Symmetric NAT router, the router 2 discards the received P2P start request packet without forwarding the same to the terminal 2. Therefore, the establishment of a P2P communication path between the terminal 1 and the terminal 2 results in a failure.

FIG. 24 is a sequence diagram illustrating a processing procedure in the case where the P2P communication path establishment method using STUN is applied to two communication terminals connected via a Symmetric NAT router. More specifically, in the example shown in FIG. 24, the terminal 2 connected to a certain private network is connected to an external network via a Symmetric NAT router.

First, in steps S401 through S404, like in steps S201 through S204 shown in FIG. 22, the terminal 1 and the terminal 2 each transmit an IP/port registration request packet to the server, and thus register the IP address and the port number in the server.

Next, the terminal 2 transmits an IP/port acquisition request packet to the server in order to acquire an IP address and a port number to be used for performing P2P communication with the terminal 1 (step S405). In response to the IP/port acquisition request from the terminal 2, the server returns an IP/port acquisition response packet, including an IP address and a port number (IPG1, GP1) assigned by the router 1 to the source IP address and the source port number (IPL1, LP1), to the terminal 2 (step S406).

The terminal 2 refers to the packet received from the server to acquire the IP address and the port number (IPG1, GP1) for accessing the terminal 1. Then, the terminal 2 transmits a packet having (IPG1, PG1) as the destination, as a P2P start request (step S407).

The destination of the P2P start request packet transmitted from the terminal 2 in step S407 is different from the destination of the IP/port registration request packet transmitted from the terminal 2 in step S403. Accordingly, the router 2, which is a Symmetric NAT router, assigns a port number [PG3], which is different from the port number [GP2], to the P2P start request packet. Namely, the router 2 sets the NAT so as to forward the packet, transmitted from the terminal 1 toward a destination of the router 2 (IPG2, PG3), to the terminal 2 (IPL2, LP2).

Therefore, even if the P2P start request packet having (IPG2, PG2) as the destination IP address and the destination port number is transmitted after the terminal 1 acquires, from the server, the IP address and the IP port number (IPG2, GP2) for accessing the terminal 2 (steps S408 and S409), the router 2 discards the P2P start request packet. Accordingly, the establishment of a P2P communication path between the terminal 1 and the terminal 2 results in a failure.

As described above, in the case where at least one of the router 1 and the router 2 is a Symmetric NAT router, the probability that the P2P communication path establishment method using STUN brings a successful result cannot be considered to be high.

In an attempt to solve the above-described problem of STUN, a method for establishing a P2P communication path for a combination of arbitrary two NATs among all the NATs including a Symmetric NAT is conventionally known (for example, Japanese Laid-Open Publication No. 2004-180003).

The P2P communication path establishment method described in Japanese Laid-Open Publication No. 2004-180003 is as follows. A communication terminal estimates a plurality of port numbers of the router used by a communication terminal, with which the first communication terminal is to perform P2P communication, for transmitting a P2P start request packet. The first communication terminal transmits a plurality of packets respectively having the estimated port numbers as the destination port. The router connected to the first communication terminal sets a plurality of port numbers for receiving the packets transmitted from the communication terminal to which the first communication terminal is to perform P2P communication. Therefore, the probability that a P2P communication path is successfully established can be increased. Hereinafter, this will be described in more detail.

FIG. 25 is a sequence diagram illustrating a P2P communication path establishment method described in Japanese Laid-Open Publication No. 2004-180003. In the example shown in FIG. 25, each of the router 1 and the router 2 is a Symmetric NAT router.

First, in steps S501 through S504, like in steps S201 through S204 shown in FIG. 22, the terminal 1 and the terminal 2 each transmit an IP/port registration request packet to the server, and thus register the IP address and the port number in the server.

Next, the terminal 2 transmits a P2P communication request packet to the server in order to communicate with the terminal 1 (step S505). In step S505, the terminal 2 changes the source port number from the port number [LP2] used for transmitting the IP/port registration request packet in step S503 to a port number [LP2+a] (where "a" is an arbitrary integer). The reason why the terminal 2 uses the new port number [LP2+a] as the source port is that the router 2 is estimated to assign a new port number [GP2+b] to the source (IPL2, LP2+a) in accordance with the change of the source port number. Here, "b" is an arbitrary integer and is an increment amount defined by the router 2.

Upon receipt of the P2P communication request packet, the server refers to the received packet to transmit a packet, including the IP address and the port number (IPG2, GP2+b) assigned by the router 2 to the source (IPL2, LP2+a), to the terminal 1 as an IP/port notification (step S506).

Upon receipt of the IP/port notification packet transmitted from the server, the terminal 1 determines whether or not to permit the terminal 2 to perform P2P communication, and notifies the server of the determination result (step S507). In step S507, the terminal 1 changes the source port number from [LP1] used for transmitting the IP/port registration request packet in step S501 to [LP1+c] (where "c" is an arbitrary integer). The reason why the terminal 1 uses the new port number [LP1+c] as the source port is that the router 1 is estimated to assign a new port number [GP1+d] to the source (IPL, LP1+c). Here, "d" is an arbitrary integer and is an increment amount defined by the router 1.

Next, the terminal 1 transmits a P2P start request packet having (IPG2, GP2+b+n) as the destination to the server, based on the IP address and the port number (IPG2, GP2+b) acquired from the received IP/port number notification packet (step S508). Here, "n" is an arbitrary integer.

In steps S507 and S508, the terminal 1 transmits the packets consecutively in a very short period of time. Accordingly, when the source port number [LP1+c] of the packet transmitted in step S507 is translated into [GP1+d], the source port number [LP1+c+1] of the packet transmitted in step S508 is translated into [GP1+d+1] in accordance with the setting of the NAT by router 1.

As a result of the transmission of the packet by the terminal 1 in step S508, the router 1 changes the NAT setting so as to be able to receive a response packet. Therefore, after the router 2 translates the source (IPL1, LP1+c+1) of the packet transmitted from the terminal 1 into (IPG1, GP1+d+1) and forwards the packet to the router 2 (IPG2, GP2+b+n), the router 1 can forward a packet having (IPG2, GP2+b+n) as the source to the terminal 1 (IPL1, LP1+c+1). The reason why the terminal 1 transmits a packet to a port number incremented by an arbitrary integer n from the acquired destination port number will be described later.

Upon receipt of a P2P communication permission packet transmitted from the terminal 1 in step S507, the server transmits a communication permission packet including an IP address and a port number (IPG1, GP1+d) of the router 1 to the terminal 2 (step S509).

Immediately after receiving an IP address and a port number (IPG1, GP1+d) for accessing the terminal 1, the terminal 2 transmits a P2P start request packet from the terminal 1 to the terminal 2 (step S510). In step S510, the terminal 2 transmits n number of P2P start request packets having source port numbers incremented one by one from [LP1+a+1] and the port number [GP1+d+1] of the router 1 as the destination port. The n number of P2P start request packets have. The router 2 translates the source port numbers of the n number of P2P start request packets transmitted from the terminal 2 into [GP2+b+m] through [GP2+m+n−1] respectively. Here, "n" is a value determined in consideration of the possibility that the setting of the NAT is changed by a packet transmitted from another terminal (not shown) connected to the router 1 in a short time period during which the processing in steps S508 through S510 is executed. "m" is an integer equal to or less than n.

As a result, the destination port number [GP2+b+n] of the packet transmitted from the terminal 1 in step S508 matches one of [GP2+b+m] through [GP2+m+n−1]. Therefore, the router 1 forwards one of the received n number of P2P start request packets to the terminal 1 (step S510-2) In the example shown in FIG. 25, the port numbers [GP2+b+n] and [GP2+b+m+2] match each other.

Upon receipt of the P2P start request packet transmitted from the router 1, the terminal 1 returns a P2P start response packet (step S511). The router 2, the NAT setting of which has been adjusted in step S510-2, forwards the P2P start response packet transmitted from the terminal 1 to the terminal 2. Then, a P2P communication path is established between the terminal 1 and the terminal 2.

As described above, the method using STUN and the method disclosed by Japanese Laid-Open Publication No. 2004-180003 are known as a method for establishing a P2P communication path between two communication terminals connected to different private networks.

However, these conventional methods have the following problems.

The method using STUN has the following problems. First, two servers having different IP addresses are required in order to examine the NAT type of the router connected to each communication terminal. Accordingly, in reality, this method has a problem in terms of costs for administering and maintaining the servers. Second, a P2P communication path cannot be established with this method in the case where one of the two communication terminals is connected to a router other than a Cone NAT router.

With the method disclosed by Japanese Laid-Open Publication No. 2004-180003, the probability that a P2P communication path is established is increased regardless of the NAT type of the router connected to each communication terminal (regardless of whether each router is a Cone NAT router or a Symmetric NAT router). In more detail, the terminal 1 estimates the port number possibly assigned in the router 1 the next time that the terminal 2 transmits a packet, based on the WAN-side port number of the router 2 notified by the server. The terminal 2 transmits a plurality of packets in order to increase the possibility that the port number assigned by the router 2 matches the port number estimated by the terminal 1.

However, in the case where the two communication terminals are both connected to a Full Cone NAT router, the port number can be easily estimated. Therefore, it is not necessary for one communication terminal to transmit a plurality of packets. Rather, the following problems occur by the transmission of a plurality of packets. First, the time required for establishing a communication path is extended by transmitting a plurality of unnecessary packets. Second, in the case where a router connected to either communication terminal has an invasion detection function, when the router receives a plurality of packets addressed to port numbers which are not used for communication, the router may incorrectly detect those packets as attempting illegal access. A router having an invasion detection function discards all the received packets when detecting illegal access. Therefore, the communication terminal connected to such a router may become incommunicable, which results in lower connectability.

SUMMARY OF THE INVENTION

Therefore, an object of the present invention is to provide a communication apparatus, a communication method and a communication system capable of examining a NAT type of each router using one server having one IP address. Another object of the present invention is to provide a communication apparatus, a communication system and a communication method capable of establishing a P2P communication path by an optimum connection procedure in accordance with the NAT type obtained by the examination. This shortens the time required for connection and improves the connectability between two communication terminals.

A first aspect of the present invention is directed to a communication apparatus connected to a server via a first relay apparatus having a NAT (network address translation) function. The communication apparatus comprises an address information examination request transmission section for executing, in an arbitrary order, first transmission processing of transmitting at least two address information examination request packets having an identical source port number and different destination port numbers to the server and second transmission processing of transmitting at least one address information examination request packet having a source port number which is different from the source port number used in the first transmission processing to the server; a communication preparation request transmission section for transmitting a communication preparation packet having a source port number which is identical to the source port number used in either the first transmission processing or the second transmission processing to a destination which is different from the server, between the first transmission processing and the second transmission processing; an address information receiving section for receiving, from the server, at least three address information packets each including, in a data section thereof, a relay port number translated by the NAT function of the first relay apparatus from a source port address of the respective address information examination request packet; and a relay characteristic determination section for determining a NAT type of the first relay apparatus based on the relay port numbers included in the received address information packets.

A communication apparatus defined by the first aspect refers to an address information packet returned from the server to acquire a port number set by the first relay apparatus. Thus, the communication apparatus can determine the NAT type of the first relay apparatus by communicating with one server.

A second aspect of the present invention is directed to a communication method by which a communication apparatus, connected to a server via a first relay apparatus having a NAT (network address translation) function, communicates. The communication method comprises executing, in an arbitrary order, first transmission processing of transmitting at least two address information examination request packets having an identical source port number and different destination port numbers to the server and second transmission processing of transmitting at least one address information examination request packet having a source port number which is different from the source port number used in the first transmission processing to the server; transmitting a communication preparation packet having a source port number which is identical to the source port number used in either the first transmission processing or the second transmission processing to a destination which is different from the server, between the first transmission processing and the second transmission processing; receiving, from the server, at least three address information packets each including, in a data section thereof, a relay port number translated by the NAT function of the first relay apparatus from a source port address of the respective address information examination request packet; and determining a NAT type of the first relay apparatus based on the relay port numbers included in the received address information packets.

A communication method defined by the second aspect allows a communication apparatus to refer to an address information packet returned from the server to acquire a port number set by the first relay apparatus. Thus, the communication apparatus can determine the NAT type of the first relay apparatus by communicating with one server.

A third aspect of the present invention is directed to a communication system comprising a server; a first relay apparatus having a NAT (network address translation) function; a second relay apparatus having a NAT function; a first communication apparatus connected to the server via the first relay apparatus; and a second communication apparatus connected to the server via the second relay apparatus.

Each of the first communication apparatus and the second communication apparatus included in the communication system may comprise an address information examination request transmission section for executing, in an arbitrary order, first transmission processing of transmitting at least two address information examination request packets having an identical source port number and different destination port numbers to the server and second transmission processing of transmitting at least one address information examination request packet having a source port number which is different from the source port number used in the first transmission processing to the server; a communication preparation request transmission section for transmitting a communication preparation packet having a source port number which is identical to the source port number used in either the first transmission processing or the second transmission processing to a destination which is different from the server, between the first transmission processing and the second transmission processing; an address information receiving section for receiving, from the server, at least three address information packets each including, in a data section thereof, a relay port number translated by the NAT function of the relay apparatus connected to the communication apparatus itself from a source port address of the respective address information examination request packet; and a relay characteristic determination section for determining a NAT type of the relay apparatus connected to the communication apparatus itself based on the relay port numbers included in the received address information packets.

The server included in the communication system may comprise an address information examination section for retrieving the relay port number included in each of the address information examination request packets transmitted from each of the first communication apparatus and the second communication apparatus; and an address information transmission section for transmitting an address information examination response packet including the retrieved relay port number in a data section thereof.

In a communication system defined by the third aspect, each the first and second communication apparatuses exchanges a packet with the server to determine the characteristic of the relay apparatus connected to the communication apparatus itself and also to notify the destination terminal of the determination result via the server. Therefore, each of the first and second communication apparatuses can obtain the NAT type of the relay apparatus connected to the communication apparatus itself and the NAT type of the relay apparatus connected to the destination terminal.

According to a communication apparatus, a communication system and a communication method of the present invention, the NAT type of a router can be examined by communicating with a server having one IP address.

According to a communication apparatus, a communication system and a communication method of the present invention, a P2P communication path can be efficiently established in accordance with an optimum connection sequence in accordance with the examined NAT type of the router.

In addition, according to a communication apparatus, a communication system and a communication method of the present invention, when communication terminals connected to different private networks establish a P2P communication path, "reduction in the time required for connection", "avoidance of an incommunicable state" and "improvement in the connectability" can be realized.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2B is a block diagram showing a general structure of a terminal shown in FIG. 1;

FIG. 2C is a block diagram showing a general structure of a server shown in FIG. 1;

FIG. 3 is a sequence diagram illustrating an overview of a processing procedure executed by a communication system according to this embodiment for establishing a P2P communication path;

FIG. 9A illustrates a connection sequence 2 shown in FIG. 7 in detail;

DESCRIPTION OF THE PREFERRED EMBODIMENTS

Figure 1:
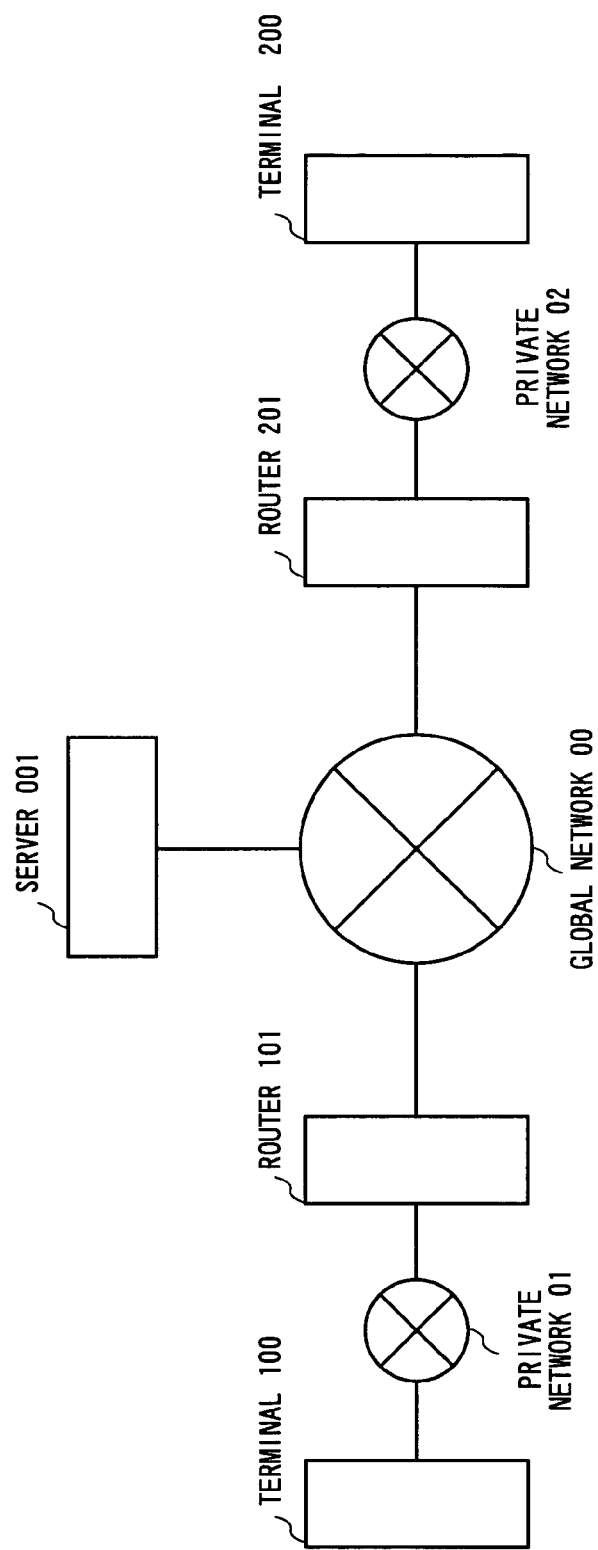
FIG. 1 is a block diagram showing an overall structure of a communication system according to one embodiment of the present invention.

FIG. 1 is a block diagram showing an overall structure of a communication system according to one embodiment of the present invention.

A global network 00 and a private network 01 are connected to each other via a router 101 having a global IP address [IPG1] The global network 00 and a private network 02 are connected to each other via a router 201 having a global IP address [IPG2]. The global network 00 is connected to a server 001 having a global IP address [IPS]. The private network 01 is connected to a terminal 100 having a local IP address [IPL1]. The private network 02 is connected to a terminal 200 having a local IP address [IPL2].

Figure 2A:
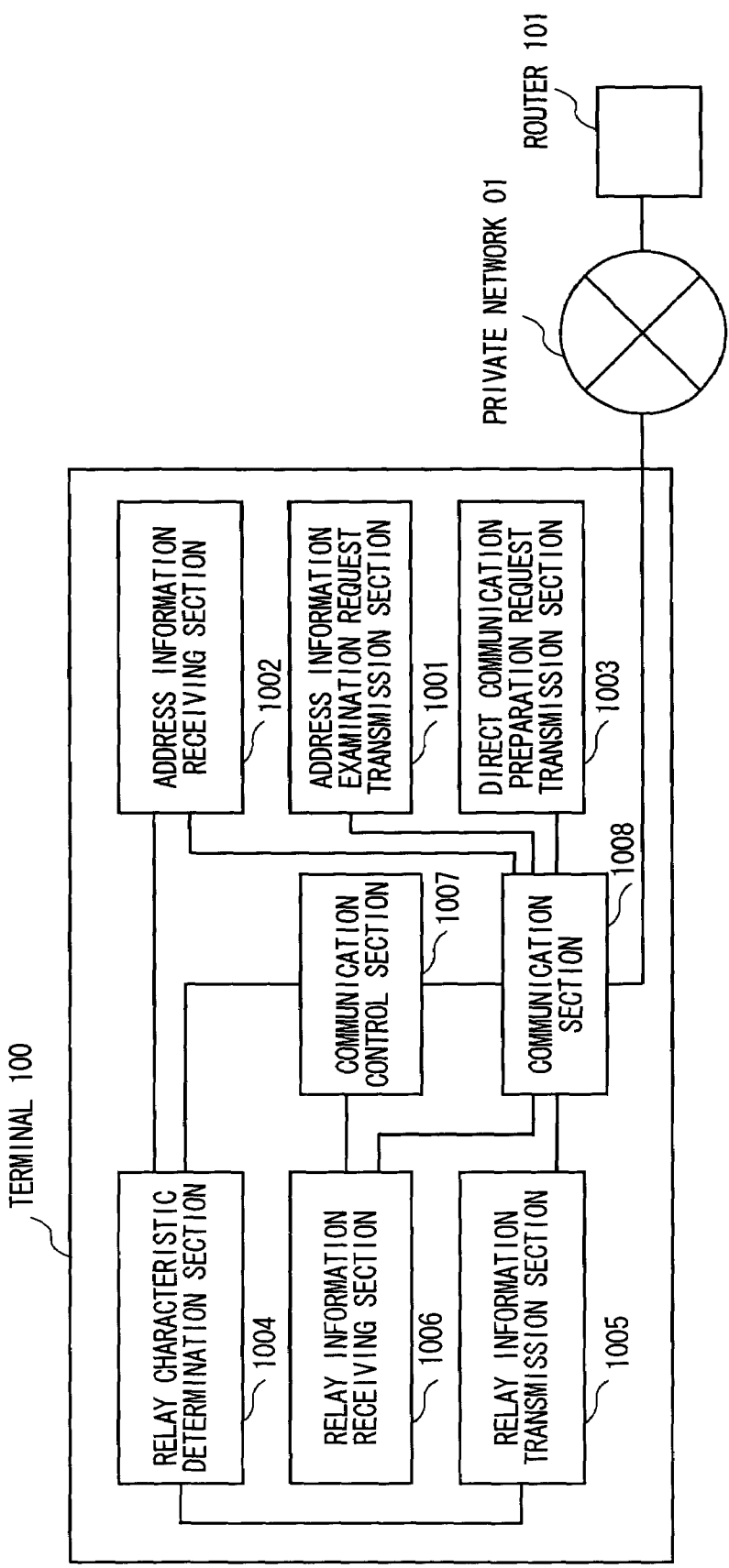
FIG. 2A is a block diagram showing a general structure of a terminal shown in FIG. 1.

FIG. 2A is a block diagram showing a general structure of the terminal 100 shown in FIG. 1.

The terminal 100 includes an address information examination request transmission section 1001, an address information receiving section 1002, a direct communication preparation request transmission section 1003, a relay characteristic determination section 1004, a relay information transmission section 1005, a relay information receiving section 1006, a communication control section 1007, and a communication section 1008.

The address information examination request transmission section 1001 transmits a port number examination request packet to the server 001 in order to examine a port number which is set by the NAT function of the router 101 for a packet transmitted from the terminal 100. In more detail, the address information examination request transmission section 1001 executes first transmission processing of transmitting at least two packets having different destination port numbers, and second transmission processing of transmitting at least one packet having a different source port number which is different from the source port number used in the first transmission processing. In the first transmission processing, it is preferable that the address information examination request transmission section 1001 transmits two packets having the same source port number and different destination port numbers. The order in which the first transmission processing and the second transmission processing are executed may be arbitrary.

The address information receiving section 1002 receives a port number examination response packet which is returned from the server 001 in response to the port number examination request packet. The port number examination response packet includes the port number set by the NAT function of the router 101 in a data section thereof.

The direct communication preparation request transmission section 1003 transmits a P2P communication preparation packet to another terminal connected to the global network 00 in a time period after one of the first transmission processing and the second transmission processing is executed before the other transmission processing is executed, in order to prepare a port for use in P2P communication on the router 101.

The relay characteristic determination section 1004 determines a NAT type of the router 101 based on the port number included in the data section of the port number examination response packet received by the address information receiving section 1002.

The relay information transmission section 1005 transmits a NAT information notification packet to the server 001 in order to notify the NAT type of the router 101 determined by the relay characteristic determination section 1004 to the terminal 200, which is to be communicated with the terminal 100, via the server 001.

The relay information receiving section 1006 receives a NAT information notification packet transmitted by the terminal 200 as the destination terminal of the terminal 100. The received NAT information notification packet includes information necessary for specifying a NAT type of the router 201 connected to the terminal 200 as the destination terminal.

The communication control section 1007 selects a sequence which is optimum for establishing P2P communication from a plurality of prepared sequences, based on a combination of the NAT type of the router 101 connected to the terminal 100 and the NAT type of the router 201 connected to the terminal 200 as the destination terminal of the terminal 100, and executes the selected sequence.

The communication section 1008 transmits a packet generated in each of the above-mentioned sections to the private network 01 and receives a packet addressed to the terminal 100 via the private network 01.

FIG. 2B is a block diagram showing a general structure of the terminal 200 shown in FIG. 1.

The terminal 200 includes an address information examination request transmission section 2001, an address information receiving section 2002, a direct communication preparation request transmission section 2003, a relay characteristic determination section 2004, a relay information transmission section 2005, a relay information receiving section 2006, a communication control section 2007, and a communication section 2008. The functions of the sections 2001 through 2008 are substantially the same as those of the sections 1001 through 1008 shown in FIG. 2A, and will not be described again here.

FIG. 2C is a block diagram showing a general structure of the server 001 shown in FIG. 1.

The server 001 includes an address information examination section 0011, an address information transmission section 0012, a relay information forwarding section 0013, and a communication section 0014.

Upon receipt of a port number examination request packet from the terminal 100 or 200, the address information examination section 0011 retrieves a source port number included in the header of the received packet. The source port number retrieved by the address information examination section 0011 is a value set by the NAT function of the router 101 or 201. The address information examination section 0011 outputs the retrieved port number to the address information transmission section 0012.

The address information transmission section 0012 generates a port number examination response packet including the port number received from the address information examination section 0011 in a data section thereof, and returns the generated packet to the respective terminal.

Upon receipt of a NAT information notification packet from one of the terminals 100 and 200, the relay information forwarding section 0013 forwards the received NAT information notification packet to the other terminal.

The communication section 0014 transmits a packet generated in each of the above-mentioned sections to the global network 00, and receives a packet addressed to the server 001 via the global network 00.

Hereinafter, a control sequence in a communication system according to this embodiment will be described.

FIG. 3 is a sequence diagram illustrating an overview of a processing procedure executed by the communication system according to this embodiment for establishing a P2P communication path.

As shown in FIG. 3, a P2P communication path establishment method according to this embodiment includes four phases, i.e., a NAT type examination phase S801, a preparation phase S802, an information exchange phase S803, and a P2P communication path establishment phase P804.

In the NAT type examination phase S801, the terminal 100 communicates with the server 001 to examine the NAT type (for example, a Cone NAT router or a Symmetric NAT router) of the router 101 connected to the terminal 100. The terminal 100 also examines whether or not the router 101 is the Port Reuse NAT router. Similarly, the terminal 200 communicates with the server 001 to examine the NAT type of the router 201 and whether or not the router 201 is the Port Reuse NAT router.

In the preparation phase S802, the terminal 100 transmits a packet to the router 101 connected to the terminal 100 itself to open a port of the router 101 to be used for the communication with the terminal 200. Similarly, the terminal 200 transmits a packet to the router 201 connected to the terminal 200 itself to open a port of the router 201 to be used for the communication with the terminal 100.

In the information exchange phase S803, the terminals 100 and 200 exchange the NAT type determined in the NAT type examination phase S801 and information necessary for establishing a P2P communication path via the server 001.

In the P2P communication path establishment phase S804, the terminals 100 and 200 mutually transmit a packet based on the information acquired in the information exchange phase S803 and establish a P2P communication path.

In FIG. 3, the order of the NAT type examination phase S801 and the preparation phase S802 is specified for the sake of illustration, but the order of NAT type examination phase S801 and the preparation phase S802 is not limited to that shown in FIG. 3. The NAT type examination phase S801 and the preparation phase S802 only need to be completed before the information exchange phase S803.

Now, the four phases will be described in detail.

<NAT Type Examination Phase and the Preparation Phase>

Figure 4A:
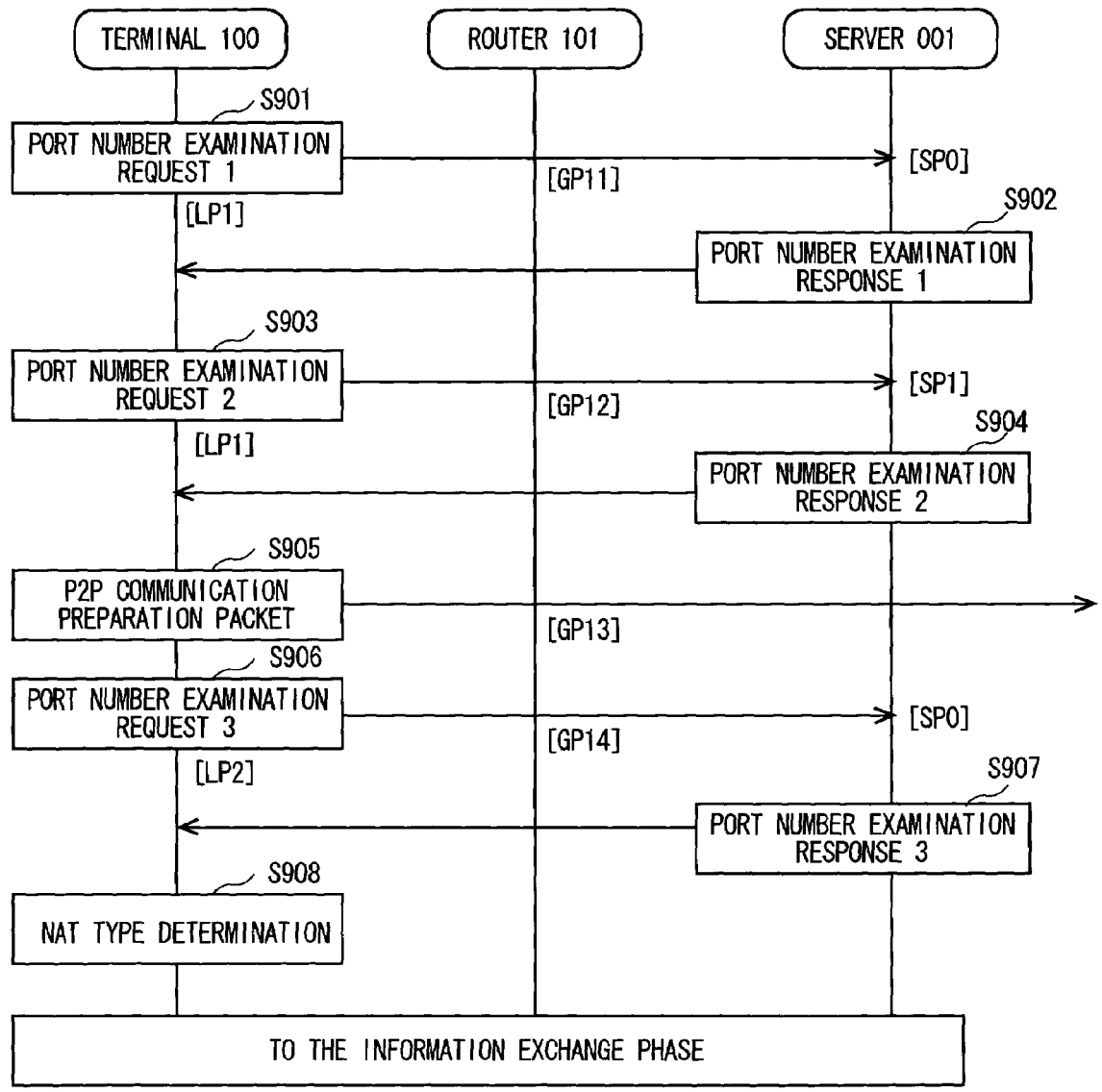
FIG. 4A is a sequence diagram illustrating detailed processing in a NAT type examination phase and a preparation phase shown in FIG. 3.

FIG. 4A is a sequence diagram illustrating detailed processing in the NAT type examination phase and the preparation phase shown in FIG. 3.

First, the terminal 100 transmits a port number examination request 1 to the server 001 (step S901). In more detail, the address information examination request transmission section 1001 transmits the port number examination request packet 1 having a port number [LP1] of the terminal 100 set as the source port number and a port number [SP0] of the server 001 set as the destination port number.

Next, in response to the port number examination request 1 transmitted from the terminal 100, the server 001 returns a port number examination response 1 to the terminal 100 (step S902). In more detail, the communication section 0014 receives the port number examination request packet 1 and forwards the received packet to the address information examination section 0011. The address information examination section 0011 refers to the header of the forwarded packet to retrieve a source port number, i.e., a port number [GP11] set by the router 101, and outputs the retrieved source port number [GP11] to the address information transmission section 0012.

The address information transmission section 0012 generates the port number examination response packet 1 including the port number [GP11] of the router 101 received from the address information examination section 0011, and outputs the generated packet to the communication section 0014. The communication section 0014 returns the packet received from the address information transmission section 0012 to the terminal 100. In the terminal 100, upon receipt of the port number examination response packet 1, the communication section 1008 forwards the packet to the address information receiving section 1002.

Next, the terminal 100 transmits a port number examination request 2 to the server 001 (step S903). In more detail, the address information examination request transmission section 1001 transmits the port number examination request packet 2 having the port number [LP1] of the terminal 100 set as the source port number and a port number [SP1] of the server 001 set as the destination port number.

Next, in response to the port number examination request 2 transmitted from the terminal 100, the server 001 returns a port number examination response packet 2 to the terminal 100 (step S904). In more detail, the communication section 0014 receives the port number examination request packet 2 and forwards the received packet to the address information examination section 0011. The address information examination section 0011 refers to the header of the forwarded packet to retrieve a source port number, i.e., a port number [GP12] of the router 101, and outputs the retrieved source port number [GP12] to the address information transmission section 0012.

Next, the terminal 100 transmits a P2P communication preparation packet to the terminal 200 (step S905). In more detail, the terminal 100 transmits a packet having an IP address and a port number of the terminal 200 set as the destination to the router 101 in order to prepare a port number [GP13] for use in the communication with the terminal 200. The terminal 100 may acquire the IP address and the port number of the terminal 200 in advance. Alternatively, the server 001 may set an IP address and a port number of the terminal 200 in the port number examination response packet 1 or 2, and the terminal 100 may refer to the received port number examination response packet to acquire the IP address and the port number of the terminal 200.

The destination port number of a packet transmitted from the terminal 100 is preferably a port number actually used by the router 201 (for example, a port number assigned by the router 201 to a packet from the terminal 200 while the terminal 200 is communicating with the server 001), for the following reason. In the case where the router 201 has an invasion detection function, when the router 201 receives a P2P communication preparation packet, having a destination port number which is not used by the router 201 for communication, from the terminal 100, the router 201 may incorrectly detect the packet as attempting illegal access. When detecting a packet attempting illegal access, the router 201 discards all the subsequent packets transmitted from the terminal 100. Therefore, the terminal 100 may become incommunicable with the terminal 200.

Alternatively, the terminal 100 may adjust the value of TTL (Time To Live) of the P2P communication preparation packet such that the packet does not reach the router 201. The purpose of the terminal 100 of transmitting a P2P communication preparation packet is to prepare a port number for P2P communication with the terminal 200 in the router 101 connected to the terminal 100 itself. The P2P communication preparation packet does not need to reach the router 201. Therefore, the terminal 100 may adjust the value of TTL such that the P2P communication preparation packet reaches the router 101 but does not reach the router 201.

In step S905, the router 101 sets the NAT so as to be able to receive a packet transmitted from the terminal 200 to the router 101 (IPG1, GP13) via the router 201. The method by which the router 101 sets the NAT varies in accordance with the NAT type (FIG. 18A through FIG. 18E) and will not be described here.

Next, the terminal 100 transmits a port number examination request 3 to the server 001 (step S906). In more detail, the address information examination request transmission section 1001 transmits, as the port number examination request 3, a packet having a port number [LP2] of the terminal 100 set as the source port number and the port number [SP0] of the server 001 set as the destination port number.

In response to the port number examination request 3 transmitted from the terminal 100, the server 001 returns a port number examination response 3 to the terminal 100 (step S907). In more detail, the communication section 0014 receives the port number examination request packet 3 and forwards the received packet to the address information examination section 0011. The address information examination section 0011 refers to the header of the forwarded packet to retrieve a source port number, i.e., a port number [GP14] of the router 101, and outputs the retrieved source port number [GP14] to the address information transmission section 0012.

Upon receipt of the port number examination response packets 1 through 3, the terminal 100 determines the NAT type of the router 101 (step S908). In more detail, in the terminal 100, the relay characteristic determination section 1004 determines the NAT type of the router 101 in accordance with the following flow based on the port numbers [GP11], [GP12] and [GP14] of the router 101 included in the port number examination response packets 1 through 3.

Figure 4B:
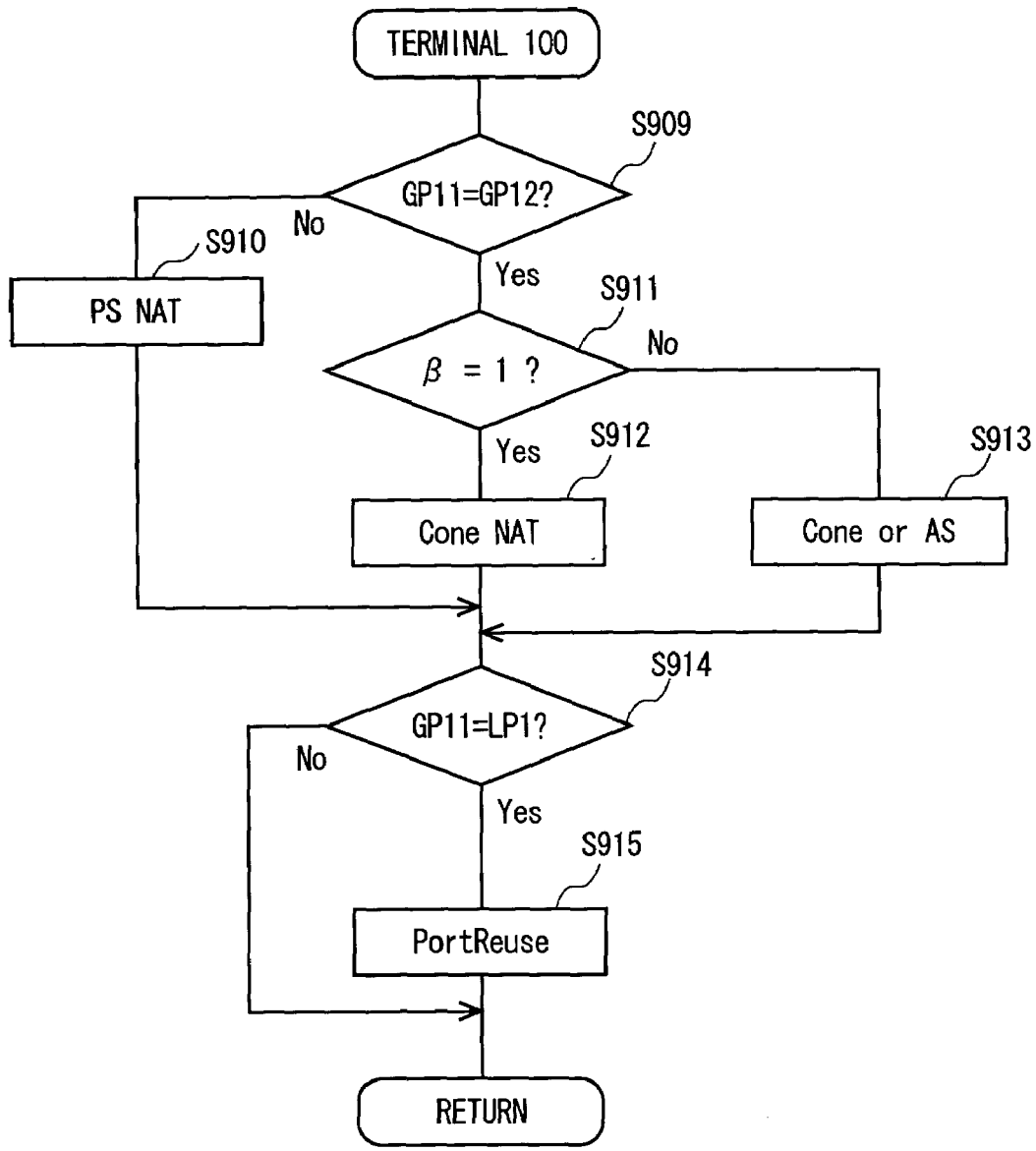
FIG. 4B is a flowchart illustrating detailed processing of step S908 shown in FIG. 4A.

FIG. 4B is a flowchart illustrating detailed processing of step S908 shown in FIG. 4A.

The relay characteristic determination section 1004 first determines whether or not the acquired port numbers [GP11] and [GP12] match each other (step S909). When the port numbers [GP11] and [GP12] match each other (Yes in step S909), the relay characteristic determination section 1004 advances to step S911. When the port numbers [GP11] and [GP12] do not match each other (No in step S909), the relay characteristic determination section 1004 determines that the router 101 is a PS NAT router (step S910) and advances to step S914.

When the port numbers [GP11] and [GP12] match each other (Yes in step S909), the relay characteristic determination section 1004 calculates an absolute value β of a difference between the acquired port numbers [GP12] and [GP14], and determines whether or not β is 1 (step S911). When β is 1, the relay characteristic determination section 1004 determines that the router 101 is a Cone NAT router (step S912) and advances to step S914. Otherwise, the relay characteristic determination section 1004 determines that the router 101 is a Cone NAT router or an AS NAT router (step S913) and advances to step S914.

The relay characteristic determination section 1004 also determines whether or not the port number [GP11] of the router 101 acquired in step S902 matches the source port number [LP1] of the port number examination request packet 1 transmitted in step S901 (step S914). When [GP11] matches [LP1] (Yes in step S914), the relay characteristic determination section 1004 determines that the router 101 is the Port Reuse NAT router (step S915) and terminates the NAT type determination processing. Otherwise, the relay characteristic determination section 1004 terminates the NAT type determination processing.

In order to strictly determine whether or not the router 101 is a Port Reuse NAT router, the relay characteristic determination section 1004 may further determine whether or not the port numbers [GP14] and [LP2] match each other. When [GP11] matches [LP1] and further [GP14] matches [LP2], the relay characteristic determination section 1004 determines that the router 101 is a Port Reuse NAT router. In order to roughly determine whether or not the router 101 is a Port Reuse NAT router, the relay characteristic determination section 1004 may determine that the router 101 is a Port Reuse NAT router when confirming that either [GP11] matches [LP1] or that [GP14] matches [LP2]. The processing in steps S914 and S915 of determining whether or not the router 101 is a Port Reuse NAT router may be executed before step S909.

By the above-described NAT type determination processing, the terminal 100 can examine the NAT type of the router 101.

Specific examples of the NAT type determination processing will be described.

Figure 5A:
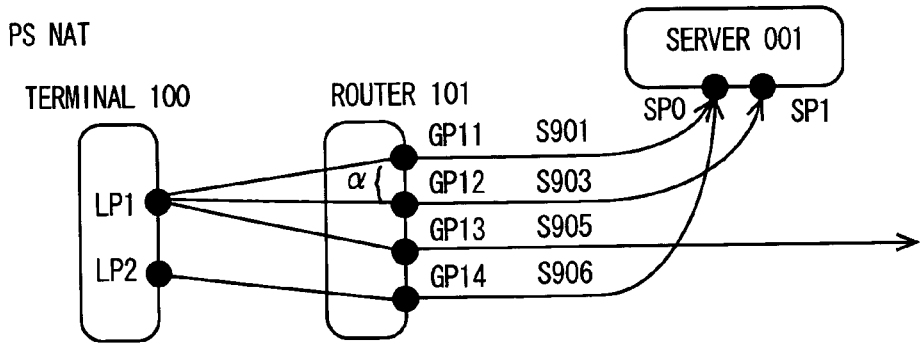
FIG. 5A illustrates step S910 shown in FIG. 4A.

FIG. 5A illustrates step S910 shown in FIG. 4A.

When the relay characteristic determination section 1004 determines No in step S909, i.e., that [GP11] does not match [GP12], this means that the router 101 has assigned different port numbers to the destination port numbers [SP0] and [SP1]. Therefore, the relay characteristic determination section 1004 can determine that the router 101 is the PS NAT router.

Figure 5B:
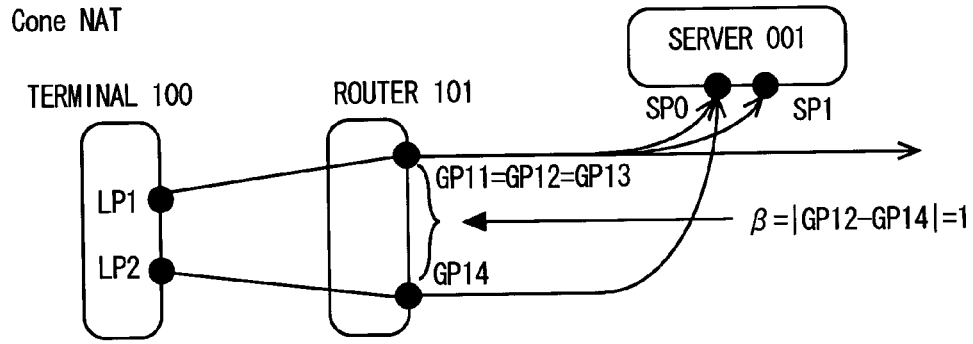
FIG. 5B illustrates step S912 shown in FIG. 4A.

FIG. 5B illustrates step S912 shown in FIG. 4A.

When the relay characteristic determination section 1004 determines Yes in step S911, i.e., that the absolute value β of the difference between [GP12] and [GP14] is 1, this means that the port number [GP13] assigned by the router 101 to the destination port number of the P2P communication preparation packet matches [PG11] and [GP12]. Therefore, the relay characteristic determination section 1004 can determine that the router 101 is the Cone NAT router.

Figure 5C:
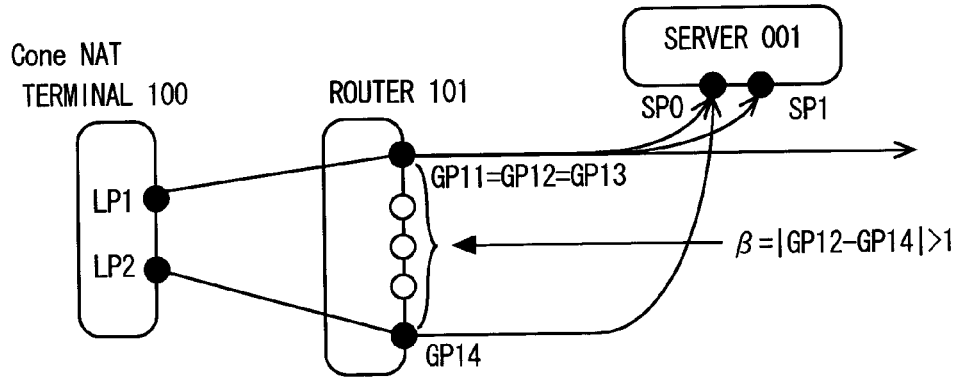
FIG. 5C illustrates step S913 shown in FIG. 4A.
Figure 5D:
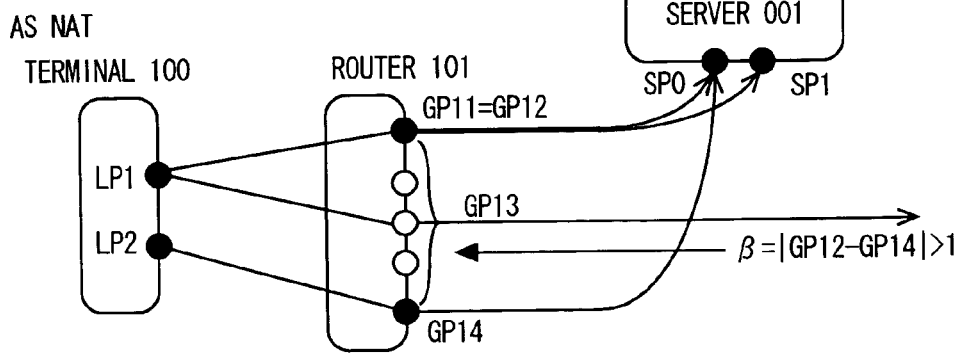
FIG. 5D illustrates step S913 shown in FIG. 4A.

FIG. 5C and FIG. 5D each illustrate step S913 shown in FIG. 4A.

When the relay characteristic determination section 1004 determines No in step S911, i.e., that the absolute value β of the difference between [GP12] and [GP14] is not 1, the port number [GP13] assigned by the router 101 to the destination port number of the P2P communication preparation packet may match [PG11] and [GP12] (FIG. 5C) or may not match [GP11] and [GP12] (FIG. 5D). Therefore, the relay characteristic determination section 1004 can determine that the router 101 is the Cone NAT router or the AS NAT router.

The terminal 200 examines the NAT type of the router 201 in accordance with substantially the same procedure as that shown in FIG. 4A and FIG. 4B, and the router 201 opens a port for use in the P2P communication.

FIG. 4A shows the NAT type examination phase (steps S901 through S904 and S906 through S908) and the preparation phase (step S905) together, but the NAT type examination phase and the preparation phase may be separated from each other.

In step S913, when β is not 1, the relay characteristic determination section 1004 does not distinguish whether the router 101 is the Cone NAT router or the AS NAT router. The reason for this is that a P2P communication path can be established with no such distinguishing in the P2P communication establishment phase described later. The terminal 100 may execute the following processing in order to distinguish whether the router 101 is the Cone NAT router or the AS NAT router.

In the terminal 100, the address information examination request transmission section 1001 further transmits a packet having an IP address different from the IP address [IPS] of the server 001 as the destination, and the port number [LP1] set as the source, as a port number examination request. The address information receiving section 1002 receives a response packet to the port number examination request packet and determines whether or not a port number [GP15] assigned by the router 101 to the port number examination request packet matches [GP11]. When [GP15] matches [GP11], the relay characteristic determination section 1004 can determine that the router 101 is the Cone NAT router. Otherwise, the relay characteristic determination section 1004 can determine that the router 101 is the AS NAT router.

The NAT type examination phase and the preparation phase do not need to be executed in the order described in this embodiment. The terminals 100 and 200 may execute the steps in a different order from that described in this embodiment as long as the NAT type examination phase and the preparation phase are completed before the information exchange phase.

<Information Exchange Phase>

Figure 6:
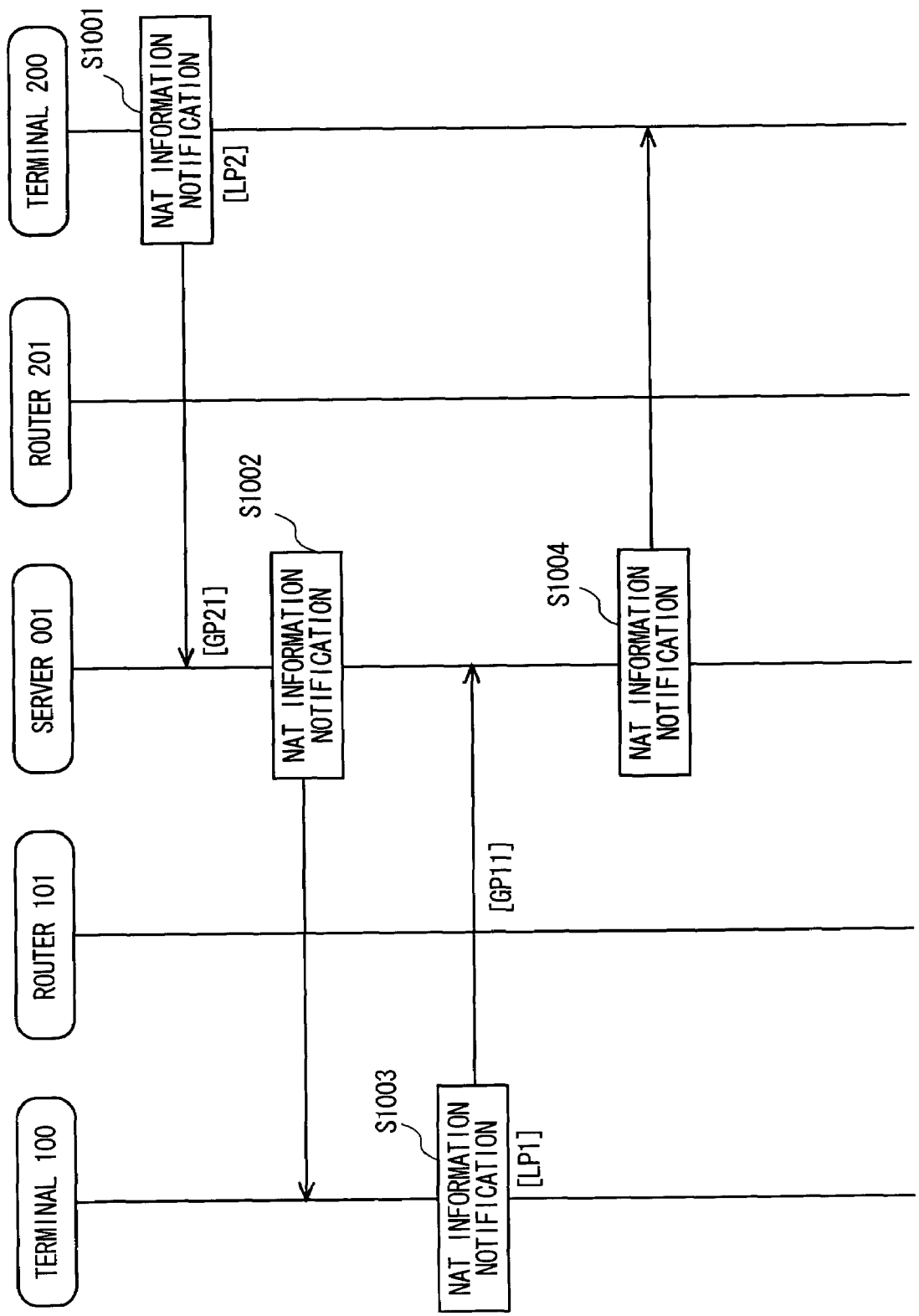
FIG. 6 is a sequence diagram illustrating detailed processing in an information exchange phase shown in FIG. 3.

FIG. 6 is a sequence diagram illustrating detailed processing in the information exchange phase shown in FIG. 3.

First, the terminal 200 notifies the server 001 of NAT information representing the NAT type of the router 201 connected to the terminal 200 itself (step S1001). In more detail, the relay information transmission section 2005 generates a packet including the NAT information representing the NAT type of the router 201 acquired in the NAT type examination phase in a data section thereof, and transmits the generated packet to the server 001 via the communication section 2008.

The NAT information includes information representing whether the router 201 is (a) the Cone NAT router, (b) the Cone NAT router or the AS NAT router or (c) the PS NAT router, and also includes information representing the router 201 is (d) the Port Reuse NAT router.

The NAT information includes the following parameters when necessary.

(a) In the case where the router 201 is the Cone NAT router, the NAT information includes at least a value of a port number [GP22] (=[GP24]).

(b) In the case where the router 201 is the Cone NAT router or the AS NAT router, the NAT information includes at least values of port numbers [GP22] and [GP24].

(c) In the case where the router 201 is the PSNAT router, the NAT information includes at least a difference α between port numbers [GP21] and [GP22], and the port number [GP24].

(d) In the case where the router 201 is the Port Reuse NAT router in addition to one of (a) through (c), the NAT information includes at least a port number [LP4] planned to be newly opened by the terminal 200 in the subsequent P2P communication path establishment phase. In the case where the router 201 is the Symmetric NAT router, the port number [LP4] needs to be a new number, whereas in the case where the router 201 is the Cone NAT router, the port number [LP4] may be any one of [GP21] through [GP24].

Upon receipt of a NAT information notification packet, the server 001 forwards the received NAT information notification packet to the terminal 100 (step S1002). In more detail, in the server 001, the relay information forwarding section 0013 receives the NAT information notification packet transmitted from the terminal 200 via the communication section 0014, and transmits the received NAT information notification packet to the terminal 100 via the communication section 0014.

Next, the terminal 100 notifies the server 001 of NAT information representing the NAT type of the router 101 connected to the terminal 100 itself (step S1003). In more detail, the relay information transmission section 1005 generates a packet including the NAT information representing the NAT type of the router 101 acquired in the NAT type examination phase, and transmits the generated packet to the server 001 via the communication section 1008. The NAT information transmitted from the terminal 100 to the server 001 is substantially the same as the information transmitted from the terminal 200 to the server 001, and will not be described again here.

Upon receipt of the NAT information notification packet, the server 001 forwards the received NAT information notification packet to the terminal 200 (step S1004). In more detail, in the server 001, the relay information forwarding section 0013 receives the NAT information notification packet transmitted from the terminal 100 via the communication section 0014, and transmits the received NAT information notification packet to the terminal 200 via the communication section 0014.

In this embodiment, the terminals 100 and 200 each notify the server 001 of the NAT type and the parameters in accordance with the NAT type as the NAT information. Alternatively, the terminals 100 and 200 may each notify the server 001 of three port numbers (the port numbers [GP11], [GP12] and [GP14], or the port numbers [GP21], [GP22] and [GP24]). In this case, the terminals 100 and 200 may each determine the NAT type of each of the routers 101 and 201 and calculate the value of α in accordance with the processing flow shown in FIG. 4B based on the three port numbers acquired from the server 001. Alternatively, the server 001 may determine the NAT type of each of the routers 101 and 201 in accordance with the processing flow shown in FIG. 4B based on the three port numbers acquired from each of the terminals 100 and 200 notify the determined NAT type of each of the routers 101 and 201 to the terminals 200 and 100.

In the above description, the NAT information includes information exemplified in items (a) through (d). Alternatively, the NAT information may include other information. For example, the NAT information may include two values defined by $\Delta 1=|[GP12]-[GP11]|$ and $\Delta 2=|[GP14]-[GP12]|$. In this case, the relay characteristic determination section 1004 may obtain the two values of $\Delta 1$ and $\Delta 2$. Then, when the conditions of $\Delta 1=0$ and $\Delta 2=0$ are fulfilled, the relay characteristic determination section 1004 may determine that the router is the Cone NAT router. When the condition of $\Delta 2>1$ is fulfilled, the relay characteristic determination section 1004 may determine that the router is the AS NAT router. When the condition of $\Delta 1\neq 0$ is fulfilled, the relay characteristic determination section 1004 may determine that the router is the PS NAT router.

The NAT information may include any other information which is useful for at least one of the terminal 100, the terminal 200 and the server 001 to determine the NAT type of the respective router(s), in addition to the above-described information.

In this embodiment, the terminal 200 first transmits the NAT information notification packet. Alternatively, the terminal 100 may first transmit the NAT information notification packet.

<P2P Communication Path Establishment Phase>

Figure 7:
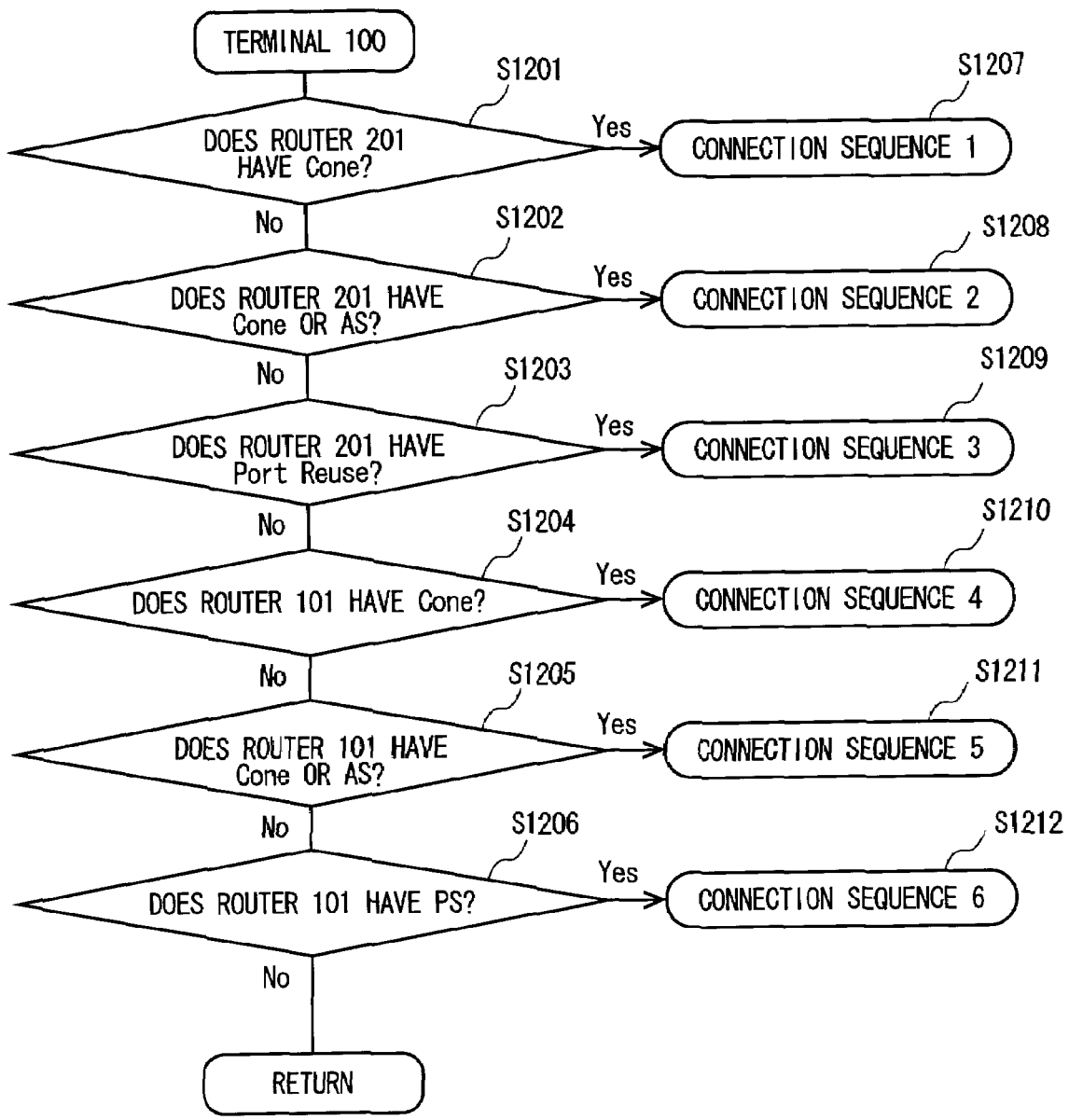
FIG. 7 is a flowchart illustrating processing executed by the terminal in a P2P communication path establishment phase shown in FIG. 3.

FIG. 7 is a flowchart illustrating processing executed by the terminal 100 in the P2P communication path establishment phase shown in FIG. 3. In the P2P communication path establishment phase, the terminals 100 and 200 each attempt to establish a P2P communication path using the parameters acquired in the information exchange phase.

First, the communication control section 1007 determines whether or not the router 201 is the Cone NAT router (step S1201). When it is determined that the router 201 is a Cone NAT router (Yes in step S1201), the communication control section 1007 advances to step S1207 described alter, and transmits a P2P start request packet having the port number [GP22] of the router 201 set as the destination port number.

When it is determined that the router 201 is not the Cone NAT router (No in step S1201), the communication control section 1007 determines whether or not the router 201 is either one of the Cone NAT router and the AS NAT router (step S1202). When it is determined that router 201 is either one of the Cone NAT router and the AS NAT router (Yes in step S1202), the communication control section 1007 advances to step S1208 described later and transmits a plurality of P2P start request packets each having a value in the range of [GP22] or greater and less than [GP24] set as the destination port number.

When it is determined that router 201 is neither the Cone NAT router nor the AS NAT router (No in step S1202), the communication control section 1007 determines whether or not the router 201 is the Port Reuse NAT router (step S1203). When it is determined that the router 201 is the Port Reuse NAT router (Yes in step S1203), the communication control section 1007 transmits a P2P start request packet having the port number [LP4] set as the destination port number without considering the NAT type of the router 201. When it is determined that the router 201 is not the Port Reuse NAT router (No in step S1203), the communication control section 1007 advances to step S1204.

The communication control section 1007 reaches step S1204 when the router 201 is neither the Cone NAT router nor the AS NAT router, i.e., when the router 201 is the PS NAT router. In this case, the terminal 100 needs to select which processing to execute in consideration of the NAT type of the router 101 connected to the terminal 100 itself, as described below.

The communication control section 1007 determines whether or not the router 101 is specified to be the Cone NAT router (step S1204). When it is determined that the router 101 is specified to be the Cone NAT router (Yes in step S1204), the communication control section 1007 advances to step S1210 described later and transmits a P2P start request packet having a port number [GP24+α2] set as the destination port number.

When it is determined that the router 101 is not specified to be the Cone NAT router (No in step S1204), the communication control section 1007 determines whether or not the router 101 is either one of the Cone NAT router and the AS NAT router (step S1205). When it is determined that the router 101 is either one of the Cone NAT router and the AS NAT router (Yes in step S1205), the communication control section 1007 advances to step S1211 described later and transmits a plurality of P2P start request packets each having a value in the range of [GP24+α2] or greater and less than [GP24+(n−1)× α2] set as the destination port number. Here, "n" is an arbitrary positive integer.

When it is determined that the router 101 is neither a Cone NAT router nor the AS NAT router (No in step S1205), the communication control section 1007 determines whether or not the router 101 is the PS NAT router (step S1206). When it is determined that the router 101 is the PS NAT router (Yes in step S1206), the communication control section 1007 advances to step S1212 described later and transmits a P2P start request packet having the port number [GP24+α2] set as the destination port number. When it is determined that the router 101 is not the PS NAT router (No in step S1206), the communication control section 1007 returns.

The processing executed by the communication control section 2007 in the terminal 200 in the P2P communication path establishment phase is substantially the same as the processing executed by the communication control section 1007 in the terminal 100 and will not be described again here.

In the sequence diagram in shown in FIG. 7, one example of the order of the determinations is illustrated. The determinations may be made in a different order from that shown in FIG. 7. For example, the determination on whether or not the router 101 is the Port Reuse NAT router (step S1203) may be made first.

Hereinafter, steps S1207 through S1212 will be each described in detail.

<Connection Sequence 1: in the Case where the Router 201 is a Cone NAT Router>

Figure 8:
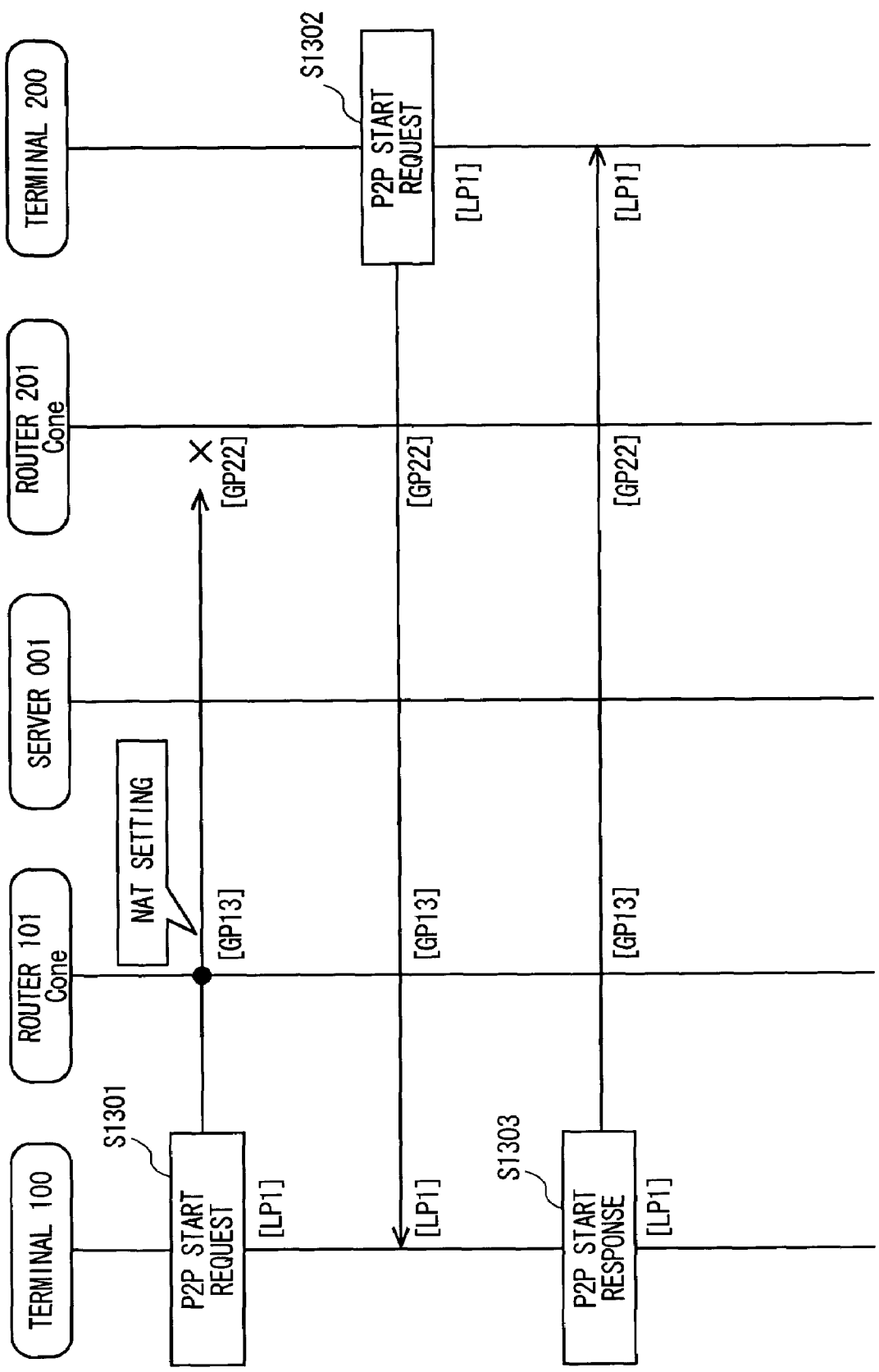
FIG. 8 illustrates a connection sequence 1 shown in FIG. 7 in detail.

FIG. 8 illustrates a connection sequence 1 shown in FIG. 7 in detail. In FIG. 8, the router 101 is also assumed to be a Cone NAT router for the simplicity of description.

As described above, the terminal 100 recognizes that the router 201 connected to the terminal 200 is the Cone NAT router based on the information notified from the terminal 200 in steps S1001 and S1002 of the information exchange phase (FIG. 6). The terminal 100 also recognizes the port numbers [GP22] and [GP24] opened by the router 201 in the NAT type examination phase and the preparation phase. Since the router 201 is the Cone NAT router, the terminal 100 can estimate that the port number of the router 201 used by the terminal 200 for the P2P communication is [GP22].

Therefore, the communication control section 1007 transmits a packet having [LP1] set as the source port number and [GP22] set as the destination port number, as a P2P start request (step S1301). The router 101 assigns the port number [GP13] to the packet transmitted from the terminal 100.

At this stage, the router 201 has not set the NAT so as to forward a packet which is transmitted from the terminal 100 and has [GP22] set as the destination port number. Therefore, the router 201 discards the P2P start request transmitted in step S1301 without forwarding the same to the terminal 200. At this stage, the router 101 sets the NAT so as to forward a packet, having the port number [GP22] of the router 201 set as the source port number and (IPG1, GP13) set as the destination IP address and the destination port number, to the terminal 100 (IPL1, LP1).

The terminal 200 acquires information which indicates that the router 101 connected to the terminal 100 is the Cone NAT router based on the information notified from the terminal 100 in the information exchange phase, and also acquires information representing the port numbers [GP12] and [GP14] opened by the router 101 in the NAT type examination phase and the preparation phase. Upon acquiring the information regarding the NAT type of the router 101, the terminal 200 estimates that the port number used by the router 101 for the P2P communication is [GP12], based on that the router 201 is the Cone NAT router. The terminal 200 immediately transmits a packet having [LP1] set as the source port number and [GP12] set as the destination port number, as a P2P start request (step S1302). Since the router 101 is the Cone NAT router, the port number [GP12] is the same as [GP13].

The router 101 forwards the P2P start request packet transmitted from the terminal 200 to the terminal 100. In the terminal 100, in response to the P2P start request packet forwarded from the router 101, the communication control section 1007 transmits a P2P start response packet to the terminal 200 via the communication section 1008 (step S1303).

In the case where the router 201 is the Cone NAT router, a P2P communication path can be established between the terminal 100 and the terminal 200 in accordance with the above-described processing procedure.

<Connection Sequence 2: in the Case where the Router 201 is Either a Cone NAT Router or an AS NAT Router>

Figure 9B:
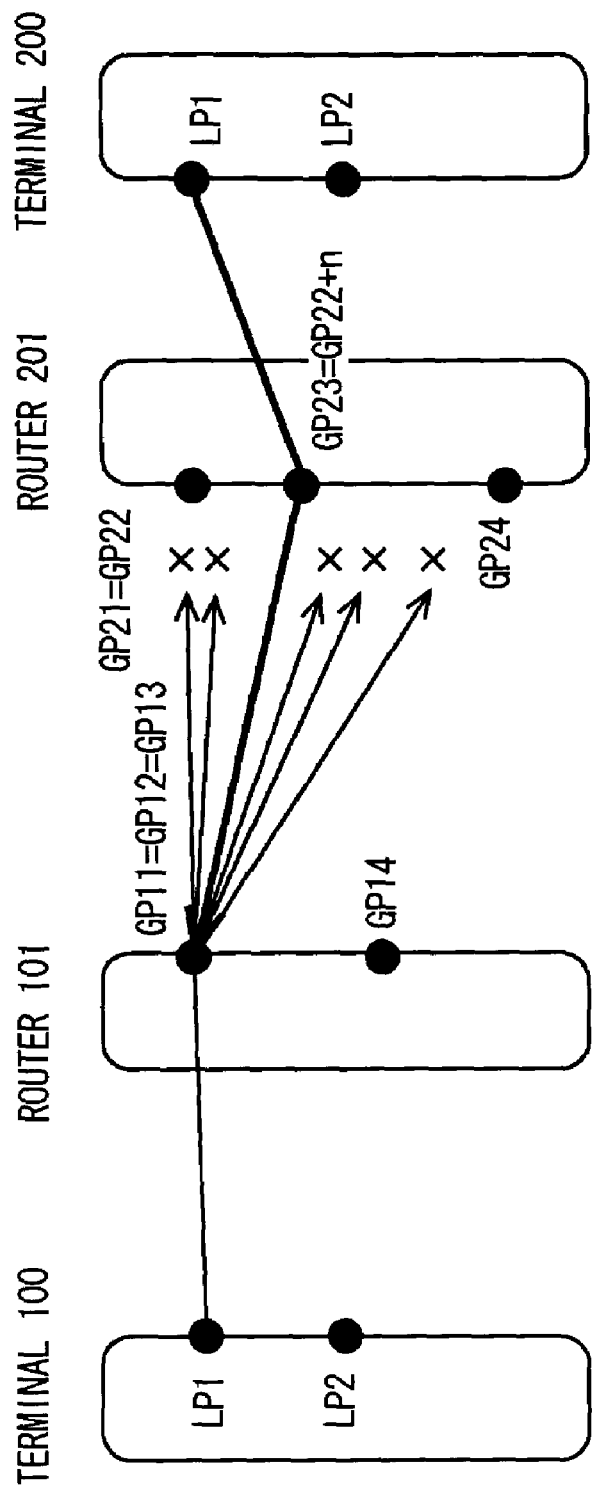
FIG. 9B shows port numbers shown in FIG. 9A.

FIG. 9A illustrates a connection sequence 2 shown in FIG. 7 in detail. FIG. 9B shows port numbers shown in FIG. 9A. In FIG. 9A, the router 101 is also assumed to be a Cone NAT router for the simplicity of description.

Applying the situation shown in FIG. 5A to the terminal 200, in the case where the router 201 is the Cone NAT router, it is estimated that the port number assigned by the router 201 to the P2P communication is [GP22].

Next, applying the situation shown in FIG. 5D to the terminal 200, in the case where the router 201 is the AS NAT router, it is estimated that the port number assigned by the router 201 to the P2P communication is either [GP22] or [GP24].

Therefore, in the terminal 100, the communication control section 1007 transmits a plurality of P2P start request packets each having [LP1] set as the source port number and a port number in the range of [GP22] or greater and less than [GP24] set as the destination port number (step S1401). The router 101 assigns the port number [GP13] prepared in the preparation phase to all the P2P start request packets.

At the stage when the P2P start request packets are transmitted in step S1401, the router 201 has not set the NAT so as to receive a packet having a port number in the range of [GP22] or greater and [GP24−1] or less as the destination port number. Accordingly, at this stage, the router 201 discards all the received P2P start request packets without forwarding the same to the terminal 200. The router 101 sets the NAT so as to forward a packet, having (IPG1, GP13) set as the destination and a port number in the range of [GP22] through [GP24−1] set as the source port number, to the terminal 100 (IPL1, LP1).

The terminal 200 acquires information which indicates that the router 101 connected to the terminal 100 is the Cone NAT router based on the information notified from the terminal 100 in the information exchange phase. The terminal 200 also acquires information representing the port numbers [GP12] and [GP14] opened by the router 101 in the NAT type examination phase and the preparation phase.

Upon acquiring the information regarding the NAT type of the router 101, the terminal 200 estimates that the port number used by the router 101 for the P2P communication is [GP12], based on that the router 101 is the Cone NAT router. The terminal 200 immediately transmits a packet having [LP1] set as the source port number and [GP12] set as the destination port number, as a P2P start request (step S1402). Since the router 101 is the Cone NAT router, the port number [GP12] is the same as [GP13].

In step S1401 described above, the router 101 has already set the NAT so as to able to receive a packet having [GP22+n] set as the source port number by transmitting the P2P start request packets. (Here, the following relationships are formed: [GP22]≦[GP22+n]<[GP24]; and [GP22+n]= [GP23].)

Accordingly, the router 101 forwards the P2P start request packet transmitted from the terminal 200 to the terminal 100. In the terminal 100, in response to the P2P start request packet forwarded from the router 101, the communication control section 1007 transmits a P2P start response packet to the terminal 200 via the communication section 1008 (step S1403).

In the case where the router 201 is either one of the Cone NAT router and the AS NAT router, a P2P communication path can be established between the terminal 100 and the terminal 200 in accordance with the above-described processing procedure.

As a modification, the following processing may be executed instead of step S1401 described above.

Figure 10:
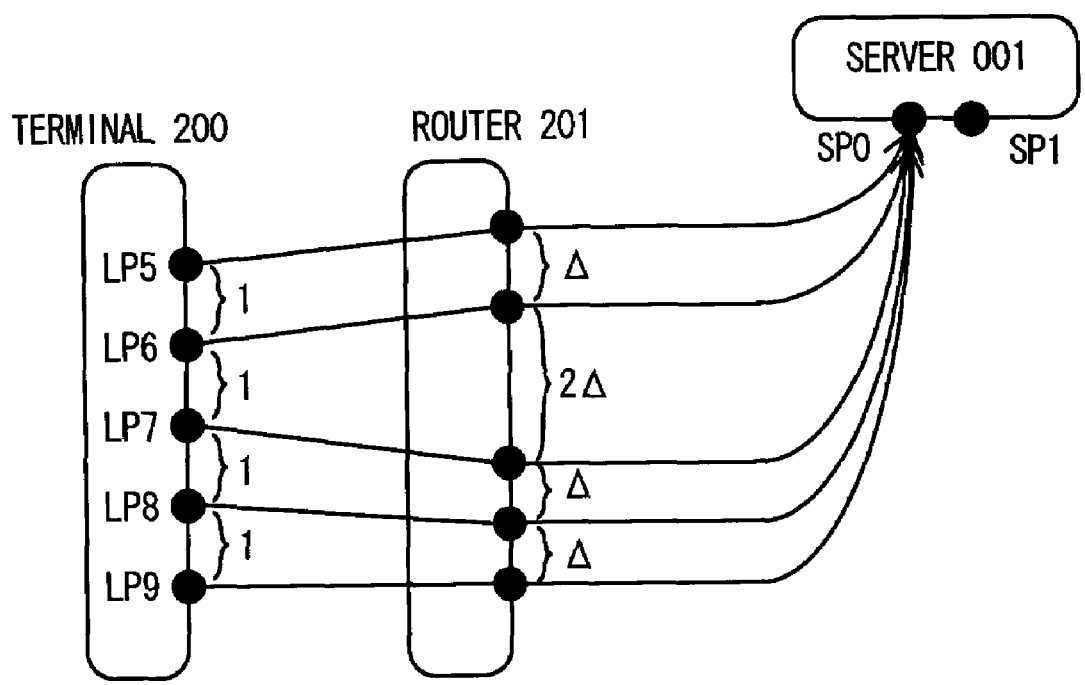
FIG. 10 illustrates a port number assigning interval of a router.

FIG. 10 illustrates a port number assigning interval of a router.

In the example shown in FIG. 9A, the terminal 100 transmits P2P start request packets, the destination port numbers of which are incremented one by one in the range of [GP22] or greater and less than [GP24]. The increment amount does not need to be one for the following reason.

For example, a certain type of routers have a function of detecting illegal invasion by determining whether or not the destination port number of a received packet is suitable to a predetermined port number assigning rule. If the router 201 has this type of invasion detection function, when the router 201 receives the P2P start request packets which are transmitted from the terminal 100 and have destination port numbers incremented one by one, the invasion detection function of the router 201 may be activated. The activation of the invasion detection function may cause the terminal 100 to be incommunicable with the terminal 200.

In consideration of the case where the router 201 has such an invasion detection function, the terminal 200 may acquire, in advance, a difference between the port numbers assigned to the router 201.

In more detail, as shown in FIG. 10, when it is determined that the router 201 is the Cone NAT router or the AS NAT router in the NAT type examination phase, the address information examination request transmission section 2001 transmits two or more port number examination request packets having a certain port number (for example, [SP0]) of the server 001 set as the destination port number and source port numbers incremented one by one.

In response to each of the port number examination request packets received, the server 001 transmits a response packet including the source port number translated by the router 201 to the terminal 200. In the terminal 200, the relay information transmission section 2005 refers to each of the response packets transmitted from the server 001 to examine the increments of the port numbers assigned by the router 201 to the port number examination response packets respectively. The terminal 200 transmits a minimum value of the increments of the port numbers to the terminal 100 by a NAT information notification packet as a port number assigning interval (Δ).

In step S1401, the communication control section 1007 in the terminal 100 can transmit a plurality of P2P start request packets, the destination port numbers of which are incremented by the port number assigning interval Δ in the range of [GP22] or greater and less than [GP24].

<Connection Sequence 3: in the Case where the Router 201 is a Port Reuse NAT Router>

Figure 11:
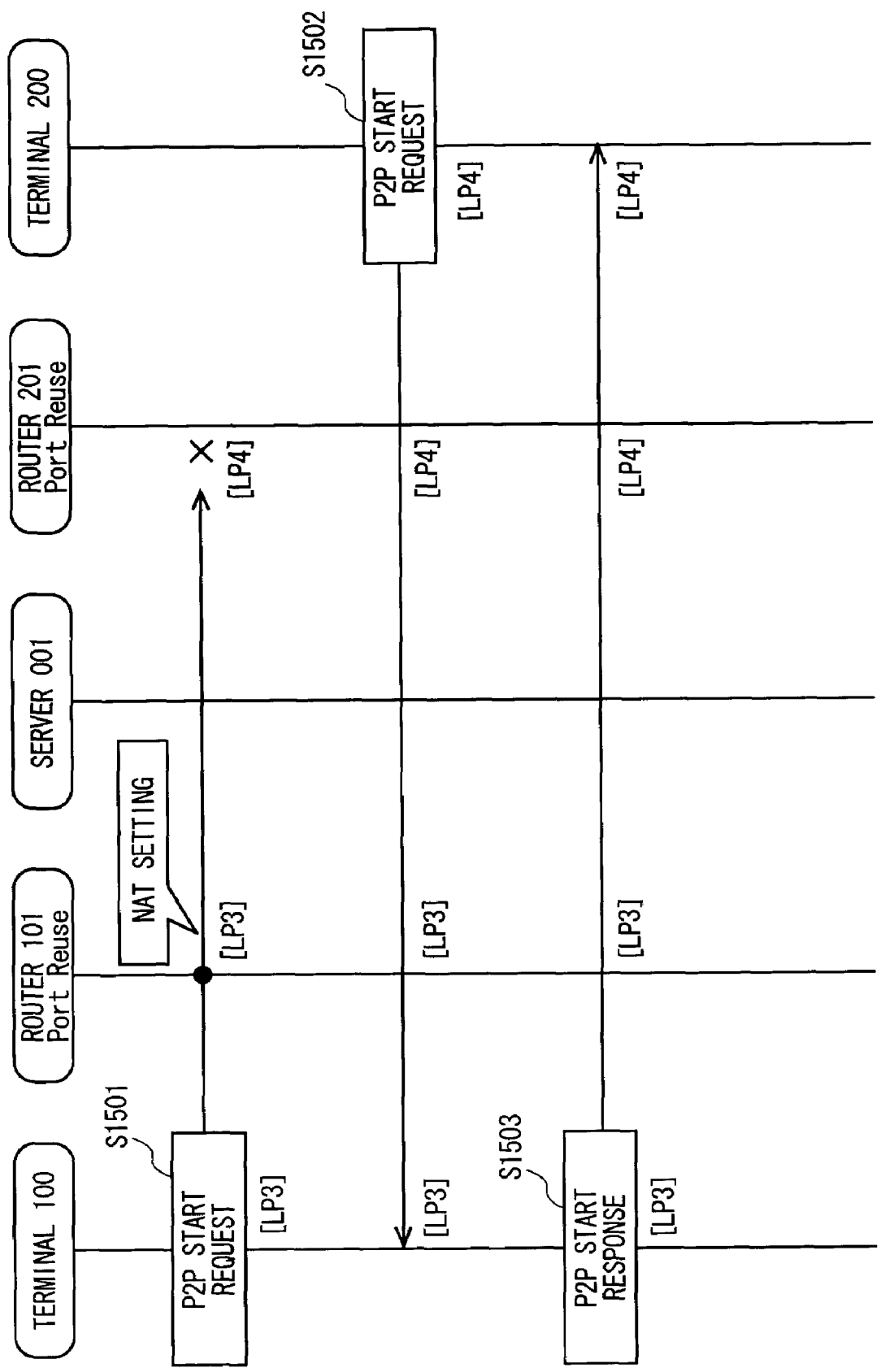
FIG. 11 illustrates a connection sequence 3 shown in FIG. 7 in detail.

FIG. 11 illustrates a connection sequence 3 shown in FIG. 7 in detail. In FIG. 11, the router 101 is also assumed to be a Port Reuse NAT router for the simplicity of description.

As described above, the terminal 100 acquires the information indicating that the router 201 connected to the terminal 200 is the Port Reuse NAT router based on the information notified from the terminal 200 in steps S1001 and S1002 of the information exchange phase (FIG. 6). In the NAT type examination phase and the preparation phase, the terminal 100 also acquires information representing the port number [LP4] planned to be opened by the router 201 for the P2P communication. Since the router 201 is the Port Reuse NAT router, it is estimated that when the terminal 100 transmits a packet having [LP4] set as the source port number, the router 201 assigns the port number [LP4] for forwarding the packet.

Therefore, the communication control section 1007 transmits a P2P start request packet having a port number [LP3] notified to the terminal 200 in steps S1003 and S1004 set as the source port number and [LP4] set as the destination port number (step S1501). The router 101, which is the Port Reuse NAT router, assigns a port number [LP3] to the P2P start request packet.

At the stage when the P2P start request packet is transmitted in step S1501, the router 201 has not set the NAT so as to be able to forward a packet having [LP4] set as the destination port number to the terminal 200. Accordingly, the router 201 discards the received P2P start request packet without forwarding the same to the terminal 200. The router 101 sets the NAT so as to forward a packet having (IPG1, LP3) set as the destination and [LP4] set as the source port number to the terminal 100 (IPL1, LP3) by forwarding the P2P start request packet.

The terminal 200 acquires information which indicates that the router 101 connected to the terminal 100 is the Port Reuse NAT router based on the information notified from the terminal 100 in the information exchange phase, and also acquires information representing the port number [LP3] of the terminal 100.

Immediately after acquiring the information regarding the NAT type of the router 101, the communication control section 2007 in the terminal 200 transmits a P2P start request packet having [LP3] set as the destination port number (step S1502).

The router 101 forwards the P2P start request packet transmitted from the terminal 200 to the terminal 100. In the terminal 100, in response to the P2P start request packet forwarded from the router 101, the communication control section 1007 transmits a P2P start response packet to the terminal 200 via the communication section 1008 (step S1503).

In the case where the router 201 is the Port Reuse NAT router, a P2P communication path can be established between the terminal 100 and the terminal 200 in accordance with the above-described processing procedure.

In the sequence diagram shown in FIG. 11, the terminal 100 transmits a P2P start request before the terminal 200. Alternatively, the terminal 200 may transmit a P2P start request before the terminal 100.

In order to increase the probability that a P2P communication path is successfully established in the P2P communication path establishment phase, the terminals 100 and 200 may mutually notify a plurality of port numbers in the information exchange phase.

<Connection Sequence 4: in the Case where the Router 201 is a PS NAT Router and the Router 101 is a Cone NAT Router>

Figure 12A:
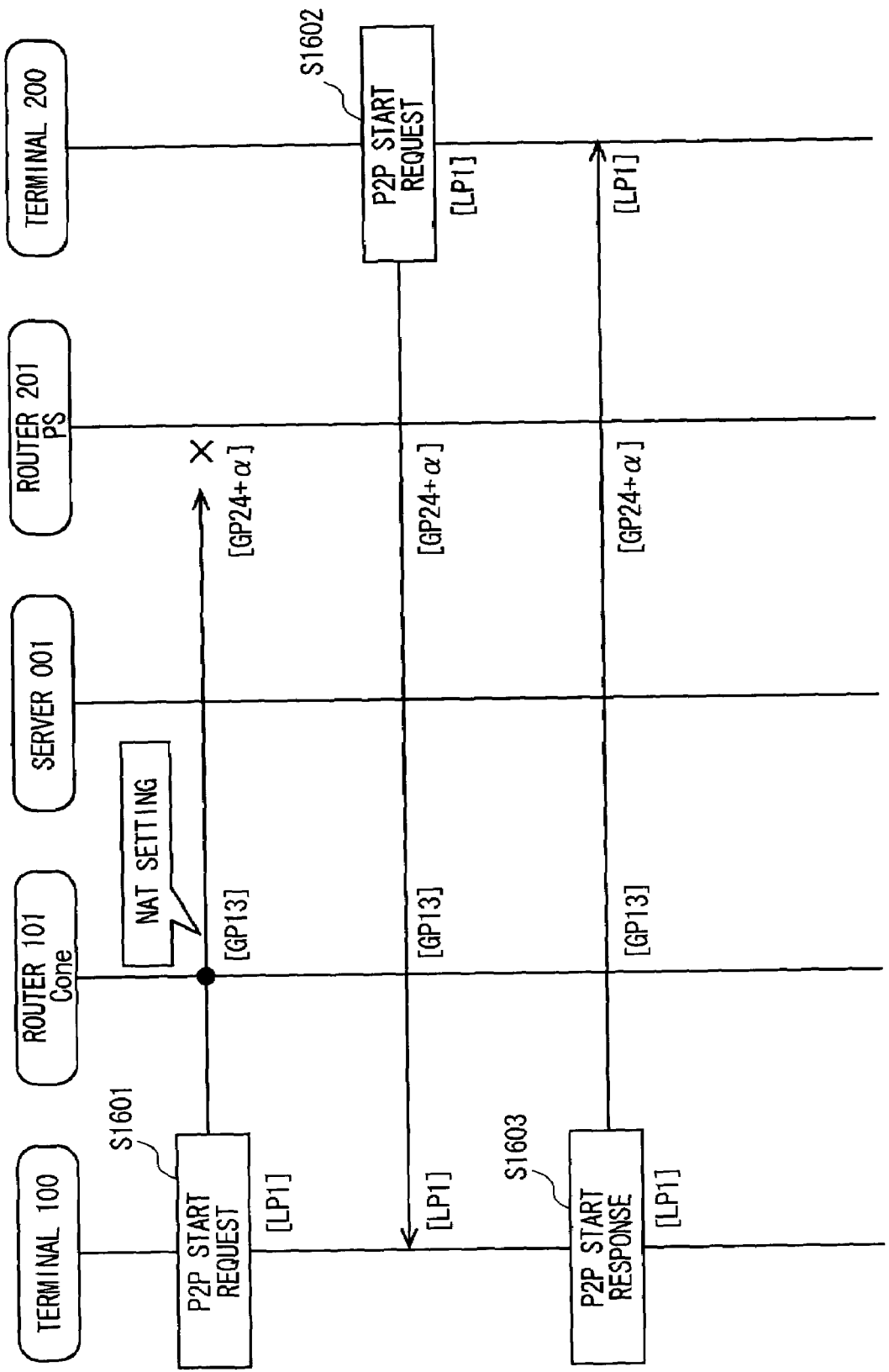
FIG. 12A illustrates a connection sequence 4 shown in FIG. 7 in detail.
Figure 12B:
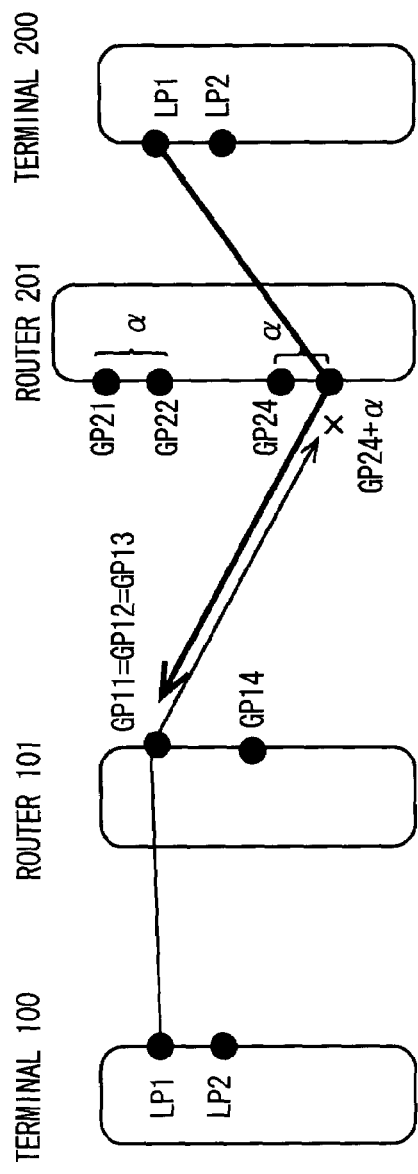
FIG. 12B shows port numbers shown in FIG. 12A.

FIG. 12A illustrates a connection sequence 4 shown in FIG. 7 in detail. FIG. 12B shows port numbers shown in FIG. 12A.

As described above, in steps S1001 and S1002 of the information exchange phase (FIG. 6), the terminal 100 acquires NAT type information which indicates that the router 201 connected to the terminal 200 is the PS NAT router and represents the port number [GP24] opened by the router 201 and a value of the port assigning interval α of the router 201. In the case of the PS NAT router, each time a new port is opened, the port number is incremented by α. Therefore, the terminal 100 can estimate that the port used by the router 201 for the P2P communication is [GP24+α].

Therefore, the communication control section 1007 in the terminal 100 transmits a P2P start request packet having [GP24+α] set as the destination port number and [LP1] set as the source port number (step S1601). The router 101, which is the Cone NAT router, assigns the port number [GP13] prepared in the preparation phase to the P2P start request packet.

At the stage when the P2P start request packet is transmitted in step S1601, the router 201 has not set the NAT so as to forward a packet having [GP24+α] set as the destination port number to the terminal 200. Therefore, the router 201 discards the received packet without forwarding the same to the terminal 200. The router 101 sets the NAT so as to forward a packet, having (IPG1, GP13) set as the destination and [GP24+α] set as the source port number, to the terminal 100 (IPL1, LP1).

In the information exchange phase, the terminal 200 acquires NAT type information which indicates that the router 101 connected to the terminal 100 is the Cone NAT router and also represents the port numbers [GP12] and [GP14] opened by the router 101.

Upon acquiring the information regarding the NAT type of the router 101, the terminal 200 estimates that the port number used by the router 101 for the P2P communication is [GP12], based on that the router 101 is the Cone NAT router. The terminal 200 immediately transmits a P2P start request packet having [LP1] set as the source port number and [GP12] set as the destination port number (step S1602). Since the router 101 is the Cone NAT router, the port number [GP12] is the same as [GP13].

The router 101 forwards the P2P start request packet transmitted from the terminal 200 to the terminal 100. In the terminal 100, in response to the P2P start request packet forwarded from the router 101, the communication control section 1007 transmits a P2P start response packet to the terminal 200 via the communication section 1008 (step S1603).

In the case where the router 201 is the PS NAT router and the router 101 is the Cone NAT router, a P2P communication path can be established between the terminal 100 and the terminal 200 in accordance with the above-described processing procedure.

In this embodiment, the terminal 100 transmits one P2P start request packet having [GP24+α] set as the destination port number. Alternatively, a plurality of P2P start request packets may be transmitted. For example, while the terminal 100 is exchanging information with the terminal 200 in the information exchange phase, another application of the terminal 200 may possibly occupy the port number [GP24+α] of the router 201. In consideration of this possibility, in order to increase the probability that a P2P communication path is successfully established, a plurality of P2P start request packets having destination port numbers incremented by α, such as [GP24+α], [GP24+2α] and [GP24+3α], may be transmitted.

Alternatively, the following modification may be made for the processing in step S1601.

Figure 12C:
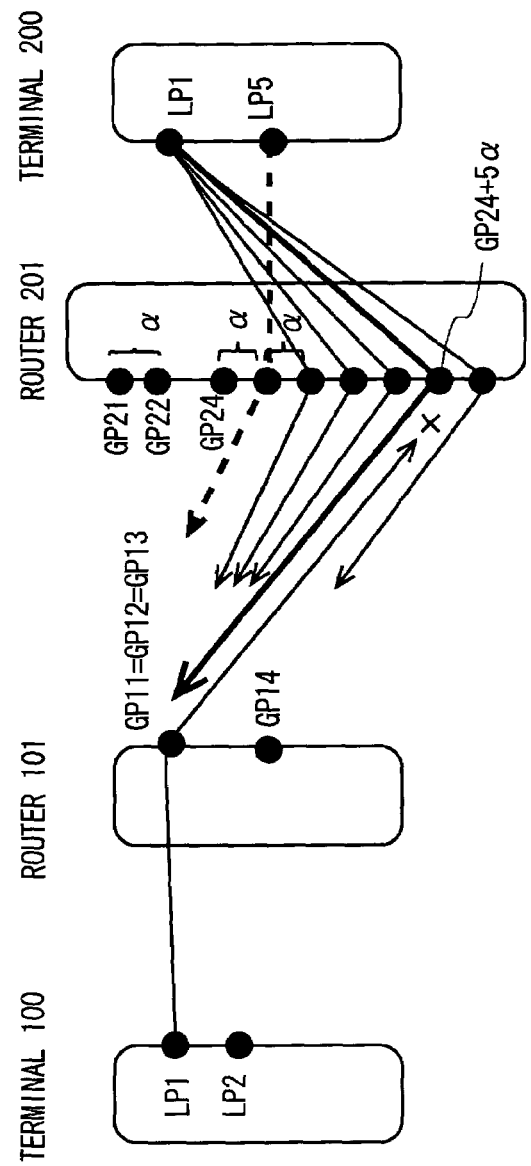
FIG. 12C shows the relationship between port numbers of the terminals and port numbers of the routers.

FIG. 12C shows the relationship between port numbers of the terminals and port numbers of the routers.

As shown in FIG. 12C, the terminal 100 transmits a P2P start request having [GP24+nα] ("n" is an integer), which is intentionally significantly offset from [GP24], set as the source port number. For example, n is set to 5. Then, the terminal 200 transmits n number of P2P start request packets having [GP12] set as the destination port number. Among the n number of packets transmitted from the terminal 200, one packet having [GP24+nα] translated as the source port number is forwarded by the router 101 to the terminal 100. Thus, a P2P communication path is established.

<Connection Sequence 5: in the Case where the Router 201 is a PS NAT Router and the Router 101 is Either One of a Cone NAT Router and an as NAT Router>

Figure 13A:
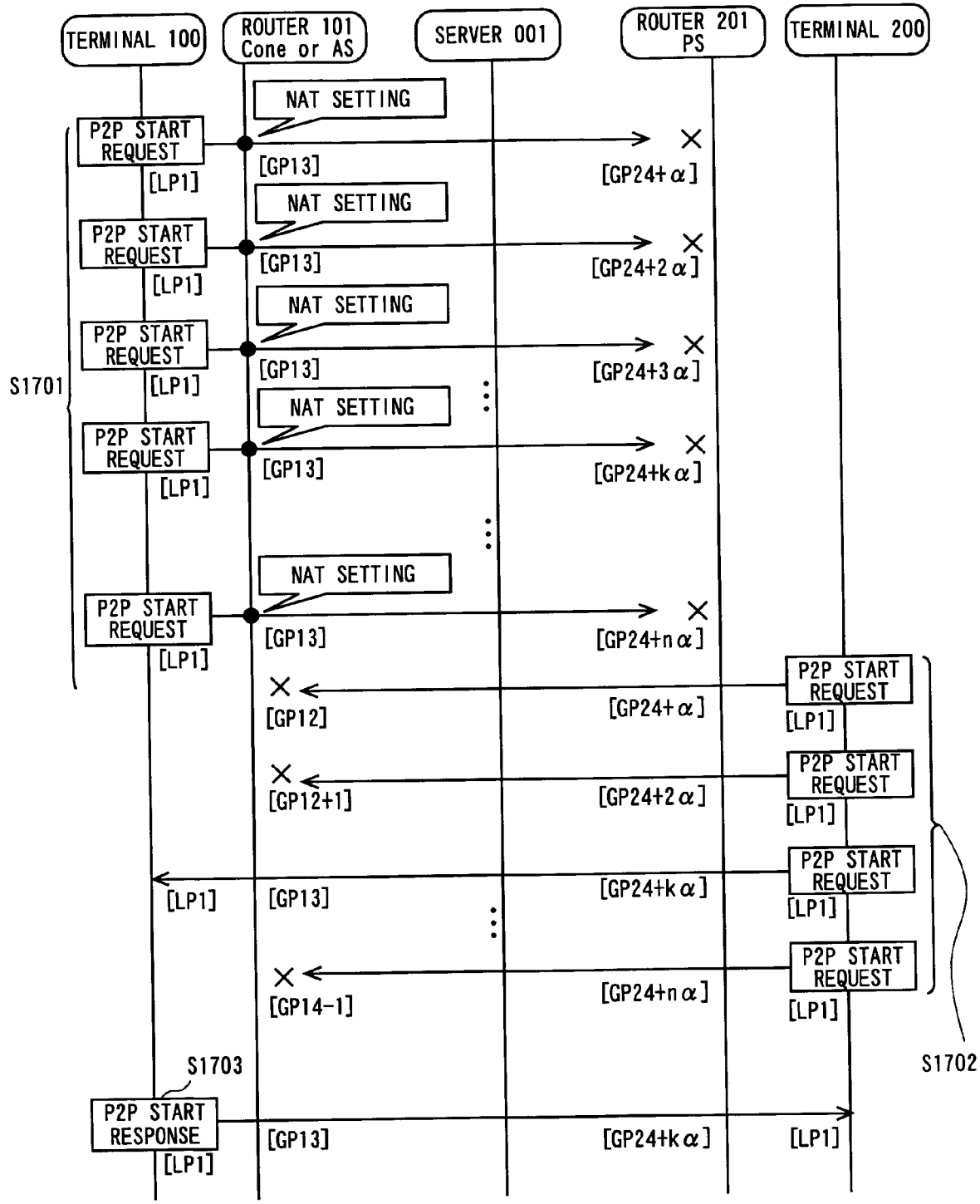
FIG. 13A illustrates a connection sequence 5 shown in FIG. 7 in detail.
Figure 13B:
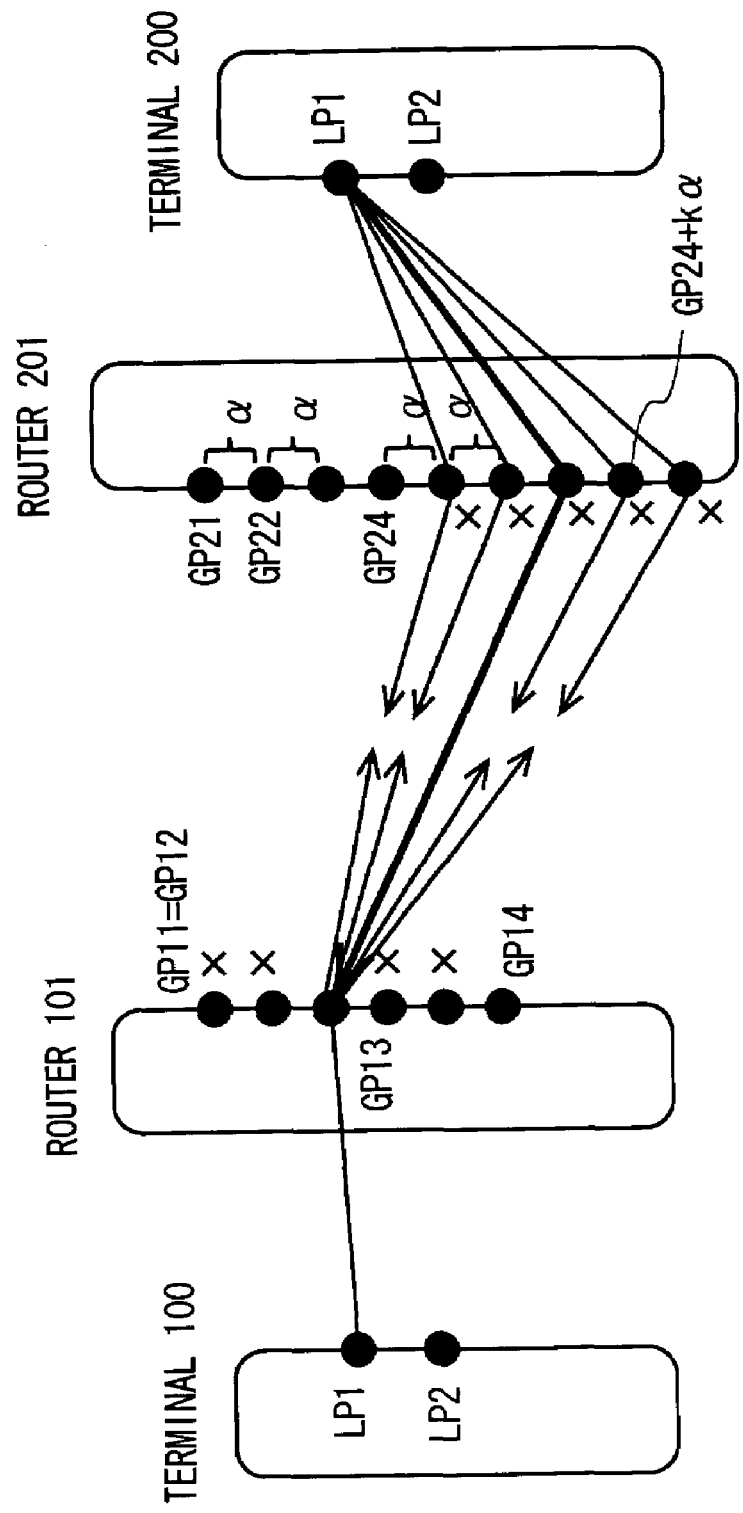
FIG. 13B shows port numbers shown in FIG. 13A.

FIG. 13A illustrates a connection sequence 5 shown in FIG. 7 in detail. FIG. 13B shows port numbers shown in FIG. 13A.

In the information exchange phase, the terminal 100 acquires NAT type information which indicates that the router 201 is the PS NAT router and also represents a value of the port number assigning interval α and the port number [GP24] of the router 201.

In the case where the router 201 is either the Cone NAT router or the AS NAT router, the communication control section 2007 in the terminal 200 is considered to transmit n number of P2P start request packets each having a port number in the range of [GP12] or greater and less than [GP14] set as the destination port number for the above-described reason. The router 201 is the PS NAT router. Therefore, each time the terminal 200 transmits a P2P start request packet, the router 201 assigns a port number incremented by the port number assigning interval α to the packet. Namely, the router 201 translates the source port numbers of the respective P2P start request packets to [GP24+α] through [GP24+nα] For this reason, the communication control section 1007 of the terminal 100 transmits n number of P2P start request packets respectively having [GP24+α] through [GP24+nα] set as the destination port numbers (step S1701). At this point, the router 101 assigns the port number [GP13] prepared in the preparation phase to all the P2P start request packets.

At the stage when the P2P start request packets are transmitted in step S1701, the router 201 has not set the NAT so as to forward a packet having one of [GP24+α] through [GP24+nα] set as the destination port number to the terminal 200. Therefore, the router 201 discards the n number of P2P start request packets respectively having [GP24+α] through [GP24+nα] set as the destination port numbers without forwarding the same to the terminal 200. The router 101 sets the NAT so as to forward a packet, having (IPG1, GP13) set as the destination and one of [GP24+α] through [GP24+nα] set as the source port number, to the terminal 100 (IPL1, LP1) by forwarding the n number of P2P start request packets.

In the information exchange phase, the terminal 200 acquires NAT type information which indicates that the router 101 is the Cone NAT router or the AS NAT router and also represents the port numbers [GP12] and [GP14] opened by the terminal 100 in the NAT type examination phase and the preparation phase.

The communication control section 2007 in the terminal 200 transmits n number of P2P start request packets having [LP1] set as the destination port number and a value in the range of [GP12] or greater and less than [GP14] set as the source port number (where n=[GP14]−[GP12]) (step S1702).

Among the n number of P2P start request packets transmitted from the terminal 200, the router 101 forwards only a packet having [GP13] set as the destination port number by the NAT of the router 201 to the terminal 100. Upon receipt of the P2P start request packet forwarded by the router 101, the terminal 100 transmits a P2P start response packet (step S1703).

In the case where the router 201 is the PS NAT router and the router 101 is either one of the Cone NAT router and the AS NAT router, a P2P communication path can be established between the terminal 100 and the terminal 200 in accordance with the above-described processing procedure.

In this embodiment, the terminal 100 transmits n number (i.e., [GP14]−[GP12]) P2P start request packets. The number of the P2P start request packets transmitted by the terminal 100 does not need to be n. For example, while the terminals 100 and 200 are mutually exchanging information after the router 201 opened the port [GP24] in the NAT type examination phase, another application of the terminal 200 may possibly occupy some of a plurality of ports in the range of [GP24+α] or greater and [GP+nα] or less. In consideration of this possibility, in order to increase the probability that a P2P communication path is successfully established, the terminal 100 may transmit (n+m) number of P2P start request packets (where "m" is an integer) having the port numbers [GP24+α] through [GP24+(n+m)α] of the router 201 as the destination port numbers.

<Connection Sequence 6: in the Case where Both of the Routers 101 and 201 are PS NAT Routers>

Figure 14A:
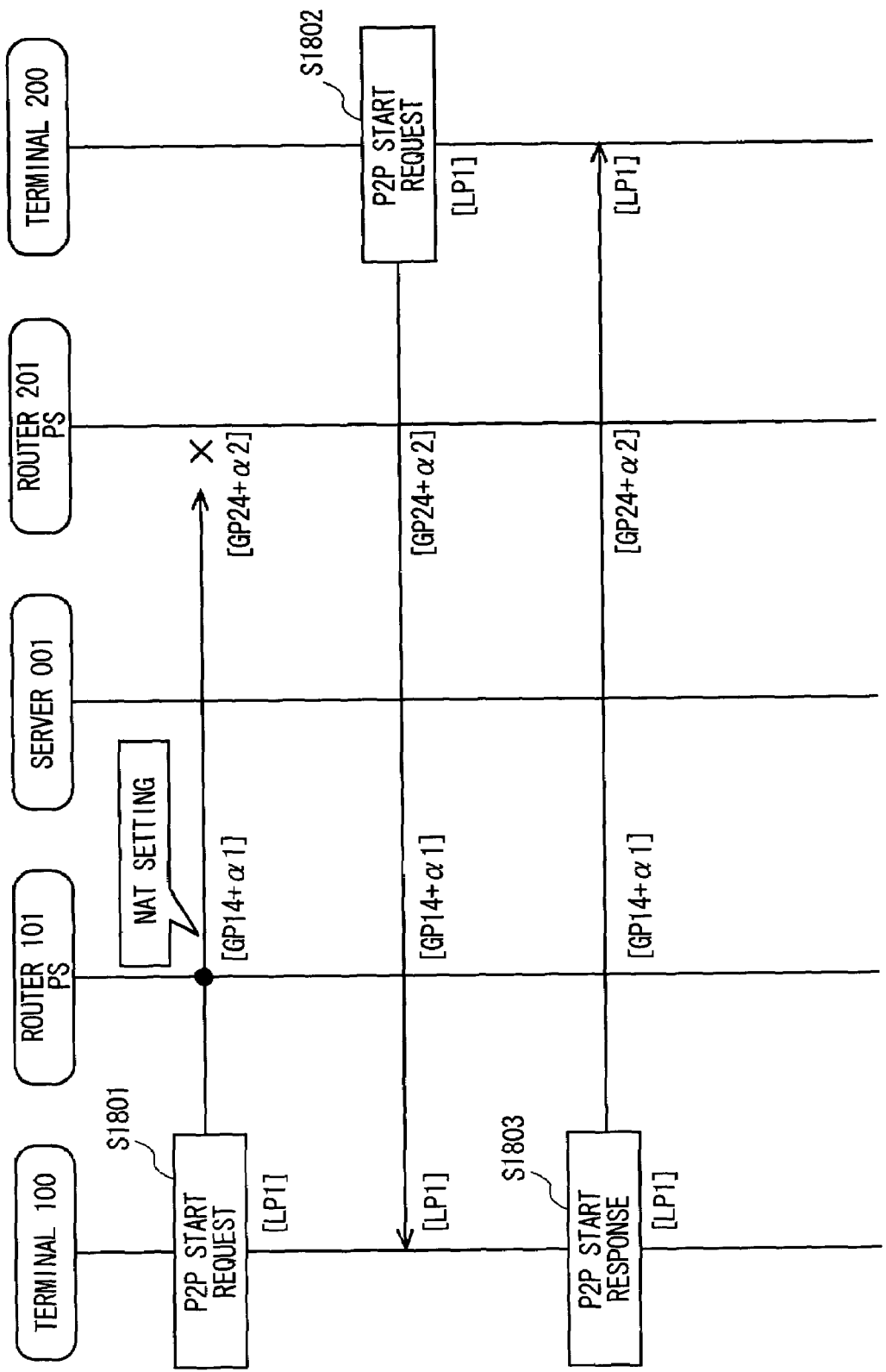
FIG. 14A illustrates a connection sequence 6 shown in FIG. 7 in detail.
Figure 14B:
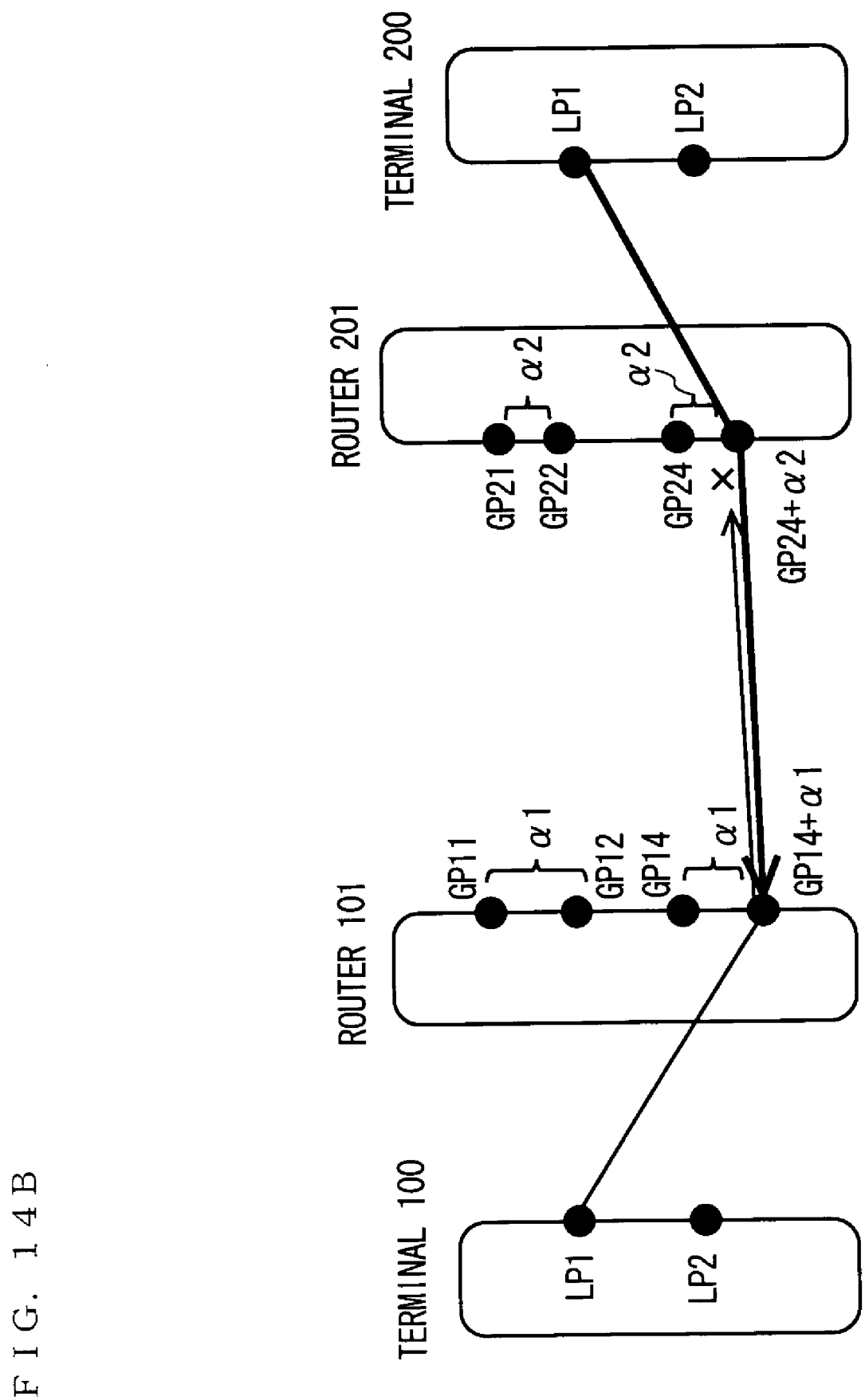
FIG. 14B shows port numbers shown in FIG. 14A.

FIG. 14A illustrates a connection sequence 6 shown in FIG. 7 in detail. FIG. 14B shows port numbers shown in FIG. 14A.

In the information exchange phase, the terminal 100 acquires NAT type information which indicates that the router 201 is the PS NAT router and also represents a value of the port number assigning interval α2 and the port number [GP24] of the router 201.

In the case of the PS NAT router, each time a packet is assigned a port number, the port number is incremented by the port number interval α2. Therefore, the terminal 100 can estimate that the port number used by the terminal 200 for the P2P communication is [GP24+α2].

Therefore, the communication control section 1007 transmits a P2P start request packet having [GP24+α2] set as the destination port number and [LP1] set as the source port number (step S1801). The router 101, which is also the PS NAT router, assigns a port number [GP14+α1] to the P2P start request packet (where "α1" is a port number assigning interval of the router 101).

At the stage when the P2P start request packet is transmitted in step S1601, the router 201 has not set the NAT so as to forward a packet having [GP24+α2] set as the destination port number to the terminal 200. Therefore, the router 201 discards the P2P start request packet without forwarding the same to the terminal 200. The router 101 sets the NAT so as to forward a packet, having (IPG1, GP14+α1) set as the destination and [GP24+2α] set as the source port number, to the terminal 100 (IPL1, LP1).

In the information exchange phase, the terminal 200 acquires NAT type information which indicates that the router 101 is the PS NAT router and also represents a value of the port number assigning interval α1 and the port number [GP14]. The terminal 200 estimates that the port number used by the router 101 for the P2P communication is [GP14+α1] and transmits a P2P start request packet having [GP14+α1] set as the destination port number and [LP1] set as the source port number (step S1802).

The router 101 forwards the P2P start request packet transmitted from the terminal 200 to the terminal 100. Upon receipt of the P2P start request packet forwarded by the router 101, the terminal 100 transmits a P2P start response packet to the terminal 200 (step S1803).

In the case where both of the routers 101 and 201 are the PS NAT routers, a P2P communication path can be established between the terminal 100 and the terminal 200 in accordance with the above-described processing procedure.

In this embodiment, the terminal 100 transmits one P2P start request packet having [GP24+α2] set as the destination port number. Alternatively, the terminal 100 may transmit a plurality of P2P start request packets. In order to increase the probability that a P2P communication path is successfully established, the terminal 100 may transmit a plurality of P2P start request packets having destination port numbers incremented by α2, such as [GP24+2×α2] and [GP24+3×α2].

In this embodiment, the routers assigning a port number incremented in value each time the respective router assigns a port to a packet are described. Alternatively, the present invention is applicable to routers assigning a port number decremented in value each time the respective router assigns a port to a packet, needless to say. In this case, the port number assigning interval is obtained by calculating an absolute value of a difference between two port numbers.

(Other modifications)

The communication system according to the above-described embodiment may be structured as follows.

The terminals 100 and 200 may store a NAT type determined the first time when a P2P communication path is established. In this case, by reusing the stored NAT type, the NAT type examination phase can be omitted for establishing a P2P communication path the second time or thereafter. Alternatively, the terminals 100 and 200 may proceed with the P2P communication path establishment processing without executing the NAT type examination phase, and may execute the NAT type examination phase only when the establishment of the P2P communication path results in a failure.

With such a structure, the number of times that the terminals 100 and 200 examine the NAT type is reduced, and therefore the P2P communication path establishment processing at the second time and thereafter can be performed efficiently.

In the case where the terminals 100 and 200 store the NAT type of a router once examined, the terminals 100 and 200 can confirm that the stored NAT type has not been changed in accordance with the following procedure. During the P2P communication path establishment phase or while the terminals 100 and 200 are performing P2P communication, the terminals 100 and 200 each transmit a packet, including a port number of the destination terminal, to the destination terminal. The server 001 transmits a packet including a port number to be used by the router 101 for the communication with the server 001 to each of the terminals 100 and 200. The terminals 100 and 200 compare the port number notified from the destination terminal and the port number of the router used for the communication with the server 001 and thus confirm the NAT type.

In the case where each of the terminals 100 and 200 determines that the router connected to itself is either one of the Cone NAT router and the AS NAT router in the NAT type examination phase, the terminals 100 and 200 may each specify which type the router has. Hereinafter, processing executed by each of the terminals 100 and 200 for determining whether the router connected thereto is the Cone NAT router or the AS NAT router in the P2P communication path establishment phase will be described.

Figure 15A:
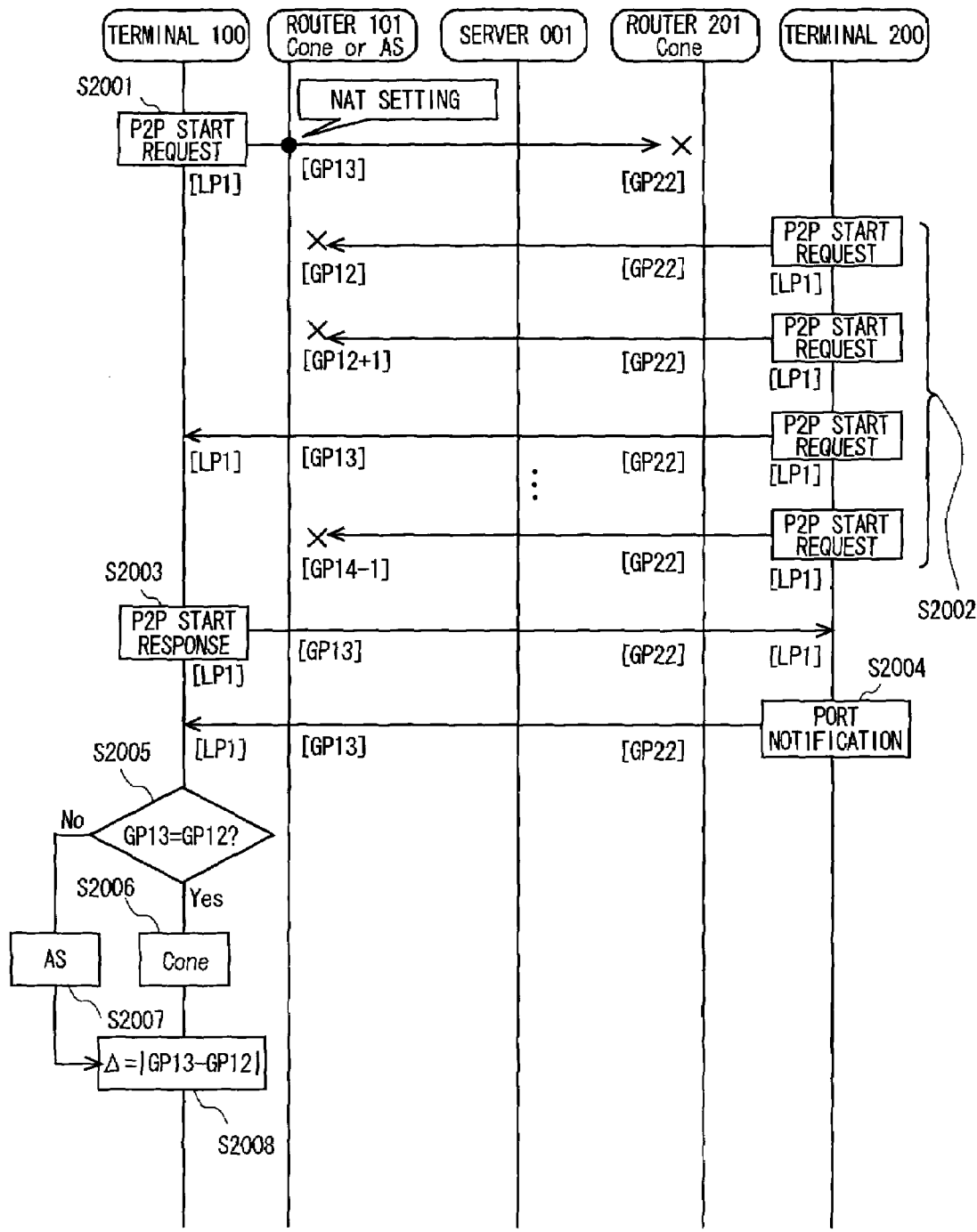
FIG. 15A is a connection sequence diagram including processing for specifying whether a router is a Cone NAT router or an AS NAT router.
Figure 15B:
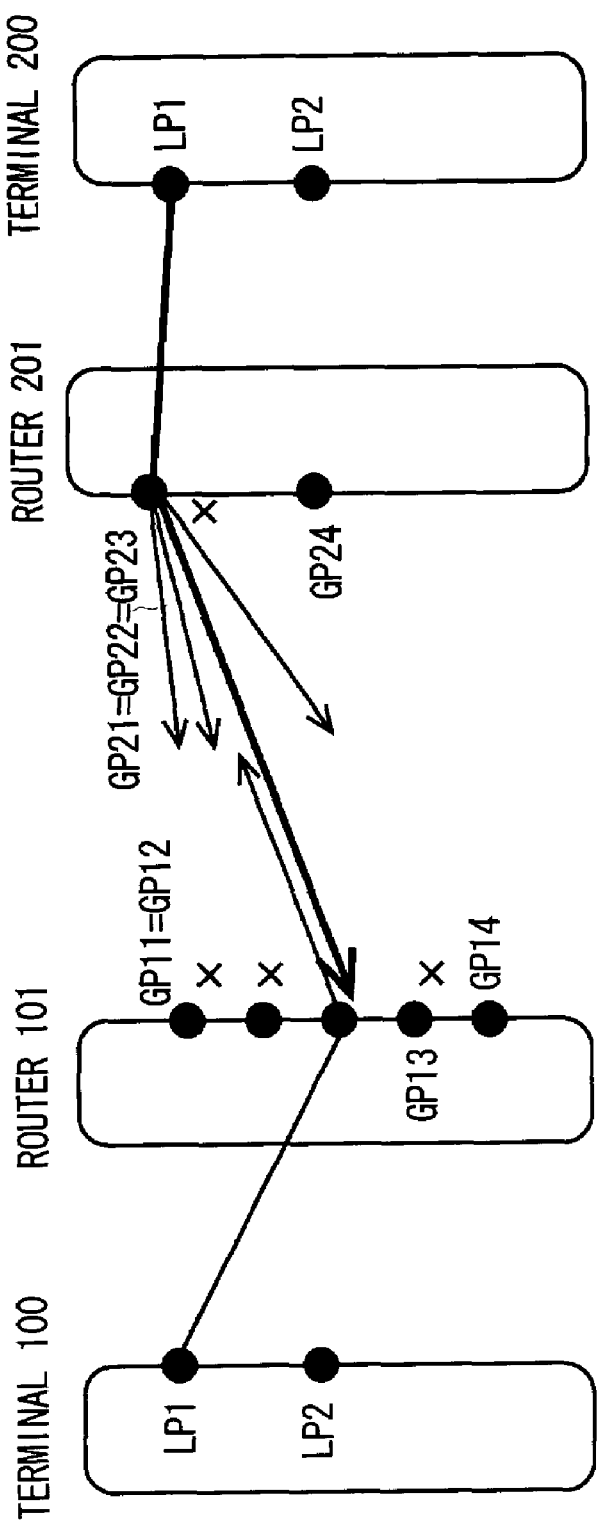
FIG. 15B shows port numbers shown in FIG. 15A.

FIG. 15A is a connection sequence diagram including processing for specifying whether the router 101 is the Cone NAT router or the AS NAT router. FIG. 15B shows port numbers shown in FIG. 14A.

In the information exchange phase, the terminal 100 acquires NAT type information which indicates that the router 201 is the Cone NAT router and also represents the port number [GP24] of the router 201. Since the router 201 is the Cone NAT router, the terminal 100 can estimate that the port number used by the terminal 200 for the P2P communication is [GP22].

Therefore, the communication control section 1007 transmits a packet having [LP1] set as the source port number and [GP22] set as the destination port number as a P2P start request (step S2001). The router 101 assigns the port number [GP13] to the packet transmitted from the terminal 100.

At the stage when the P2P start request packet is transmitted in step S2001, router 201 has not set the NAT so as to forward a packet which is transmitted from the terminal 100 and has [GP22] set as the destination port number. Therefore, the router 201 discards the received P2P start request packet without forwarding the same to the terminal 200. At this stage, the router 101 sets the NAT so as to forward a packet, having the port number [GP22] of the router 201 set as the source port number and (IPG1, PG13) set as the destination IP address and the destination port number, to the terminal 100 (IPL1, LP1).

In the information exchange phase, the terminal 200 acquires NAT type information which indicates that the router 101 connected to the terminal 100 is either one of the Cone NAT router and the AS NAT router and represents the port numbers [GP12] and [GP14] opened by the router 101 in the NAT type examination phase and the preparation phase.

Upon acquiring the information regarding the NAT type of the router 101, the terminal 200 transmits a plurality of P2P start request packets each having [LP1] set as the source port number and a value in the range of [GP12] or greater and less than [GP14] set as the destination port number (step S2002).

Among the plurality of P2P start request packets transmitted from the terminal 200, the router 101 forwards only one packet having [GP13] set as the destination port number by the router 201 to the terminal 100. Upon receipt of the P2P start request packet forwarded by the router 101, the terminal 100 transmits a P2P start response packet to the terminal 200 (step S2003).

In the case where the router 101 is either the Cone NAT router or the AS NAT router and the router 201 is the Cone NAT router, a P2P communication path can be established between the terminal 100 and the terminal 200 in accordance with the above-described processing procedure.

Next, upon receipt of the P2P start response packet from the terminal 100, the communication control section 2007 in the terminal 200 retrieves the source port number of the packet, i.e., the port number [GP13] of the router 101 and transmits a notification packet including the retrieved port number [GP13] to the terminal 100 (step S2004).

The relay characteristic determination section 1004 in the terminal 100 refers to the notification packet transmitted from the terminal 200 to compare the port number [GP13] of the router 101 and the port number [GP12] examined in the NAT type examination phase (step S2005). When [GP13] equals [GP12] as a result of the comparison (Yes in step S2005), the relay characteristic determination section 1004 determines that the router 101 is the Cone NAT router (step S2006). Otherwise (No in step S2005), the relay characteristic determination section 1004 determines that the router 101 is the AS NAT router (step S2007).

Next, the relay characteristic determination section 1004 stores a difference between the port numbers [GP13] and [GP12] in a predetermined storage section as a port number assigning interval Δ of the router 101 (step S2008).

Figure 16:
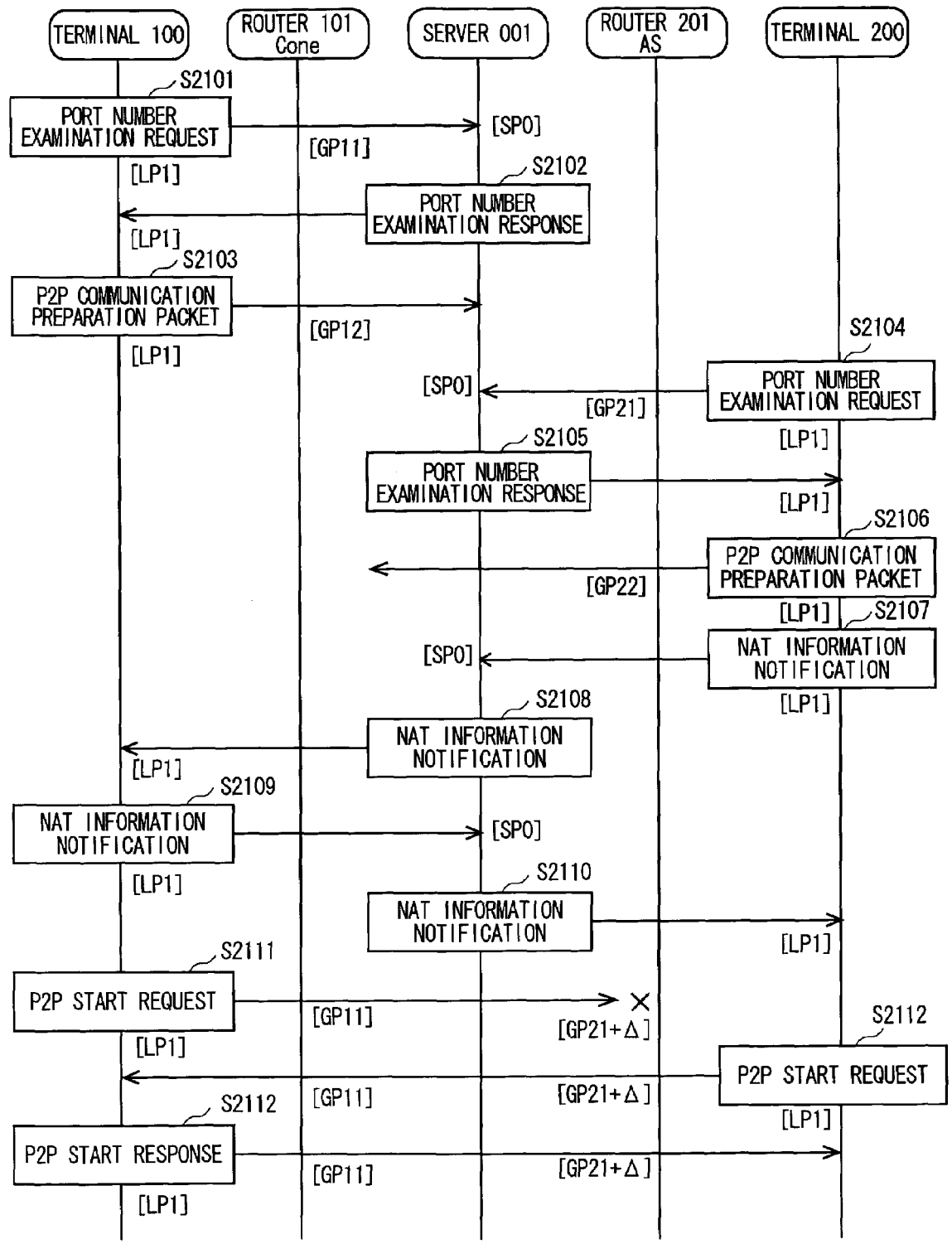
FIG. 16 is a connection sequence diagram illustrating processing in the case where the NAT type once examined is stored.

FIG. 16 is a connection sequence illustrating processing in the case where the NAT type once examined is stored.

The terminal 100 has already examined the router 101 and therefore omits the processing in the NAT type examination phase and executes the processing in the preparation phase.

<Preparation Phase>

First, in the terminal 100, the address information examination request transmission section 1001 transmits a port number examination request packet having the port number [LP1] of the terminal 100 set as the source port number and the port number [SP0] of the server 001 set as the destination port number (step S2101).

In the server 001, the address information examination section 0011 transmits a port number examination response packet including the source port number of the port number examination request packet, i.e., the port number [GP11] of the router 101, via the communication section 0014 (step S2102).

Next, in the terminal 100, the direct communication preparation request transmission section 1003 transmits a P2P communication preparation packet having the IP address and a port number of the terminal 200 set as the destination and thus prepares the port number [GP12] to be used for the P2P communication with the terminal 200 on the router 101 (step S2103). The router 101 sets the NAT so as to be able to receive a packet transmitted from the terminal 200 to the router 101 (IPG1, GP12).

Similarly, the terminal 200 omits the processing in the NAT type examination phase and executes the processing in the preparation phase (steps S2104 through S2106). The router 201 sets the NAT so as to be able to receive a packet transmitted from the terminal 100 to the router 201 (IPG1, GP22).

<Information Exchange Phase>

Next, the terminal 200 transmits a NAT type information notification packet including information regarding the NAT type of the router 201 to the server 001 (step S2107). The NAT type information includes different information as follows depending on whether or not the router 201 is the Port Reuse NAT router.

(e) In the case where the router 201 is not the Port Reuse NAT router, the NAT type information includes at least the NAT type of the router 201 and the port number [GP21] of the router 201. In the case where the router 201 is determined to be the AS NAT router during the immediately previous P2P communication, the NAT type information also includes a value of the port number assigning interval Δ stored by the relay characteristic determination section 2004.

(f) In the case where the router 201 is the Port Reuse NAT router, the NAT type information includes at least the port number [LP4] planned to be newly opened by the terminal 200 in the next P2P communication path establishment phase.

Next, in the server 001, upon receipt of the NAT type information notification packet transmitted from the terminal 200, the relay information forwarding section 0013 forwards the received NAT type information notification packet to the terminal 100 via the communication section 0014 (step S2108).

Similarly, in the terminal 100, the relay information transmission section 1005 transmits a NAT type information notification packet including information regarding the NAT type of the router 101 to the server 001 (step S2109). The NAT type information includes different information as follows depending on whether or not the router 101 is the Port Reuse NAT router.

(g) In the case where the router 101 is not the Port Reuse NAT router, the NAT type information includes at least the NAT type of the router 101 and the port number [GP11] of the router 101. In the case where the router 101 is determined to be the AS NAT router during the immediately previous P2P communication, the NAT type information also includes a value of the port number assigning interval Δ stored by the relay characteristic determination section 1004.

(h) In the case where the router 101 is the Port Reuse NAT router, the NAT type information includes at least the port number [LP3] planned to be newly opened by the terminal 100 in the next P2P communication path establishment phase.

Next, in the server 001, upon receipt of the NAT type information notification packet transmitted from the terminal 100, the relay information forwarding section 0013 forwards the received NAT type information notification packet to the terminal 200 via the communication section 0014 (step S2110).

In this embodiment, the terminal 200 transmits the NAT type information notification packet before the terminal 100. Alternatively, the terminal 100 may transmit the NAT type information notification packet before the terminal 200.

<Connection Phase>

In the following description, the router 101 is assumed to be a Cone NAT router and the router 201 is assumed to be an AS NAT router for the simplicity of description.

Based on the NAT type information notification packet which indicates that the router 201 is the AS NAT router and also represents the port number [GP21] of the router 201 and the port number assigning interval Δ of the router 201, the communication control section 1007 in the terminal 100 estimates that the port number used by the router 201 when the terminal 200 performs P2P communication with the terminal 100 is [GP21+Δ]. The communication control section 1007 transmits a P2P start request packet having [GP21+Δ] set as the destination port number to the router 201 via the communication section 1008 (step S2111). The router 201 assigns the port number [GP12] to the P2P start request packet.

At the stage when the P2P start request packet is transmitted in step S2111, the router 201 has not set the NAT so as to forward a packet having [GP21+Δ] set as the destination port number to the terminal 200. Therefore, the router 201 discards the received P2P start request without forwarding the same to the terminal 200. The router 101 sets the NAT so as to forward a packet, having (IPG1, GP12) set as the destination and [GP21+Δ] set as the source port number, to the terminal 100 (IPL1, LP1) by forwarding the P2P start request packet.

In the information exchange phase, the terminal 200 acquires NAT type information which indicates that the router 101 is the Cone NAT router and also represents the port number [GP11] of the router 101. The terminal 200 estimates that the port number used by the router 101 for the P2P communication is [GP11], and transmits a P2P start request packet having [GP11] set as the destination port number and [LP1] set as the source port number (step S2112). Since the router 101 is the Cone NAT router, [GP12] is the same as [GP11].

The router 101 forwards the P2P start request packet transmitted from the terminal 200 to the terminal 100. Upon receipt of the P2P start request packet forwarded by the router 101, the terminal 100 transmits a P2P start response packet to the terminal 200 (step S2113).

In the case where the establishment of a P2P communication path between the terminal 100 and the terminal 200 results in a failure in the P2P communication path establishment phase (steps S2111 through S2113), the terminals 100 and 200 can each repeat the connection processing from the NAT type examination phase.

In the flowchart shown in FIG. 7, one of the two terminals determines the NAT type of the router connected to itself only when the router connected to the other terminal is the PS NAT router (steps S1204 through S1206). Alternatively, the terminals may always determine the NAT type of the router connected to itself. In this case, the two terminal scan each select a connection sequence for each combination of NAT types.

In this embodiment, the terminal 100 and the server 001 are connected to each other generally by one router 101 for the simplicity of description. Alternatively, the terminal 100 and the server 001 may be connected to each other by a plurality of routers. The terminal 200 and the server 001 may also be connected to each other by a plurality of routers. This will be described below.

Figure 17A:
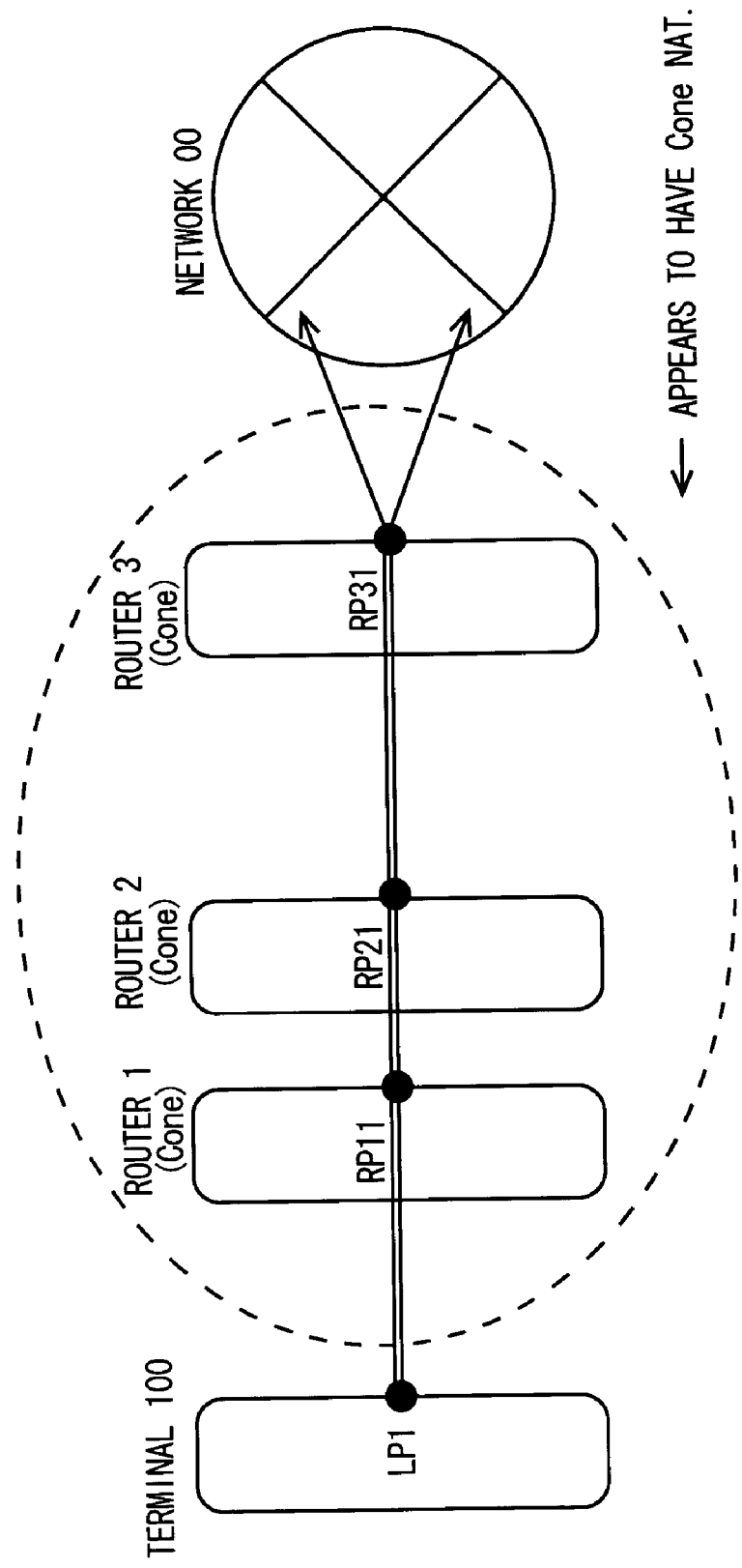
FIG. 17A shows an example in which a terminal is connected to a global network via three routers.

FIG. 17A shows an example in which a terminal is connected to a global network via three routers.

As shown in FIG. 17A, the terminal 100 is connected to the global network 00 via routers 1 through 3 which are Cone NAT routers. When the terminal 100 transmits a packet having [LP1] set as the source port number, the packet reaches the global network 00 via a port RP11 of the router 1, a port RP21 of the router 2 and a port RP31 of the router 3. In this case, the server connected to the global network 00 can consider that the terminal 100 appears to be connected to the server via one Cone NAT router.

Figure 17B:
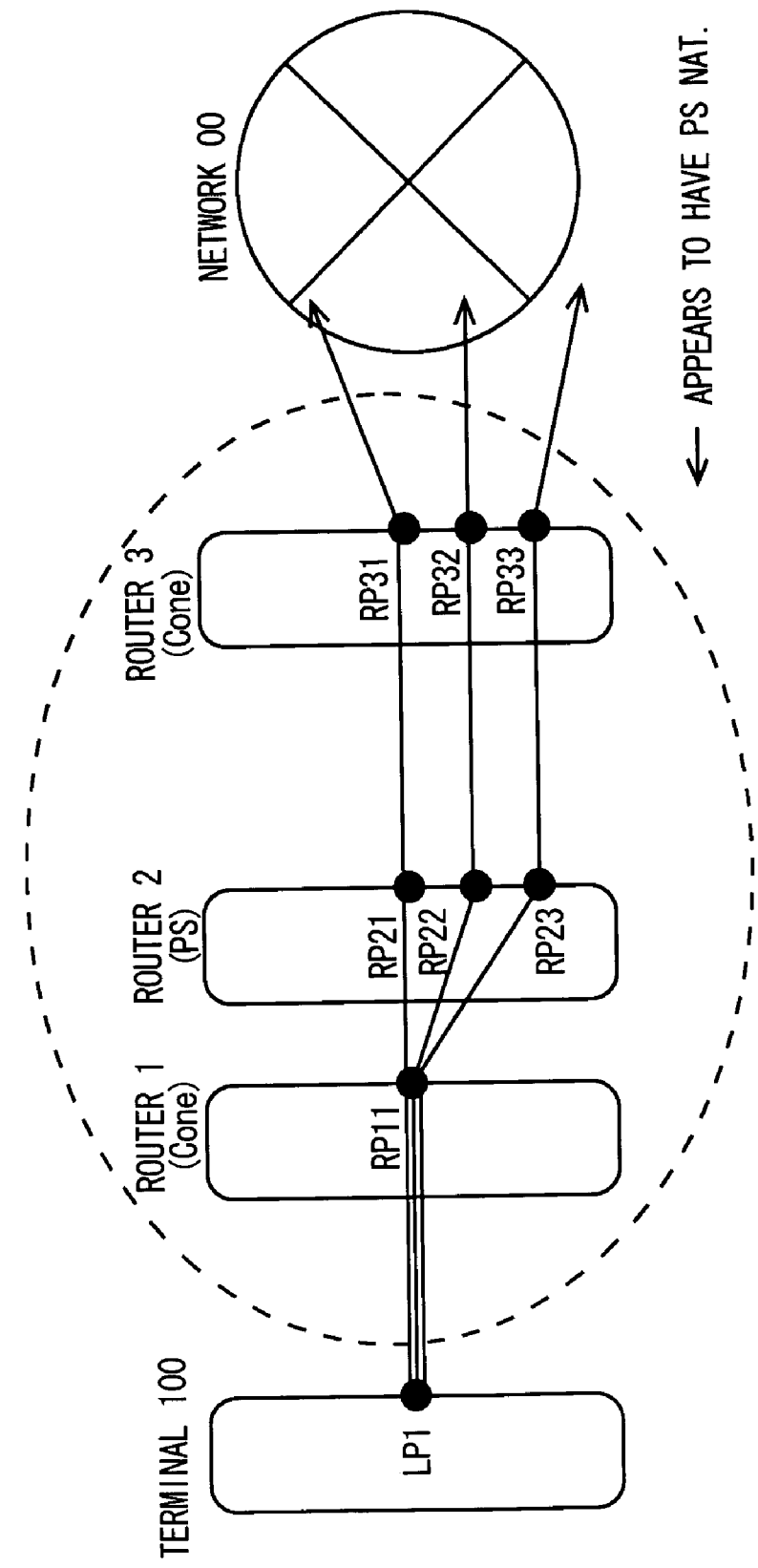
FIG. 17B shows another example in which a terminal is connected to a global network via three routers.
Figure 18A:
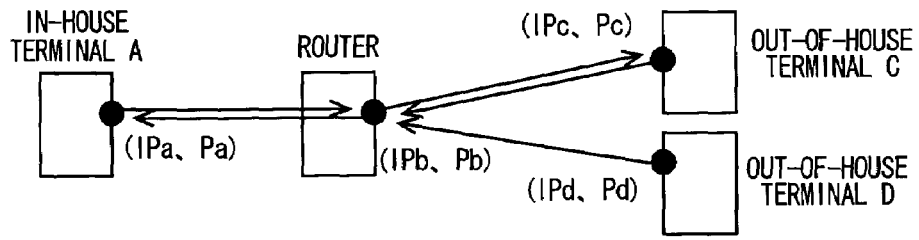
FIG. 18A illustrates a NAT referred to as a Full Cone NAT.
Figure 18B:
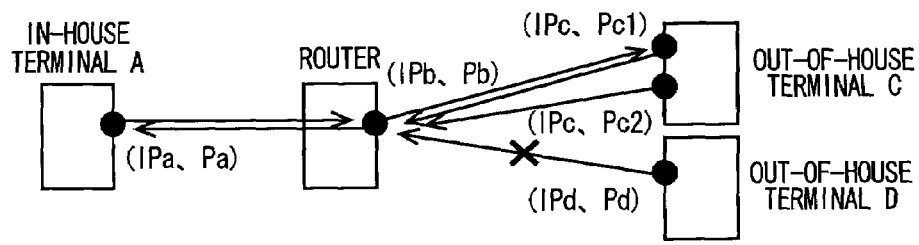
FIG. 18B illustrates a NAT referred to as a Restricted Cone NAT (R NAT)
Figure 18C:
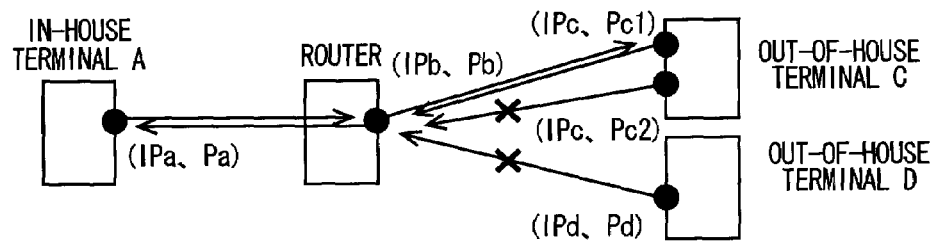
FIG. 18C illustrates a NAT referred to as a Port Restricted Cone NAT (PR NAT)
Figure 18D:
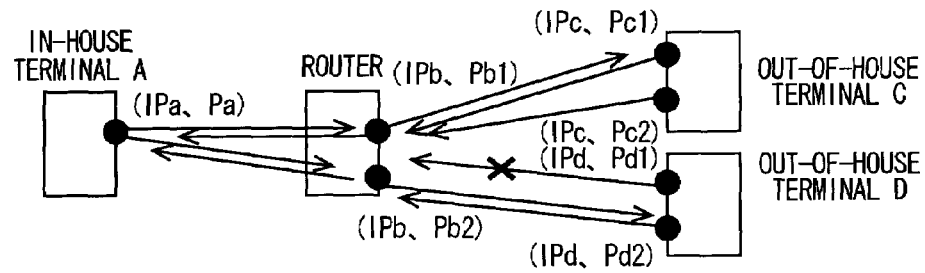
FIG. 18D illustrates a NAT referred to as an Address Sensitive Symmetric NAT (AS NAT)
Figure 18E:
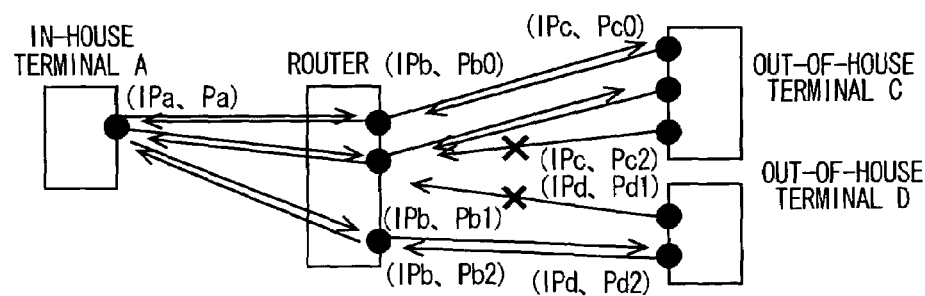
FIG. 18E illustrates a NAT referred to as a Port Sensitive Symmetric NAT (PS NAT)
Figure 19A:
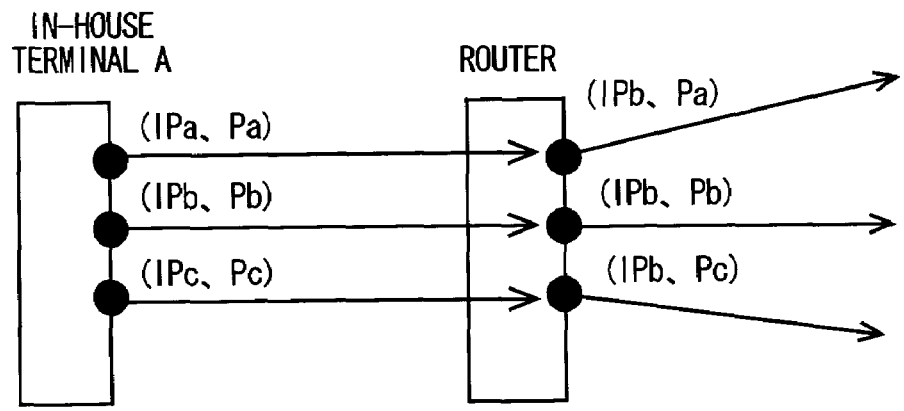
FIG. 19A illustrates an overview of a Port Reuse characteristic.
Figure 19B:
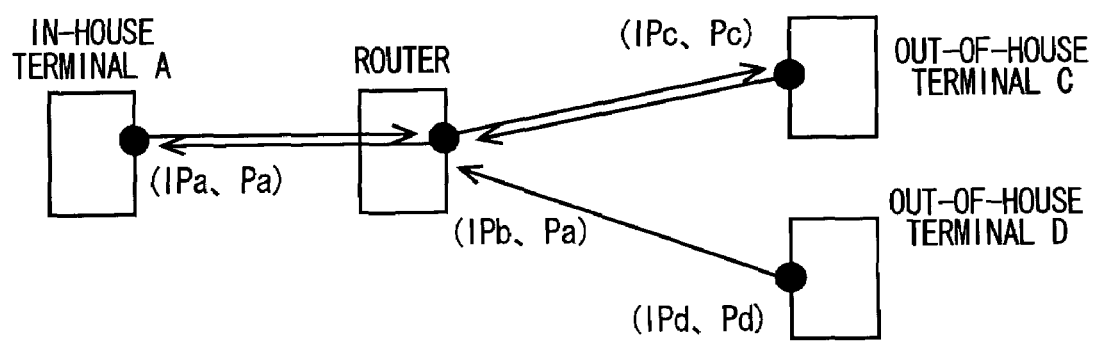
FIG. 19B illustrates a function of a Port Reuse NAT router.
Figure 20A:
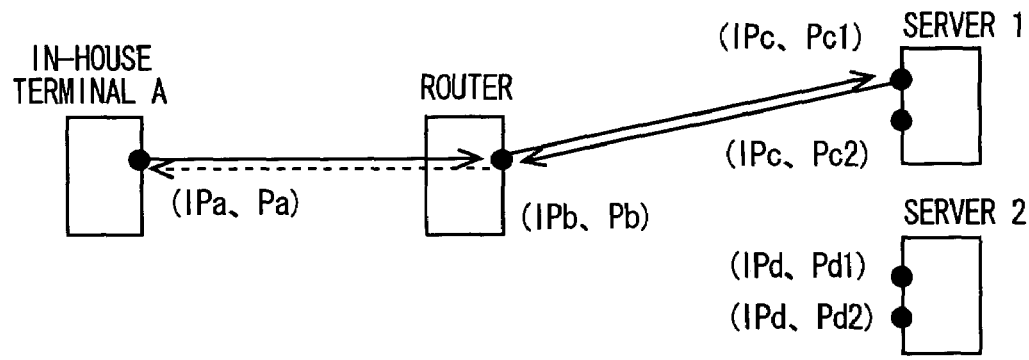
FIG. 20A shows an overview of STUN-Test I.
Figure 20B:
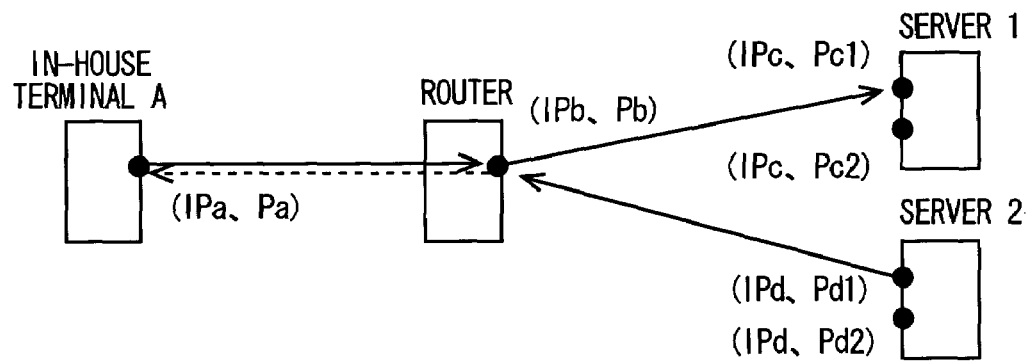
FIG. 20B shows an overview of STUN-Test II.
Figure 20C:
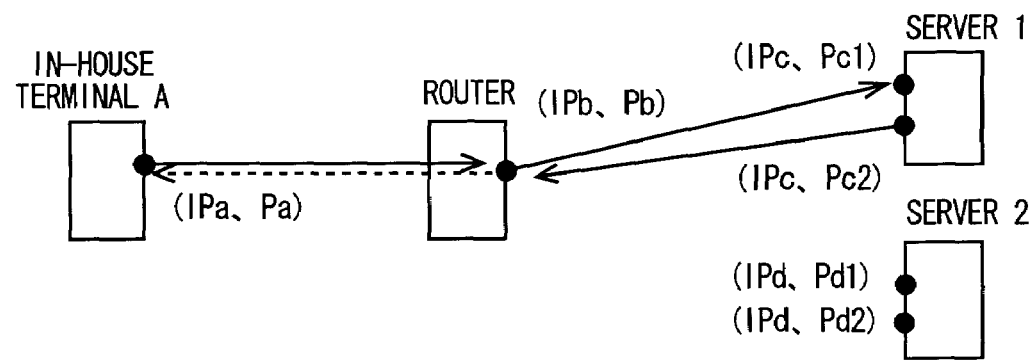
FIG. 20C shows an overview of STUN-Test III.
Figure 21:
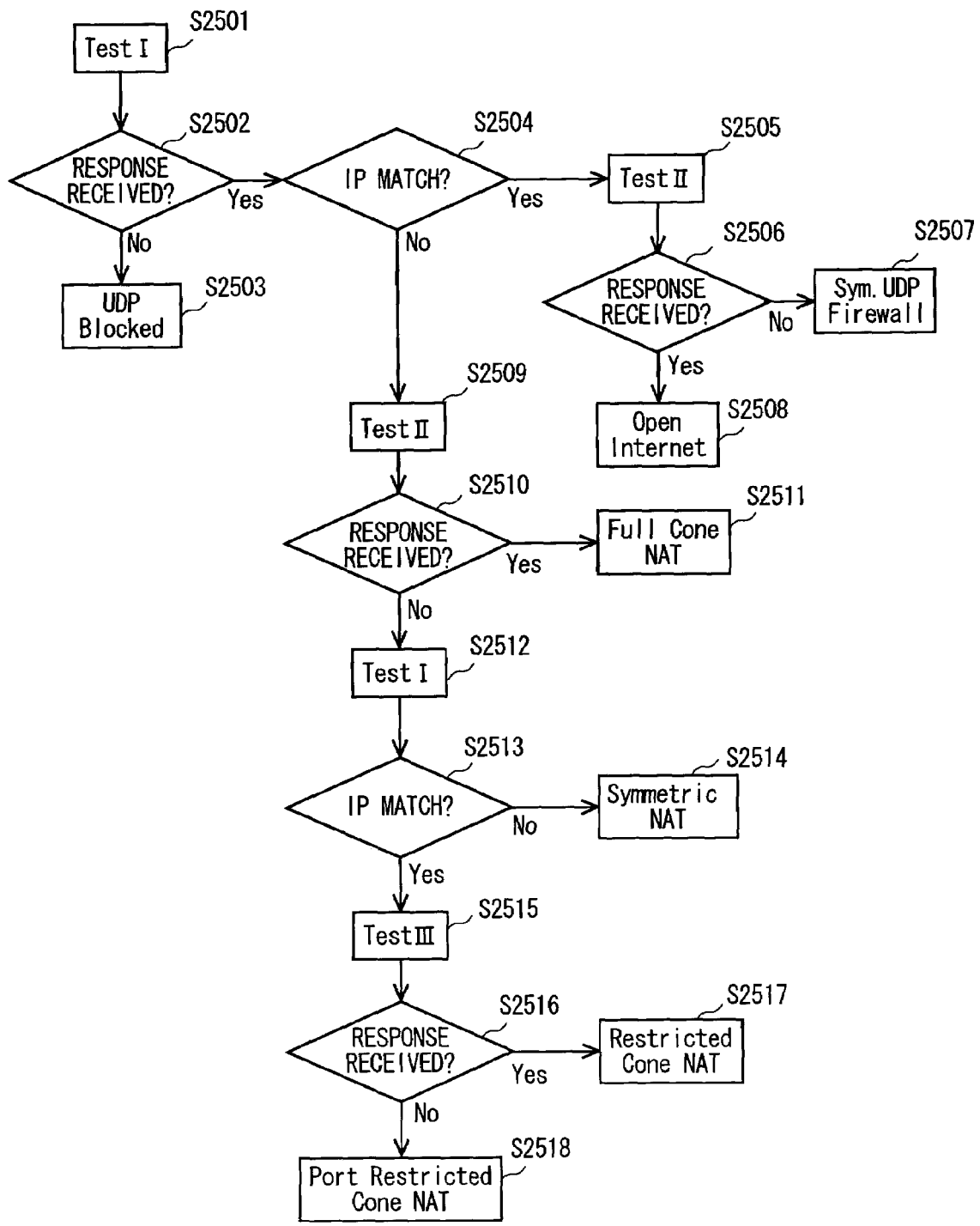
FIG. 21 is a flowchart illustrating a method for examining the NAT type by STUN.
Figure 22:
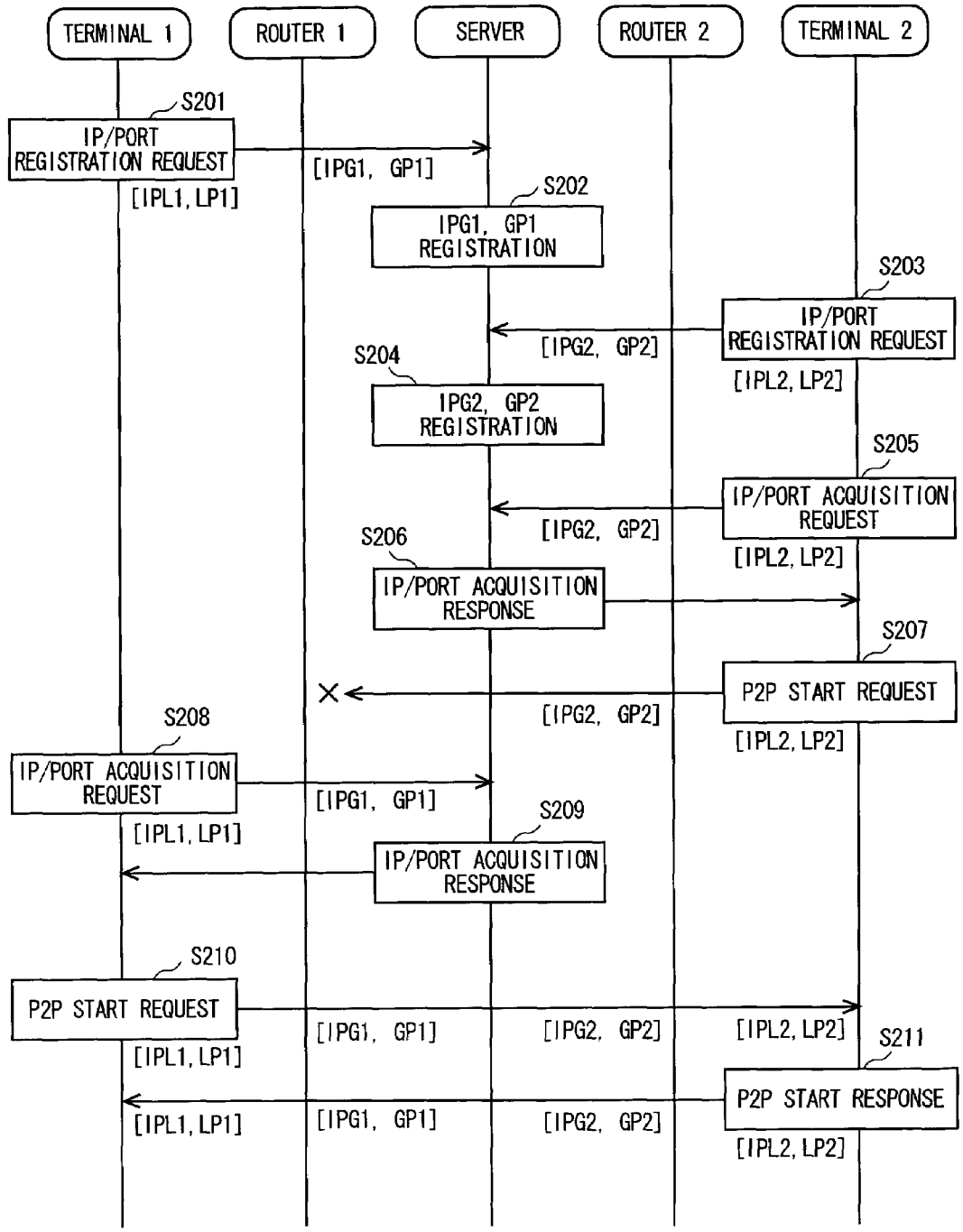
FIG. 22 is a sequence diagram illustrating a P2P communication path establishment method using STUN.
Figure 23:
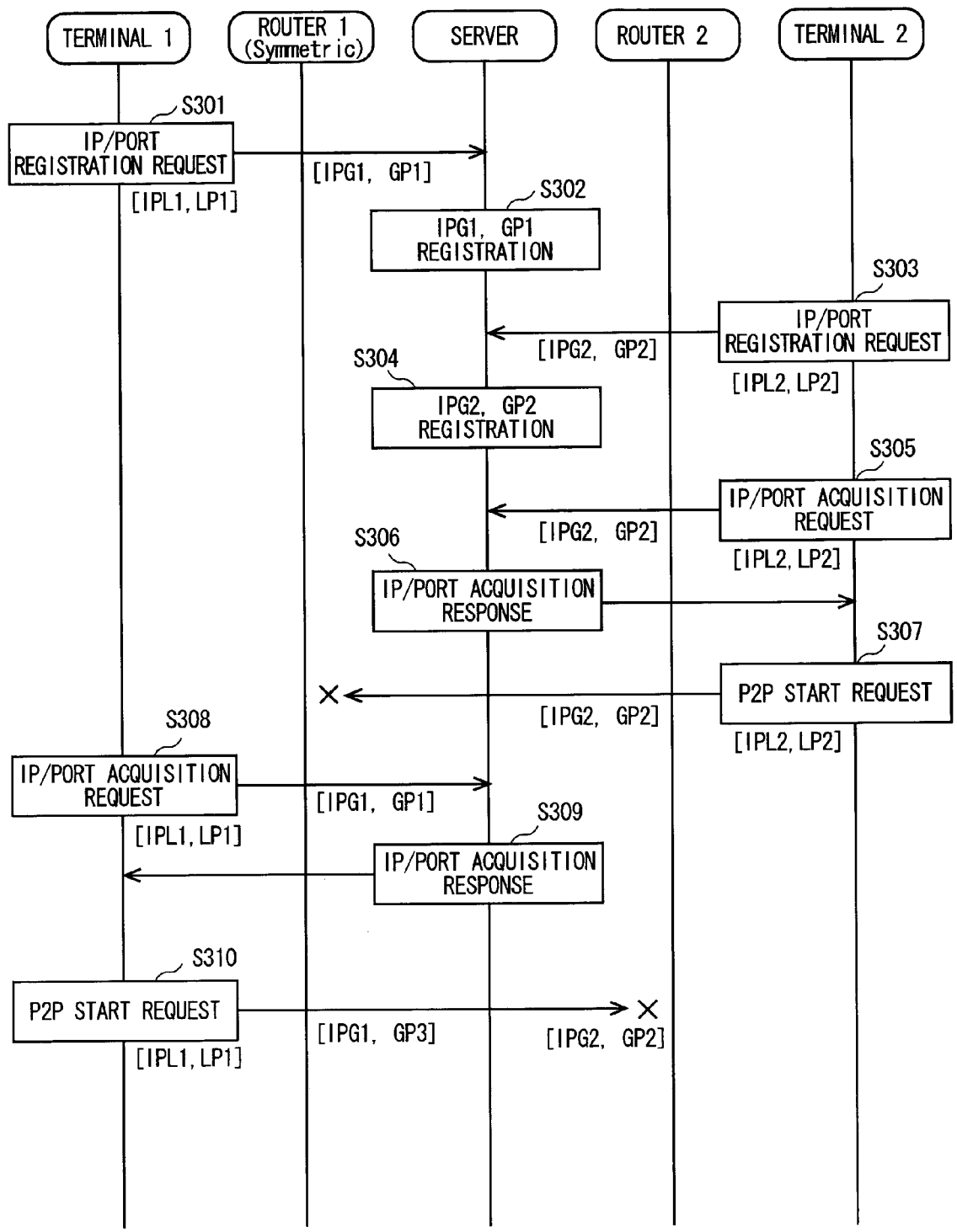
FIG. 23 is a sequence diagram illustrating a processing procedure in the case where the P2P communication path establishment method using STUN is applied to two communication terminals connected via a Symmetric NAT router.
Figure 24:
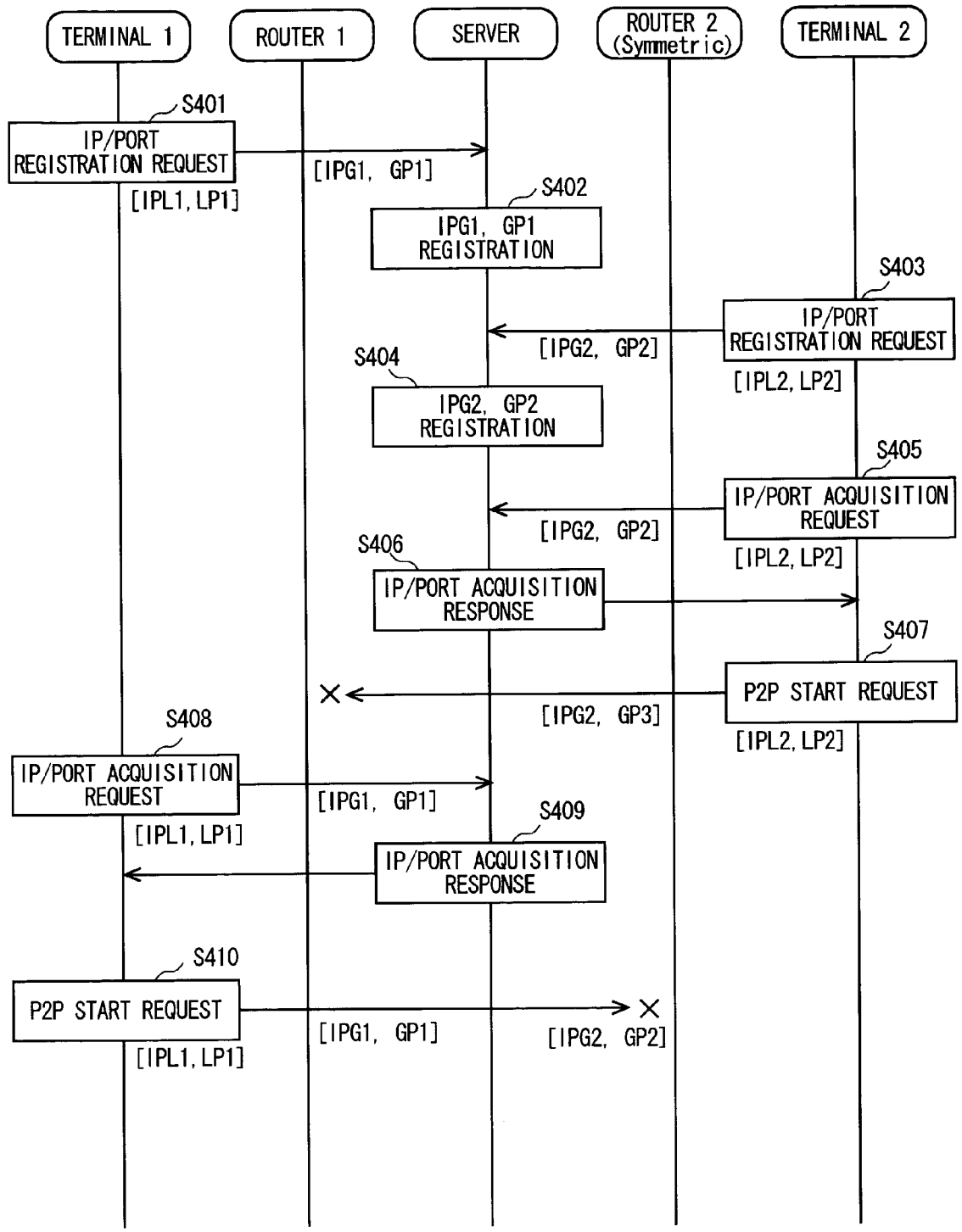
FIG. 24 is a sequence diagram illustrating a processing procedure in the case where the P2P communication path establishment method using STUN is applied to two communication terminals connected via a Symmetric NAT router.
Figure 25:
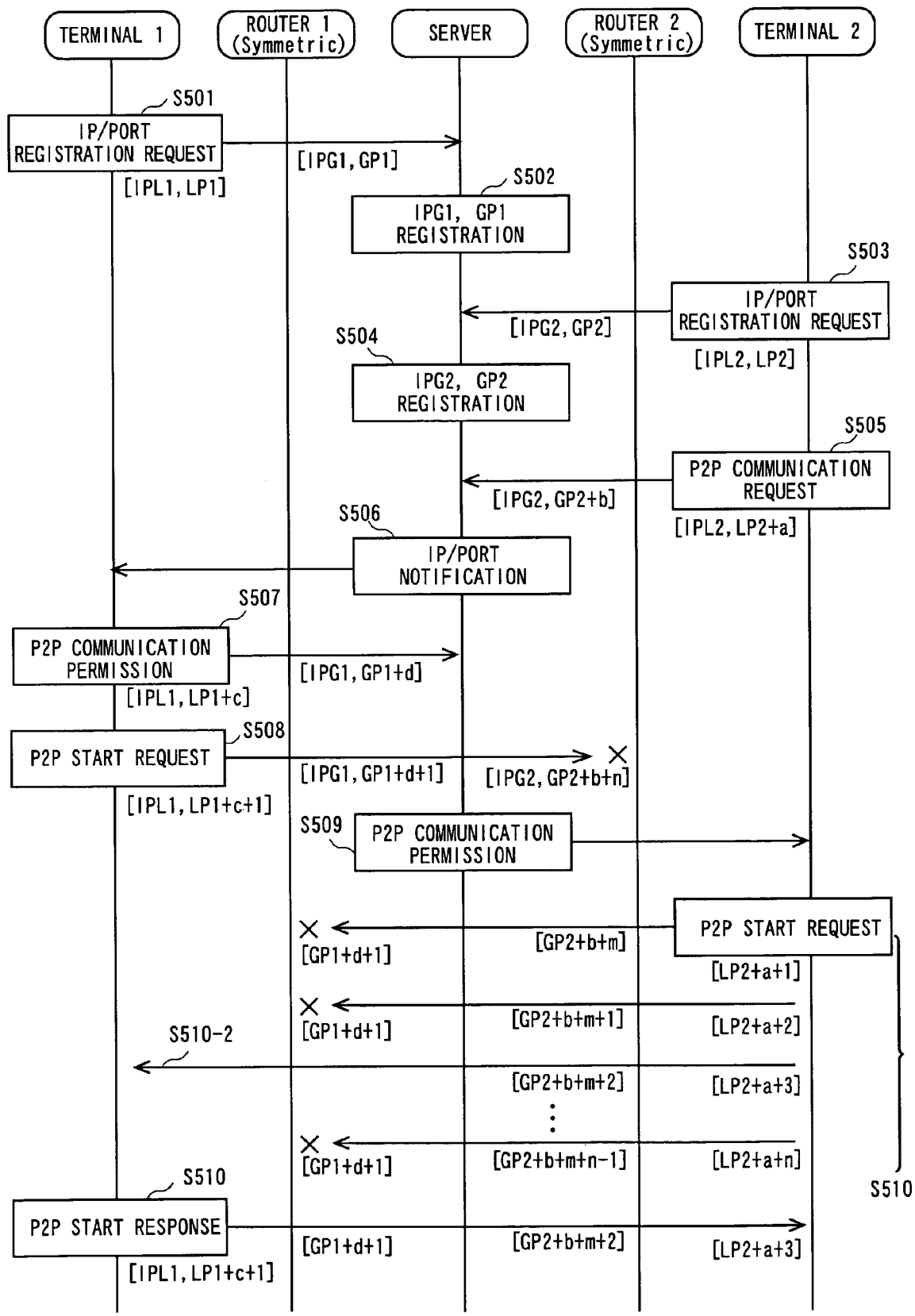
FIG. 25 is a sequence diagram illustrating a conventional P2P communication path establishment method.

FIG. 17B shows another example in which a terminal is connected to a global network via three routers.

As shown in FIG. 17B, the terminal 100 is connected to the global network 00 via a router 1 which is a Cone NAT router, a router 2 which is a PS NAT router, and a router 3 which is a Cone NAT router. When the terminal 100 transmits a packet having [LP1] set as the source port number, the packet reaches the router 2 via a port RP 11 of the router 1. The router 2, which is the PS NAT router, assigns different ports RP21, RP22 and RP23 to the received packet and forwards the packets to the router 3. Even if the router 3 is the Cone NAT router, the packets having different source port numbers are forwarded to the global network 00 via different ports of the router 3. Therefore, the server connected to the global network 00 can consider that the terminal 100 appears to be connected to the server via one PS NAT router.

As described above, even when a terminal and a server are connected to each other via a plurality of routers, a P2P communication path can be established by selecting a connection sequence based on the apparent NAT type of the router considered from the global network 00.

The functional blocks (FIG. 2A and FIG. 2B) of the communication apparatus in the above embodiment can be implemented by causing a computer to execute a program which is stored on a storage device (ROM, RAM, hard disc, etc.) and can cause the computer to execute the above-described processing procedure. The concept of such a computer encompasses computers incorporated in mobile terminal devices. In this case, the program may be executed after being stored on a storage device via a storage medium or may be directly executed from the storage medium. The functional blocks of the communication apparatus in the above embodiment may be implemented as an integrated circuit.

A communication apparatus, a communication method and a communication system according to the present invention can examine the NAT type of a router by communicating with only one server having one IP address. Therefore, the present invention is useful for, for example, home-use electronics devices, communication devices and the like for performing P2P communication between two terminals belonging to different private networks.

While the invention has been described in detail, the foregoing description is in all aspects illustrative and not restrictive. It is understood that numerous other modifications and variations can be devised without departing from the scope of the invention.

What is claimed is:

1. A communication apparatus connected to a server via a first relay apparatus having a NAT (network address translation) function, the communication apparatus comprising:
   an address information examination request transmission section for executing, in an arbitrary order, first transmission processing of transmitting at least two address information examination request packets having an identical source port number and different destination port numbers to the server and second transmission processing of transmitting at least one address information examination request packet having a source port number which is different from the source port number used in the first transmission processing to the server;
   a communication preparation request transmission section for transmitting a communication preparation packet having a source port number which is identical to the source port number used in either the first transmission processing or the second transmission processing to a destination which is different from the server, between the first transmission processing and the second transmission processing;
   an address information receiving section for receiving, from the server, at least three address information packets each including, in a data section thereof, a relay port number translated by the NAT function of the first relay apparatus from a source port address of the respective address information examination request packet; and
   a relay characteristic determination section for determining a NAT type of the first relay apparatus based on the relay port numbers included in the received address information packets.

2. A communication apparatus according to claim 1, wherein:
   in the first transmission processing, the address information examination request transmission section transmits:
      a first address information examination request packet having a first port number of the server set as the destination port number and a first local port number set as the source port number, and
      a second address information examination request packet having a second port number, different from the first port number, set as the destination port number and the first local port number set as the source port number,
   in the second transmission processing, the address information examination request transmission section transmits a third address information examination request packet having the first port number set as the destination port number and a second local port number, different from the first local port number, set as the source port number;
   the address information receiving section receives:
      a first address information packet returned in response to the first address information examination request packet and including a first relay port number,
      a second address information packet returned in response to the second address information examination request packet and including a second relay port number, and
      a third address information packet returned in response to the third address information examination request packet and including a third relay port number; and
   the relay characteristic determination section determines the NAT type of the first relay apparatus based on at least two of the first through third relay port numbers.

3. A communication apparatus according to claim 2, wherein:
the server is connected to a destination terminal via a second relay apparatus having a NAT function; and
the communication apparatus further comprises:
a relay information transmission section for transmitting a first relay information packet including information representing the determined NAT type to the server,
a relay information packet receiving section for receiving a second relay information packet including information representing the NAT type of the second relay apparatus from the server, and
a communication control section for transmitting a start request packet to the destination terminal based on the NAT types of the first and second relay apparatuses in order to request the destination terminal to start pier-to-pier communication.

4. A communication apparatus according to claim 3, wherein when the relay characteristic determination section determines that the first and second relay port numbers do not match each other, the relay information transmission section transmits the first relay information packet including, in a data section thereof, the third relay port number and a difference value between the first relay port number and the second relay port number.

5. A communication apparatus according to claim 3, wherein when the relay characteristic determination section determines that the first and second relay port numbers have an identical value to each other and that a difference value between the third relay port number and the identical value is 1, the relay information transmission section transmits the first relay information packet including, in a data section thereof, the second relay port number.

6. A communication apparatus according to claim 3, wherein when the relay characteristic determination section determines that the first and second relay port numbers have an identical value to each other and that a difference value between the third relay port number and the identical value is greater than 1, the relay information transmission section transmits the first relay information packet including, in a data section thereof, the third relay port number.

7. A communication apparatus according to claim 3, wherein when the relay characteristic determination section determines that the first relay port number and the first local port number match each other, the relay information transmission section transmits the first relay information packet including, in a data section thereof, a fourth local port number.

8. A communication apparatus according to claim 3, wherein the relay information transmission section transmits the first relay information packet including, in a data section thereof, information specifying the determined NAT type.

9. A communication apparatus according to claim 3, wherein:
the second relay information packet includes, in a data section thereof, information specifying the NAT type of the second relay apparatus and at least one of a fifth local port number and fourth through sixth port numbers notified by the server and; and
the communication control section selects one of a plurality of predefined connection sequences based on the information included in the second relay information packet.

10. A communication apparatus according to claim 9, wherein:
the second relay information packet includes, in the data section thereof, information indicating that the fourth and fifth relay port numbers match each other and that a difference value between the fourth relay port number and the fifth relay port number is 1, and the fifth relay port number; and
the communication control section transmits a start request packet having the first local port number set as the source port number and the fifth relay port number set as the destination port number.

11. A communication apparatus according to claim 9, wherein:
the second relay information packet includes, in the data section thereof, information indicating that the fourth and fifth relay port numbers match each other and that a difference value between the fourth relay port number and the fifth relay port number is greater than 1, and the fifth and sixth relay port numbers; and
the communication control section transmits, to the destination terminal, a plurality of start request packets each having the first local port number set as the source port number and a value, in the range of the fifth relay port number or greater and less than the sixth relay port number, set as the destination port number.

12. A communication apparatus according to claim 9, wherein:
the second relay information packet includes, in the data section thereof, information indicating that the second relay apparatus uses a port number identical to the local port number of the destination terminal, and the fifth local port number; and
the communication control section transmits a start request packet having the first local port number set as the source port number and the firth local port number set as the destination port number.

13. A communication apparatus according to claim 9, wherein:
the second relay information packet includes, in the data section thereof, information indicating that the fourth and fifth relay port numbers do not match each other, the sixth relay port number, and a difference value between the fourth relay port number and the fifth relay port number; and
when the relay characteristic determination section determines that the first and second relay port numbers have an identical value to each other and that a difference value between the third relay port number and the identical value is 1, the communication control section transmits a start request packet having the first local port number set as the source port number and a value, obtained by adding the sixth relay port number and the difference value between the fourth relay port number and the fifth relay port number, set as the destination port number.

14. A communication apparatus according to claim 9, wherein:
the second relay information packet includes, in the data section thereof, information indicating that the fourth and fifth relay port numbers do not match each other, the sixth relay port number, and a difference value between the fourth relay port number and the fifth relay port number; and
when the relay characteristic determination section determines that the first and second relay port numbers have an identical value to each other and that a difference value between the third relay port number and the identical value is greater than 1, the communication control section transmits a plurality of start request packets having the first local port number set as the source port number and a value, incremented from the sixth relay port number by the difference value between the fourth relay port number and the fifth relay port number, set as the destination port number.

15. A communication apparatus according to claim 9, wherein:
   the second relay information packet includes, in the data section thereof, information indicating that the fourth and fifth relay port numbers do not match each other, the sixth relay port number, and a difference value between the fourth relay port number and the fifth relay port number; and
   when the relay characteristic determination section determines that the first and second relay port numbers do not match each other, the communication control section transmits a start request packet having the first local port number set as the source port number and a value, obtained by adding the sixth relay port number and the difference value between the fourth relay port number and the fifth relay port number, set as the destination port number.

16. A communication apparatus according to claim 7, wherein the communication control section transmits a start request packet having the fourth local port number set as the source port number based on the NAT type of the first relay apparatus.

17. A communication apparatus according to claim 3, wherein the communication preparation request transmission section adjusts a value of TTL (Time To Live) included in a header of the communication preparation packet such that the communication preparation packet reaches the first relay apparatus but does not reach the second relay apparatus.

18. A communication apparatus according to claim 3, wherein:
   the relay characteristic determination section maintains the NAT type of each of the first relay apparatus and the second relay apparatus; and
   at the next communication with the destination terminal, the communication control section transmits the start request packet to the destination terminal based on the maintained NAT type of each of the first and second relay apparatuses.

19. A communication method by which a communication apparatus, connected to a server via a first relay apparatus having a NAT (network address translation) function, communicates, the communication method comprising:
   executing, in an arbitrary order, first transmission processing of transmitting at least two address information examination request packets having an identical source port number and different destination port numbers to the server and second transmission processing of transmitting at least one address information examination request packet having a source port number which is different from the source port number used in the first transmission processing to the server;
   transmitting a communication preparation packet having a source port number which is identical to the source port number used in either the first transmission processing or the second transmission processing to a destination which is different from the server, between the first transmission processing and the second transmission processing;
   receiving, from the server, at least three address information packets each including, in a data section thereof, a relay port number translated by the NAT function of the first relay apparatus from a source port address of the respective address information examination request packet; and
   determining a NAT type of the first relay apparatus based on the relay port numbers included in the received address information packets.

20. A communication system, comprising:
   a server;
   a first relay apparatus having a NAT (network address translation) function;
   a second relay apparatus having a NAT function;
   a first communication apparatus connected to the server via the first relay apparatus; and
   a second communication apparatus connected to the server via the second relay apparatus;
   wherein:
   the first communication apparatus and the second communication apparatus each comprise:
     an address information examination request transmission section for executing, in an arbitrary order, first transmission processing of transmitting at least two address information examination request packets having an identical source port number and different destination port numbers to the server and second transmission processing of transmitting at least one address information examination request packet having a source port number which is different from the source port number used in the first transmission processing to the server;
     a communication preparation request transmission section for transmitting a communication preparation packet having a source port number which is identical to the source port number used in either the first transmission processing or the second transmission processing to a destination which is different from the server, between the first transmission processing and the second transmission processing;
     an address information receiving section for receiving, from the server, at least three address information packets each including, in a data section thereof, a relay port number translated by the NAT function of the relay apparatus connected to the communication apparatus itself from a source port address of the respective address information examination request packet; and
     a relay characteristic determination section for determining a NAT type of the relay apparatus connected to the communication apparatus itself based on the relay port numbers included in the received address information packets; and
   the server comprises:
     an address information examination section for retrieving the relay port number included in each of the address information examination request packets transmitted from each of the first communication apparatus and the second communication apparatus; and
     an address information transmission section for transmitting an address information examination response packet including the retrieved relay port number in a data section thereof.

* * * * *

UNITED STATES PATENT AND TRADEMARK OFFICE
CERTIFICATE OF CORRECTION

PATENT NO. : 7,522,618 B2
APPLICATION NO. : 11/377523
DATED : April 21, 2009
INVENTOR(S) : Moe Hamamoto et al.

Page 1 of 1

It is certified that error appears in the above-identified patent and that said Letters Patent is hereby corrected as shown below:

IN THE CLAIMS

In column 38, claim 12, line 32, please change "firth" to --fifth--.

Signed and Sealed this

Fifteenth Day of September, 2009

David J. Kappos
*Director of the United States Patent and Trademark Office*